(12) United States Patent
Kozasa

(10) Patent No.: US 11,383,583 B2
(45) Date of Patent: Jul. 12, 2022

(54) THERMAL MANAGEMENT DEVICE FOR VEHICLE

(71) Applicant: DENSO CORPORATION, Kariya (JP)

(72) Inventor: Tetsuo Kozasa, Kariya (JP)

(73) Assignee: DENSO CORPORATION, Kariya (JP)

( * ) Notice: Subject to any disclaimer, the term of this patent is extended or adjusted under 35 U.S.C. 154(b) by 106 days.

(21) Appl. No.: 17/039,858

(22) Filed: Sep. 30, 2020

(65) Prior Publication Data

US 2021/0016628 A1 Jan. 21, 2021

Related U.S. Application Data

(63) Continuation of application No. PCT/JP2019/014905, filed on Apr. 4, 2019.

(30) Foreign Application Priority Data

Apr. 6, 2018 (JP) .............................. JP2018-073754

(51) Int. Cl.
*B60H 1/22* (2006.01)

(52) U.S. Cl.
CPC ... *B60H 1/2215* (2013.01); *B60H 2001/2271* (2013.01); *B60H 2001/2281* (2013.01);
(Continued)

(58) Field of Classification Search
CPC .............. B60H 1/2215; B60H 1/00921; B60H 1/00278; B60H 2001/2271; B60H 2001/2281; B60H 2001/2287; B60H 2001/2296; B60H 2001/00342; B60H 2001/00928; B60H 2001/00307; F25B 5/02; F25B 2400/0411; F25B 2400/13; F25B 2600/2509; F25B 2700/1931; F25B 1/10; F25B 2400/0409; F25B 2700/2104;
(Continued)

(56) References Cited

U.S. PATENT DOCUMENTS 9,956,848 B2 * 5/2018 Roos ........................ B60H 1/20
2013/0312447 A1 11/2013 Inaba et al.
(Continued)

FOREIGN PATENT DOCUMENTS

| JP | H05162536 A | 6/1993 |
|---|---|---|
| JP | 2012181005 A | 9/2012 |
| JP | 5423528 B2 | 2/2014 |
| JP | 5920178 B2 | 5/2016 |
| JP | 6052222 B2 | 12/2016 |
| JP | 6060797 B2 | 1/2017 |
| WO | WO-2014076874 A1 | 5/2014 |

*Primary Examiner* — Emmanuel E Duke
(74) *Attorney, Agent, or Firm* — Harness, Dickey & Pierce, P.L.C.

(57) ABSTRACT

A thermal management system for a vehicle includes a heating refrigerant circulation circuit, a heat pump cycle and a heat-discharge refrigerant circulation circuit A heating circulation section of the heating refrigerant circulation circuit, a recovery circulation section of the heat pump cycle, and a heat-discharge circulation section of the heat-discharge refrigerant circulation circuit are integrally configured as a combined heat exchanger that is capable of performing heat transfers at least between the cycle refrigerant and the heating refrigerant and between the heat-discharge refrigerant and the heating refrigerant. Furthermore, the heating refrigerant, the cycle refrigerant and the heat-discharge refrigerant are heat mediums each of which has a phase change during the heat transfer.

14 Claims, 25 Drawing Sheets

(52) U.S. Cl.
CPC ........... *B60H 2001/2287* (2013.01); *B60H 2001/2296* (2013.01)

(58) Field of Classification Search
CPC ...... F25B 2700/2106; F25B 2700/2117; B60L 2240/662; B60L 1/02; B60L 2240/34; B60L 2240/36; Y02E 60/10; Y02T 10/72; Y02T 90/16; F28D 7/0083; H01M 10/486; H01M 10/613; H01M 10/63; H01M 10/6569; H01M 2220/20; H01M 10/625; B60K 1/00; B60K 11/02; B60K 2001/003; B60K 2001/005; B60K 2001/006; F28F 2009/0297; Y02B 30/52
See application file for complete search history.

(56) References Cited

U.S. PATENT DOCUMENTS

| | | | |
|---|---|---|---|
| 2014/0041826 A1* | 2/2014 | Takeuchi | B60L 1/08 165/10 |
| 2014/0318170 A1 | 10/2014 | Katoh et al. | |
| 2015/0101789 A1 | 4/2015 | Enomoto et al. | |
| 2015/0292820 A1 | 10/2015 | Katoh et al. | |
| 2016/0129756 A1 | 5/2016 | Enomoto et al. | |

* cited by examiner

LOW-TEMPERATURE HEATING MODE

THERMAL MANAGEMENT DEVICE FOR VEHICLE

CROSS REFERENCE TO RELATED APPLICATION

The present application is a continuation application of International Patent Application No. PCT/JP2019/014905 filed on Apr. 4, 2019, which designated the U.S. and claims the benefit of priority from Japanese Patent Application No. 2018-073754 filed on Apr. 6, 2018. The entire disclosures of all of the above applications are incorporated herein by reference.

TECHNICAL FIELD

The present disclosure relates to a thermal management system for a vehicle, and is suitable for use in an electric vehicle.

BACKGROUND

A vehicle air conditioner is used for an electrical vehicle in which a driving power for driving a vehicle is obtained by an electrical motor.

The vehicle air conditioner includes a heat pump cycle that heats or cools ventilation air to be blown into a vehicle compartment. The heat pump cycle is configured to switch between refrigerant circuits. The heat pump cycle is switched to a refrigerant circuit constructing a so-called gas injection cycle in a heating mode, in which the ventilation air is heated by heat absorbed from outside air as a heat source.

SUMMARY

The present disclosure is to provide a thermal management system for a vehicle with a heat pump cycle, which can perform a heating operation of a vehicle compartment by effectively using exhaust heat of an in-vehicle device that generates heat during operation.

A thermal management system for a vehicle of the present disclosure includes a heating refrigerant circulation circuit, a heat pump cycle, and a heat-discharge refrigerant circulation circuit. The heating refrigerant circulation circuit causes a heating refrigerant to absorb exhaust heat of the in-vehicle device that generates heat during operation, and circulates the heat. The heat pump cycle causes a cycle refrigerant to absorb heat of the heating refrigerant, and uses the absorbed heat as a heat source for heating a fluid to be heat exchanged. The heat-discharge refrigerant circulation circuit causes a heat-discharge refrigerant to absorb the heat of the heating refrigerant and dissipate the absorbed heat to an outside air.

The heating refrigerant circulation circuit has a heating circulation section that allows the heating refrigerant having heat-absorbed from the exhaust heat to flow therethrough. The heat pump cycle has a recovery circulation section for circulating a cycle refrigerant. The heat-discharge refrigerant circulation circuit has a heat-discharge circulation section for circulating the heat-discharge refrigerant.

The heating circulation section, the recovery circulation section, and the heat-discharge circulation section are integrally configured as a combined heat exchanger that is capable of heat transfer at least between the cycle refrigerant and the heating refrigerant and between the heat-discharge refrigerant and the heating refrigerant.

Further, the heating refrigerant, the cycle refrigerant, and the heat-discharge refrigerant are heat mediums each of which has a phase change during heat transfer in the thermal management system for a vehicle.

Thus, in the thermal management system for a vehicle, it is possible to effectively use exhaust heat of an in-vehicle device that generates heat during operation and to perform a suitable temperature adjustment of the in-vehicle device.

DESCRIPTION OF EMBODIMENTS

Figure 1:
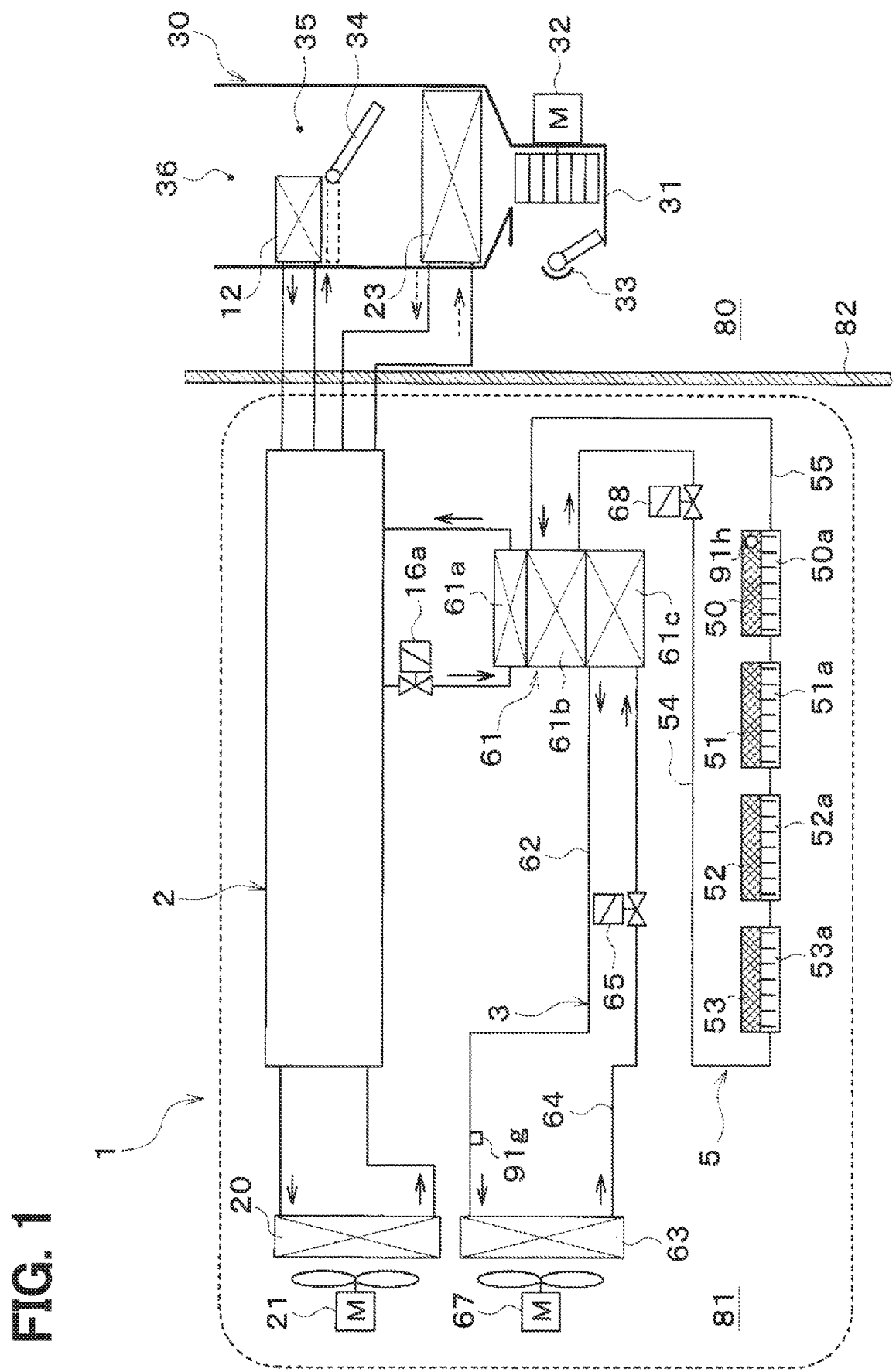
FIG. 1 is a diagram illustrating an entire configuration of a vehicle thermal management system according to a first embodiment.

A heat pump cycle of a comparison example may be configured to heat or cool ventilation air to be blown into a vehicle compartment. The heat pump cycle is switched to a refrigerant circuit constructing a so-called gas injection cycle in a heating mode, in which the ventilation air is heated by heat absorbed from outside air as a heat source.

The gas injection cycle of the comparison example has a configuration in which an intermediate-pressure gas-phase refrigerant generated in the cycle is merged with a refrigerant in a compression process of the compressor. Accordingly, in the gas injection cycle, a compression efficiency of the compressor can be improved and coefficient of performance (COP) of the cycle can be improved.

That is, in the heat pump cycle of the comparison example, in a heating mode requiring a high heating capacity, for example, at a low outside air temperature, the refrigeration cycle device is switched to a gas injection cycle so as to restrict an increase in electrical energy consumed for air conditioning. As a result, it can restrict a driving range of the electric vehicle per charge from being reduced.

An electric vehicle is generally equipped with in-vehicle devices that generate heat during operation, such as a battery, a charging generator, a power control unit, and a vehicle-running electric motor.

Furthermore, in order to fully exhibit the performance of the in-vehicle devices, it is necessary to maintain the temperature of each in-vehicle device within an appropriate temperature range (e.g., usable temperature range). Therefore, this type of vehicle thermal management system not only has the function of effectively using the exhaust heat of the in-vehicle device but also dissipates the exhaust heat to the outside air under operating conditions where the exhaust heat cannot be used, so as to have a temperature adjustment function that keeps the temperature of the in-vehicle device within the appropriate temperature range.

In view of the above, an object of the present disclosure is to provide a thermal management system for a vehicle, which can effectively use exhaust heat of an in-vehicle device that generates heat during operation.

A thermal management system for a vehicle according to an exemplar of the present disclosure includes a heating refrigerant circulation circuit, a heat pump cycle, and a heat-discharge refrigerant circulation circuit. The heating refrigerant circulation circuit causes a heating refrigerant to absorb exhaust heat of the in-vehicle device that generates heat during operation, and circulates the heat. The heat pump cycle causes a cycle refrigerant to absorb heat of the heating refrigerant, and uses the absorbed heat as a heat source for heating a fluid to be heat exchanged. The heat-discharge refrigerant circulation circuit causes a heat-discharge refrigerant to absorb the heat of the heating refrigerant and dissipate the absorbed heat to an outside air.

The heating refrigerant circulation circuit has a heating circulation section that allows the heating refrigerant having heat-absorbed from the exhaust heat to flow therethrough. The heat pump cycle has a recovery circulation section for circulating a cycle refrigerant. The heat-discharge refrigerant circulation circuit has a heat-discharge circulation section for circulating the heat-discharge refrigerant.

The heating circulation section, the recovery circulation section, and the heat-discharge circulation section are integrally configured as a combined heat exchanger that is capable of heat transfer at least between the cycle refrigerant and the heating refrigerant and between the heat-discharge refrigerant and the heating refrigerant.

Further, the heating refrigerant, the cycle refrigerant, and the heat-discharge refrigerant are heat mediums each of which has a phase change during heat transfer in a thermal management system for a vehicle.

According to this, it is possible to exchange heat between the heating refrigerant and the cycle refrigerant in the combined heat exchanger. Therefore, the exhaust heat absorbed by the heating refrigerant from the in-vehicle devices can be effectively used for improving the COP of the heat pump cycle. Further, the exhaust heat absorbed by the heating refrigerant from exhaust heat of the in-vehicle device can be effectively used as a heat source for heating a heat-exchange target fluid such as ventilation air to be blown into the vehicle compartment.

Further, the combined heat exchanger can exchange heat between the heating refrigerant and the heat-discharge refrigerant. Therefore, the exhaust heat absorbed by the heating refrigerant from the in-vehicle device can be absorbed by the heat-discharge refrigerant, and can be dissipated to the outside air.

In addition to this, as the heating refrigerant, the cycle refrigerant, and the heat-discharge refrigerant, heat mediums that have a phase change during heat transportation are adopted. As a result, when heat is exchanged between the refrigerants, efficient and quick heat transfer due to latent heat change can be realized.

Therefore, the exhaust heat of the in-vehicle device can be effectively used as a heat source for heating the fluid to be heat-exchanged. Furthermore, the residual exhaust heat that does not need to be used for heating the fluid can be quickly dissipated to the outside air. Therefore, it is possible to suppress a temperature rise of the in-vehicle device with high responsiveness.

Hereinafter, detail embodiments for implementing the present disclosure will be described referring to drawings. In each embodiment, portions corresponding to the elements described in the preceding embodiments are denoted by the same reference numerals, and redundant explanation may be omitted. When only a part of a configuration is described in an embodiment, another preceding embodiment may be applied to the other parts of the configuration. The present disclosure is not limited to combinations of embodiments which combine parts that are explicitly described as being combinable. As long as no problem is present, the various embodiments may be partially combined with each other even if not explicitly described.

First Embodiment

A first embodiment of the present disclosure will be described with reference to FIGS. 1 to 14. In the present embodiment, a vehicle thermal management system 1 according to the present embodiment is applied to an electric vehicle that gains driving power for a vehicle running from a vehicle-running electric motor 53. The vehicle thermal management system 1 performs a function of air-conditioning of a vehicle compartment in the electric vehicle and a function of releasing exhaust heat to outside air from various in-vehicle devices 50-53 that generate heat during operation.

The vehicle thermal management system 1 can switch an air conditioning operation mode for performing air conditioning in the vehicle compartment between a cooling mode, an air mixing mode, a dehumidifying and heating mode, and a low-temperature heating mode.

The cooling mode is an operation mode in which ventilation air is cooled and blown into the vehicle compartment. The air mixing mode is an operation mode in which cool air and hot air to be blown are produced at the same time, and a mixing method and a mixing ratio of the two air are changed so as to arbitrarily change a temperature of the air to be blown into the vehicle compartment. More specifically, the air mixing mode is an operation mode in which cooled air (cool air) and heated air (hot air) are mixed and blown into the vehicle compartment. Furthermore, in the air mixing mode, the temperature of the ventilation air blown into the vehicle compartment is adjusted to a desired temperature by changing the mixing ratio of the cool air and the hot air.

The dehumidifying and heating mode is an operation mode for reheating the cooled and dehumidified air and conveying the dehumidified air into the passenger compartment. The low-temperature heating mode is an operation mode in which the air is heated and is blown into the vehicle compartment, and is a mode in which a high heating capacity of the blown air (that is, a high heating ability) can be exhibited even when the outside air temperature is low.

As shown in FIG. 1, the vehicle thermal management system 1 includes a heat pump cycle 2, a heat-discharge refrigerant circulation circuit 3, a heating refrigerant circulation circuit 5, an interior air conditioning unit 30, and the like. In FIG. 1, some components of the heat pump cycle 2 are not shown in detail.

The heat pump cycle 2 is a vapor-compression refrigeration cycle device that adjusts a temperature of ventilation air to be blown into the vehicle compartment, which is a space to be air conditioned. In this case, a fluid to be heat exchanged in the vehicle thermal management system 1 of the present embodiment is the ventilation air. The heat pump cycle 2 can switch a refrigerant circuit in accordance with the air-conditioning operation mode of the vehicle thermal management system 1 described above.

The heat pump cycle 2 uses an HFC refrigerant (specifically, R134a) as a refrigerant and configures a vapor compression subcritical refrigeration cycle in which a high-pressure refrigerant pressure does not exceed a critical pressure of the refrigerant. In the following descriptions, the refrigerant circulating in the heat pump cycle 2 is referred to as a cycle refrigerant for clarification. Further, the cycle refrigerant is mixed with a refrigeration oil for lubricating a compressor 11, and a part of the refrigeration oil circulates in the cycle together with the refrigerant.

Figure 2:
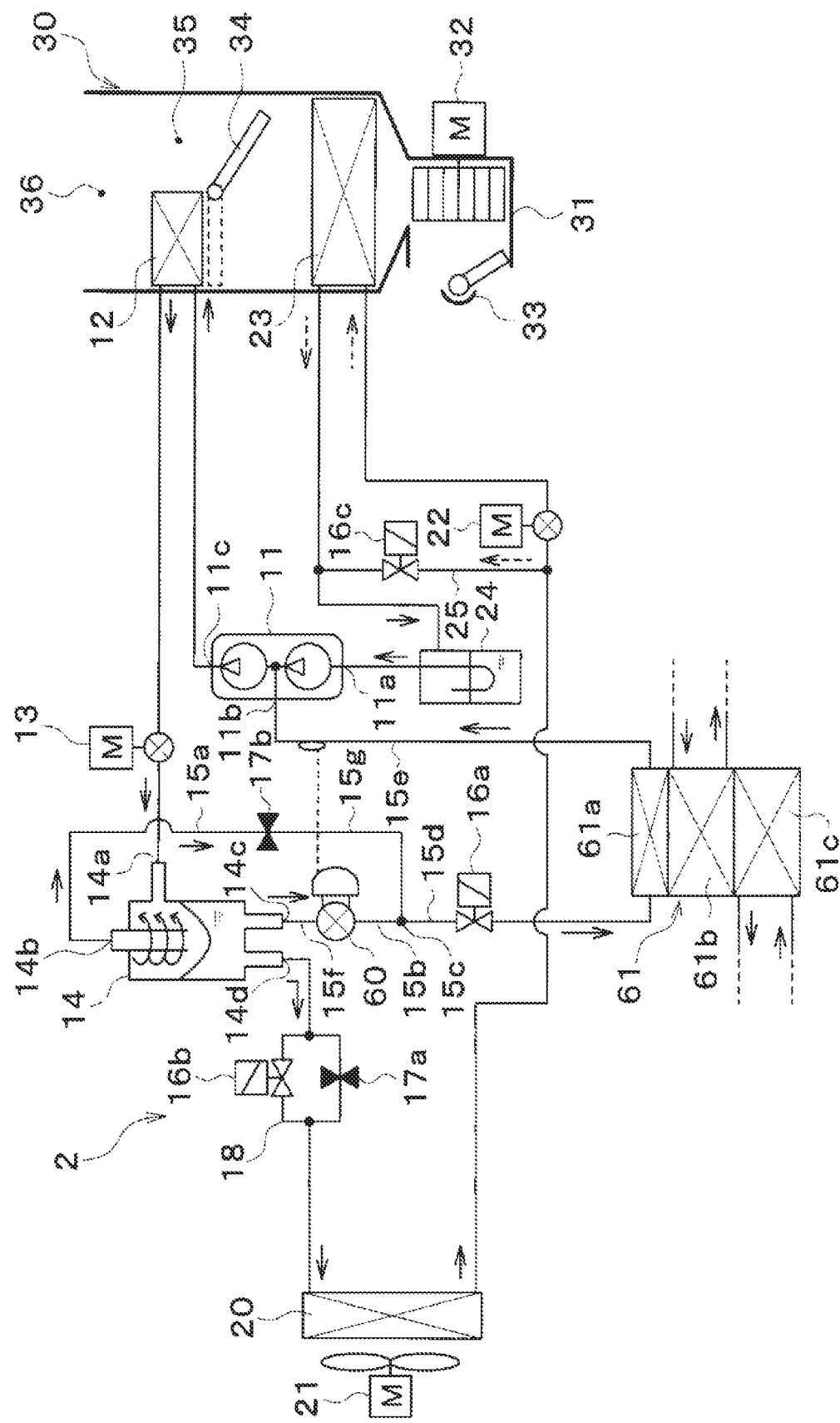
FIG. 2 is a diagram illustrating an entire configuration of a heat pump cycle according to the first embodiment.

Next, a detailed configuration of the heat pump cycle 2 will be described with reference to FIG. 2. The compressor 11 is a two-stage electric compressor that compresses and discharges the cycle refrigerant in the heat pump cycle 2. The compressor 11 houses two compression mechanisms, i.e., a low-stage side compression mechanism and a high-stage side compression mechanism, and an electric motor which rotates both of the compression mechanisms in a housing constituting an outer case of the compressor 11. An operation of the compressor 11 is controlled in accordance with a control signal outputted from a controller 90 described later.

The compressor 11 includes a suction port 11a, an intermediate pressure port 11b, and a discharge port 11c. The suction port 11a is a suction opening through which a low-pressure cycle refrigerant is drain from an outside of the housing into the low-stage compression mechanism. The discharge port 11c is a discharge opening through which a high-pressure cycle refrigerant from the high-stage compression mechanism is discharged to the outside of the housing.

The intermediate pressure port 11b is an intermediate-pressure suction opening through which an intermediate-pressure cycle refrigerant flows into the housing from the outside of the housing and joins with a cycle refrigerant in a compressing process from low pressure to high pressure in the compressor 11. Accordingly, the intermediate pressure port 11b is connected to the discharge opening side of the low-stage compression mechanism and the suction opening side of the high-stage compression mechanism, in the housing.

The discharge port 11c of the compressor 11 is connected to a refrigerant inlet side of an indoor condenser 12. The indoor condenser 12 is disposed inside a casing 31 of the interior air conditioning unit 30 described below. The indoor condenser 12 is a heating heat exchanger that heats the ventilation air at least in the air mixing mode, the dehumidifying and heating mode and the low-temperature heating mode, via heat exchange between a high-pressure and high-temperature cycle refrigerant flowing through the indoor condenser 12 and the ventilation air that has passed through an indoor evaporator 23 described later.

A refrigerant outlet side of the indoor condenser 12 is connected to an inlet side of a high-pressure control valve 13. The high-pressure control valve 13 is a control valve for maintaining the pressure of the cycle refrigerant on the high-pressure side substantially constant so that the air can be heated by the indoor condenser 12 to a predetermined temperature. More specifically, the high-pressure control valve 13 is an electric and variable throttle mechanism and includes a valve element that is displaced to change a throttled passage area, and an electric actuator (e.g., stepper motor) that drives and displaces the valve element.

Further, the heat pump cycle 2 includes a cooling expansion valve 22 as described later. The cooling expansion valve 22 is similar in basic structure to the high-pressure control valve 13. The high-pressure control valve 13 and the cooling expansion valve 22 has a full-opening function of fully opening a valve port, so as to function as just a refrigerant path almost without performing a flow rate control and a refrigerant decompression, and a full-closing function of fully closing the valve port to completely shut a refrigerant path.

The high-pressure control valve 13 and the cooling expansion valve 22 switch a refrigerant circuit according to each of the above-described respective operation modes by the fully-opening function and the fully-closing function. That is, the high-pressure control valve 13 and the cooling expansion valve 22 also have a function as a refrigerant circuit switch of the heat pump cycle 2. Operations of the high-pressure control valve 13 and the cooling expansion valve 22 are controlled by a control signal (e.g., control pulse) output from the controller 90.

A refrigerant outlet of the high-pressure control valve 13 is connected to an inflow port 14a of a gas-liquid separator 14. The gas-liquid separator 14 is a gas-liquid separator that separates a high-pressure cycle refrigerant or a semi-high pressure refrigerant which has been decompressed by the high-pressure control valve 13, into gas refrigerant and liquid refrigerant. In the present embodiment, the gas-liquid separator 14 is of a centrifugal separation type that separates the gas and liquid of the refrigerant by the action of centrifugal force, and has a small internal capacity in which the separated almost refrigerant is discharged to the outside without being stored inside.

The gas-liquid separator 14 is provided with an inflow port 14*a*, a gas-phase outflow port 14*b*, a first liquid-phase outflow port 14*c*, and a second liquid-phase outflow port 14*d*. The inflow port 14*a* allows the high-pressure or semi-high-pressure refrigerant flowing out of the high-pressure control valve 13 to flow into the gas-liquid separator 14. The gas-phase outflow port 14*b* allows the separated gas phase refrigerant to flow out. The first liquid-phase outflow port 14*c* and the second liquid-phase outflow port 14*d* allow the separated liquid-phase refrigerant to flow out.

The gas-phase outflow port 14*b* is connected to a semi-high pressure gas-phase refrigerant passage 15*a*. An intermediate-pressure fixed throttle 17*b* is disposed in the semi-high pressure gas-phase refrigerant passage 15*a*. The intermediate-pressure fixed throttle 17*b* is a decompressor that decompresses the cycle refrigerant flowing in the semi-high pressure gas-phase refrigerant passage 15*a*, and is also a flow rate regulator that regulates a flow rate of the refrigerant. As the intermediate-pressure fixed throttle 17*b*, an orifice, a capillary tube, a nozzle or the like can be used.

The first liquid-phase outflow port 14*c* is connected to a semi-high pressure liquid-phase refrigerant passage 15*b*. A recovery expansion valve 60 is disposed in the semi-high pressure liquid-phase refrigerant passage 15*b*. The recovery expansion valve 60 is a variable throttle mechanism that changes its degree of throttling such that a superheat degree of the cycle refrigerant on an outlet side of a recovery circulation section 61*a* of the combined heat exchanger 61 approaches a predetermined reference superheat degree. The recovery expansion valve 60 is a variable throttle mechanism that changes its degree of throttling such that a superheat degree of the cycle refrigerant flowing into the intermediate-pressure port 11*n* of the compressor 11 approaches a predetermined reference superheat degree.

A so-called thermal expansion valve can be used as the recovery expansion valve 60. The thermal expansion valve includes a temperature sensing section and a mechanical mechanism. The temperature sensing section of the thermal expansion valve has a deformable member (specifically, a diaphragm) that deforms according to the temperature and pressure of the cycle refrigerant on the outlet side of the recovery circulation portion 61*a*. The mechanical mechanism changes the throttle opening in accordance with the deformation of the deformable member.

The cycle refrigerant decompressed in the throttle passage of the recovery expansion valve 60 becomes a liquid-phase refrigerant having a relatively low degree of dryness and containing a small amount of gas-phase refrigerant. The refrigerant decompressed by the recovery expansion valve 60 flows to the side of the recovery circulation section 61*a* of the combined heat exchanger 61 via an intermediate-pressure liquid-phase refrigerant passage 15*b*.

The recovery circulation section 61*a* of the combined heat exchanger 61 is constructed by a plurality of refrigerant tubes (hereinafter, referred to as recovery tubes 72) for circulating the cycle refrigerant. The detailed configuration of the combined heat exchanger 61 will be described later.

An intermediate-pressure gas-phase refrigerant passage 15*g* is connected to the outlet side of the intermediate-pressure fixed throttle 17*b*. An outlet side of the intermediate-pressure gas-phase refrigerant passage 15*a* and an outlet side of the intermediate-pressure liquid-phase refrigerant passage 15*b* are connected to a joint portion 15*c*. At the joint portion 15*c*, a flow of the cycle refrigerant flowing out of the intermediate-pressure gas-phase refrigerant passage 15*g* and a flow of the cycle refrigerant flowing out of the intermediate-pressure liquid-phase refrigerant passage 15*b* are joined together.

The joint portion 15*c* has a three-way joint structure having three inflow/outflow ports that communicate with each other. In the joint portion 15*c*, two of the three inflow/outflow ports is used as two refrigerant inflow ports, and the other one is used as a refrigerant outflow port.

The refrigerant outflow port of the joint portion 15*c* is connected to an inlet-side intermediate-pressure refrigerant passage 15*d*. A recovery open-close valve 16*a* is disposed in the inlet-side intermediate-pressure refrigerant passage 15*d*. The recovery open-close valve 16*a* is an electromagnetic valve that is disposed in the inlet-side intermediate-pressure refrigerant passage 15*d* and opens or closes the inlet-side intermediate-pressure refrigerant passage 15*d*. An operation of the recovery open-close valve 16*a* is controlled by a control voltage output from the controller 90.

As described above, in the recovery expansion valve 60, the degree of throttling is changed such that the superheat degree of the cycle refrigerant on an outlet side of the recovery circulation section 61*a* approaches a reference superheat degree. Therefore, the cycle refrigerant flowing through the inlet-side intermediate-pressure refrigerant passage 15*d* is in a liquid phase state or a gas-liquid two-phase state having a relatively low vapor quality. Accordingly, the recovery open-close valve 16*a* is disposed in the refrigerant passage through which the cycle refrigerant flows in liquid phase or gas-liquid two-phase.

Further, the heat pump cycle 2 includes a low-pressure open-close valve 16*b* and a cooling open-close valve 16*c*, as described later. The low-pressure open-close valve 16*b* and the cooling open-close valve 16*c* are similar in basic configuration to the recovery open-close valve 16*a*.

A refrigerant circuit is switched by opening and closing of the refrigerant passages using the recovery open-close valve 16*a*, the low-pressure open-close valve 16*b* and the cooling open-close valve 16*c*, in accordance with a selected mode of the above-described operation modes. That is, the recovery open-close valve 16*a*, the low-pressure open-close valve 16*b*, and the cooling open-close valve 16*c* have a function as a refrigerant circuit switch of the heat pump cycle 2 together with the high-pressure control valve 13 and the cooling expansion valve 22.

An outlet side of the inlet-side intermediate-pressure refrigerant passage 15*d* is connected to a refrigerant inlet side of the recovery circulation section 61*a*. Further, a refrigerant outlet of the recovery circulation section 61*a* is connected to the intermediate pressure port 11*b* of the compressor 11 through an outlet-side intermediate-pressure refrigerant passage 15*e*.

The second liquid-phase outflow port 14*d* of the gas-liquid separator 14 is connected to a refrigerant inlet side of an air-conditioning outdoor heat exchanger 20 through a low-stage fixed throttle 17*a*. The low-stage fixed throttle 17*a* is a decompressor that decompresses the cycle refrigerant flowing out of the second liquid-phase outflow port 14*d*, and is also a flow rate regulator that regulates a flow rate of the refrigerant. The low-stage fixed throttle 17a is similar in basic configuration to the intermediate-pressure fixed throttle 17b.

Further, the second liquid-phase outflow port 14d is connected to a fixed-throttle bypass passage 18 through which the cycle refrigerant in liquid phase separated by the gas-liquid separator 14 bypasses the low-stage fixed throttle 17a and flows to the refrigerant inlet side of the air-conditioning outdoor heat exchanger 20. The low-pressure open-close valve 16b is disposed in the fixed-throttle bypass passage 18 and opens or closes the fixed-throttle bypass passage 18.

A pressure loss generated when the cycle refrigerant flowing out of the second liquid-phase outflow port 14d passes through the low-pressure open-close valve 16b is extremely smaller than a pressure loss generated when the cycle refrigerant passes through the low-stage fixed throttle 17.

Therefore, when the controller 90 opens the low-pressure open-close valve 16b, almost all of the cycle refrigerant flowing out of the second liquid-phase outflow port 14d flows into the air-conditioning outdoor heat exchanger 20 through the fixed-throttle bypass passage 18. On the other hand, when the controller 90 closes the low-pressure open-close valve 16b, the cycle refrigerant flowing out of the second liquid-phase outflow port 14d is decompressed by the low-stage fixed throttle 17a and flows into the air-conditioning outdoor heat exchanger 20.

The air-conditioning outdoor heat exchanger 20 is a heat exchanger that performs heat exchange between the cycle refrigerant flowing therein and outside air supplied from an outside-air fan 21. The outdoor heat exchanger 20 for air conditioning is a heat exchanger that functions as a radiator that dissipates the high-pressure high-temperature refrigerant, which is a cycle refrigerant, at least in the cooling mode. The outdoor heat exchanger 20 for air conditioning is a heat exchanger that functions as an evaporator that evaporates the cycle refrigerant that is a low-pressure low-temperature refrigerant, at least in the dehumidifying and heating mode and the low-temperature heating mode.

The outside-air fan 21 is an electric blower configured to send the outside air toward the air-conditioning outdoor heat exchanger 20. The number of revolutions (i.e., blowing capacity) of the outside-air fan 21 is controlled by a control voltage output from the controller 90. The outside-air fan 21 may be of a suction type or a blowing type as long as it can supply the outside air to the air-conditioning outdoor heat exchanger 20.

A refrigerant outlet side of the air-conditioning outdoor heat exchanger 20 is connected to a refrigerant inlet side of the indoor evaporator 23 through the cooling expansion valve 22. The cooling expansion valve 22 is an electric variable throttle mechanism that decompresses the pressure of the cycle refrigerant flowing out of the air-conditioning outdoor heat exchanger 20 to a low pressure at least in the cooling mode.

The indoor evaporator 23 is disposed upstream of the indoor condenser 12 in the ventilation air flow in the casing 31 of the interior air conditioning unit 30. The indoor evaporator 23 exchanges heat between the cycle refrigerant, which is a low-temperature low-pressure refrigerant, and the ventilation air blown from the air conditioning blower 32 at least in the cooling mode, in the air mixing mode, and in the dehumidifying and heating mode. The indoor evaporator 23 is a cooling heat exchanger that cools the ventilation air by evaporating the cycle refrigerant and exerting a heat absorbing action.

A refrigerant outlet side of the indoor evaporator 23 is connected to an inlet side of an accumulator 24. The accumulator 24 is a low-pressure refrigerant gas-liquid separator that separates gas and liquid of the cycle refrigerant flowing thereinto and accumulates surplus refrigerant in the cycle as liquid-phase refrigerant. A gas-phase refrigerant outlet of the accumulator 24 is connected to the suction port 11a of the compressor 11.

The refrigerant outlet side of the air-conditioning outdoor heat exchanger 20 is connected to an evaporator bypass passage 25 through which the cycle refrigerant flowing out of the air-conditioning outdoor heat exchanger 20 bypasses the cooling expansion valve 22 and the indoor evaporator 23, and directly flows toward the inlet side of the accumulator 24. The cooling open-close valve 16c is disposed in the evaporator bypass passage 25 and opens or closes the evaporator bypass passage 25.

Next, the heat-discharge refrigerant circulation circuit 3 will be described. The heat-discharge refrigerant circulation circuit 3 is a thermosiphon for releasing exhaust heat of the in-vehicle devices 50 to 53 to the outside air. Refrigerant in the heat-discharge refrigerant circulation circuit 3 is the same type of refrigerant (R134a in the present embodiment) as the cycle refrigerant circulating in the heat pump cycle 2. In the following descriptions, the refrigerant circulating in the heat-discharge refrigerant circulation circuit 3 is referred to as a heat-discharge refrigerant, for clarification of the descriptions.

Here, the thermosiphon has an evaporation unit that evaporates the refrigerant and a condensation unit that condenses the refrigerant, and is configured by connecting the evaporation unit and the condensation unit in a closed loop (that is, in a circuit shape). Then, a specific gravity difference is generated in the refrigerant in the circuit due to a temperature difference between the temperature of the refrigerant in the evaporator and the temperature of the refrigerant in the condenser, and the refrigerant is naturally circulated by the action of gravity, so that heat is transported together with the refrigerant.

In the heat-discharge refrigerant circulation circuit 3, as shown in FIG. 1, the heat-discharge refrigerant is circulated between the heat-discharge circulation section 61c of the combined heat exchanger 61 and the outdoor heat exchanger 63. Further, the heat-discharge outdoor heat exchanger 63 is disposed above the heat-discharge circulation section 61c of the combined heat exchanger 61.

The heat-discharge circulation section 61c of the combined heat exchanger 61 is constructed by a plurality of refrigerant tubes (hereinafter, referred to as heat-discharge tubes 75) for circulating the heat-discharge refrigerant. In the heat-discharge refrigerant circulation circuit 3, the heat-discharge circulation section 61c is used as an evaporator for evaporating the heat-discharge refrigerant.

The heat-discharge outdoor heat exchanger 63 is a heat exchanger that performs heat exchange between the heat-discharge refrigerant flowing therein and outside air supplied from an outside-air fan 67. The heat-discharge outdoor heat exchanger 63 is a heat exchanger that radiates the heat of the heat-discharge refrigerant to the outside air to condense the heat-discharge refrigerant. Further, the heat-discharge outdoor heat exchanger 63 serves as a condenser for cooling and condensing the heat-discharge refrigerant in the heat-discharge refrigerant circulation circuit 3.

The outside-air fan 67 is an electric blower configured to blow the outside air toward the heat-discharge outdoor heat exchanger 63. The outside-air fan 67 is similar in basic configuration to the outside-air fan 21 that sends the outside air toward the air-conditioning outdoor heat exchanger 20. The number of revolutions (i.e., blowing capacity) of the outside-air fan 67 is controlled by a control voltage output from the controller 90.

Further, the heat-discharge outdoor heat exchanger 63 and the heat-discharge circulation section 61c are connected by a heat-discharge gas-phase pipe 62 and a heat-discharge liquid-phase pipe 64.

The gas-phase refrigerant pipe 62 is a refrigerant pipe that connects a refrigerant outlet side of the heat-discharge circulation section 61c and a refrigerant inlet side of the heat-discharge outdoor heat exchanger 63. The gas refrigerant evaporated in the heat-discharge circulation section 61c flows into the heat-discharge gas-phase refrigerant pipe 62. The outlet of the heat-discharge gas-phase pipe 62 is arranged above the inlet of the heat-discharge gas-phase pipe 62.

The liquid-phase refrigerant pipe 64 is a refrigerant pipe that connects a refrigerant inlet side of the heat-discharge circulation section 61c and a refrigerant outlet side of the heat-discharge outdoor heat exchanger 63. In the heat-discharge liquid-phase pipe 64, the heat-discharge refrigerant in the liquid-phase state condensed in the heat-discharge outdoor heat exchanger 63 or in the gas-liquid two-phase state having a relatively low dryness flows. The outlet of the heat-discharge liquid phase pipe 64 is located below the inlet of the heat-discharge liquid phase pipe 64.

A heat-discharge open-close valve 65 is arranged at a portion of the heat-discharge liquid-phase pipe 64, through which the heat-discharge refrigerant in a liquid state flows. The heat-discharge open-close valve 65 is a heat-discharge circulation shutter that closes the heat-discharge liquid phase pipe 64 to interrupt the circulation of the heat-discharge refrigerant in the heat-discharge refrigerant circulation circuit 3. The operation of the heat-discharge open-close valve 65 is controlled by a control voltage output from the controller 90.

Next, the heating refrigerant circulation circuit 5 will be described. The heating refrigerant circulation circuit 5 is a thermosiphon in which exhaust heat of the in-vehicle devices 50 to 53 is dissipated to the refrigerant. Refrigerant in the heat-discharge refrigerant circulation circuit 3 is the same type of refrigerant (R134a in the present embodiment) as the refrigerant circulating in the heat pump cycle 2. In the following descriptions, the refrigerant circulating in the heat-discharge refrigerant circulation circuit 5 is referred to as a heat-discharge refrigerant for clarification of the descriptions.

In the heating refrigerant circulation circuit 5, as shown in FIG. 1, the heating refrigerant is circulated between the heating circulation section 61b of the combined heat exchanger 61 and the refrigerant passages 50a to 53a formed in the in-vehicle devices 50 to 53. Further, the heating circulation section 61b of the combined heat exchanger 61 is arranged above the refrigerant passages 50a to 53a formed in the in-vehicle devices 50 to 53.

The heating circulation section 61b of the combined heat exchanger 61 is constructed by a plurality of refrigerant tubes (hereinafter, referred to as heating tubes 78) for circulating the heating refrigerant. The heating circulation section 61b serves as a condenser for cooling and condensing the heating refrigerant, in the heating refrigerant circulation circuit 5.

The refrigerant passages 50a to 53a provided in the in-vehicle devices 50 to 53 are formed in a casing that accommodates the components of each in-vehicle device or/and in a mounting base. These refrigerant passages 50a to 53a are heating endothermic portions that cause the heating refrigerant to absorb the exhaust heat generated by the in-vehicle device. The refrigerant passages 50a to 53a serve as evaporators for evaporating the heating refrigerant in the heating refrigerant circulation circuit 5.

More specifically, partition walls are arranged inside the in-vehicle devices 50 to 53 to separate an accommodating space for accommodating a heat generating portion and the like from the refrigerant passages 50a to 53a through which the heating refrigerant flows. The partition wall is made of a metal (e.g., aluminum in the present embodiment) having excellent heat conductivity. Therefore, the heating refrigerant flowing through the refrigerant passages 50a to 53a absorbs the heat generated by the heat generating portion of each in-vehicle device and evaporates, via the partition wall. Further, inside the refrigerant passages 50a to 53a, heat exchange fins or the like for promoting heat exchange between the heat generating portion of the in-vehicle devices and the heating refrigerant may be arranged.

In the heating refrigerant circulation circuit 5 of the present embodiment, a battery 50, a charging generator 51, a power control unit 52, and the vehicle-running electric motor 53 are arranged as the in-vehicle devices. That is, the in-vehicle devices according to the present embodiment are electric in-vehicle devices that are mounted on the electric vehicle, operated by being supplied with electric power, and generate heat during operation.

The battery 50 is a rechargeable secondary battery (e.g., a lithium ion battery in the present embodiment). The battery 50 supplies electric power stored therein to the electric in-vehicle devices such as the vehicle-running electric motor 53.

In the battery 50 of this type, at low temperature, the chemical reaction does not easily proceed, and it is difficult to obtain sufficient performance in charging and discharging. On the other hand, deterioration of the battery 50 easily proceeds at high temperature. Therefore, in the present embodiment, a usable temperature range of the battery 50 is set from 10 to 40 degrees Celsius as a temperature range in which the battery 50 can exhibit sufficient performance. Therefore, an upper limit in the usable temperature range of the battery 50 of the present embodiment is set at 40 degrees Celsius, for example.

The charging generator 51 is a charging device that stores generated electric power in the battery 50. A usable temperature range is set also for the charging generator 51, in which sufficient performance can be exhibited. An upper limit in the usable temperature range of the charging generator 51 is set at a value higher than the upper limit of the usable temperature range of the battery 50.

The power control unit 52 is a power distribution device that manages distribution of electric power supplied from the battery 50 to various electric in-vehicle devices. A usable temperature range is set also for the power control unit 52, in which sufficient performance can be exhibited. An upper limit in the usable temperature range of the power control unit 52 is set at a value higher than the upper limit of the usable temperature range of the charging generator 51.

The vehicle-running electric motor 53 outputs a driving force for vehicle running. A usable temperature range is set also for the vehicle-running electric motor 53, in which sufficient performance can be exhibited. An upper limit in the usable temperature range of the vehicle-running electric motor 53 is set at a value higher than the upper limit of the usable temperature range of the power control unit 52.

Further, in this embodiment, the refrigerant passages 50a to 53a provided in the in-vehicle devices 50 to 53 are connected in series. More specifically, the refrigerant passages 50a to 53a are connected such that the heating refrigerant flows in this order of a refrigerant passage 53a provided in the vehicle-running electric motor 53, a refrigerant passage 52a provided in the power control unit 52, a refrigerant passage 51a provided in the charging generator 51, and a refrigerant passage 50a provided in the battery 50.

Here, when the heating refrigerant flows through the respective refrigerant passages 50a to 53a, a pressure loss causes. Therefore, when the respective refrigerant passages 50a to 53a are connected in series, the refrigerant evaporation temperature in the refrigerant passages arranged on the downstream side of the refrigerant flow decreases. Therefore, in the present embodiment, the refrigerant evaporation temperature in the refrigerant passage 50a provided in the battery 50 can be set to a lowest refrigerant evaporation temperature.

Therefore, in the present embodiment, in a condition where the temperature of the battery 50 is maintained within a usable temperature range of the battery 50, the pressure coefficients (i.e., passage resistances) of the refrigerant passages 50a to 53a are set so that the temperatures of the other in-vehicle devices 51 to 53 are maintained in the respective usable temperature ranges. As the temperature of the battery 50, a management in-vehicle device temperature Tep detected by a management in-vehicle device temperature sensor 91h described later can be used.

Further, the heating circulation section 61b and the refrigerant passages 50a to 53a provided in the in-vehicle devices 50 to 53 are connected by a heating liquid pipe 54 and a heating gas pipe 55.

The heating gas pipe 55 is a refrigerant pipe located to connect the most downstream side of the refrigerant passages formed in the in-vehicle devices 50 to 53 (in the present embodiment, the outlet side of the refrigerant passage 50a formed in the battery 50) with a refrigerant inlet side of the heating circulation section 61b. In the heating gas pipe 55, the heating refrigerant in the vapor phase that has evaporated in the refrigerant passages 50a to 53a of the in-vehicle devices 50 to 53 flows. An outlet of the heating gas pipe 55 is arranged above an inlet of the heating gas pipe 55.

The heating liquid pipe 54 is a refrigerant pipe located to connect a refrigerant outlet side of the heating circulation section 61b with a most upstream side of the refrigerant passages of the in-vehicle devices 50 to 53 (in the present embodiment, the inlet side of the refrigerant passage 53a formed in the vehicle-running electric motor 53). In the heating liquid pipe 54, the heating refrigerant in the liquid-phase state condensed in the heating circulation section 61b or in the gas-liquid two-phase state having a relatively low dryness flows. An outlet of the heating liquid pipe 54 is arranged below an inlet of the heating liquid pipe 54.

A heating open-close valve 68 is arranged at a portion of the heating liquid pipe 54, through which the heating refrigerant in a liquid state flows. The heating open-close valve 68 is a heating circulation shutter capable of shutting off the circulation of the heating refrigerant by closing the heating liquid pipe 54. The basic structure of the heating open-close valve 68 is similar to that of the heat-discharge open-close valve 65 of the heat-discharge refrigerant circulation circuit 3.

Next, a detailed configuration of the combined heat exchanger 61 will be described with reference to FIGS. 3 to 11. Upward and downward arrows in these drawings indicate up and down directions when the vehicle thermal management system 1 is mounted on the electric vehicle.

The combined heat exchanger 61 is an integrated heat exchanger in which the recovery circulation section 61a of the heat pump cycle 2, the heating circulation section 61b of the heating refrigerant circulation circuit 5, and a heat-discharge circulation section 61c of the heat-discharge refrigerant circulation circuit 3 are integrally formed. In the combined heat exchanger 61, at least heat transfer (that is, heat exchange) between the cycle refrigerant and the heating refrigerant and heat transfer between the heat-discharge refrigerant and the heating refrigerant are possible to be performed.

Figure 3:
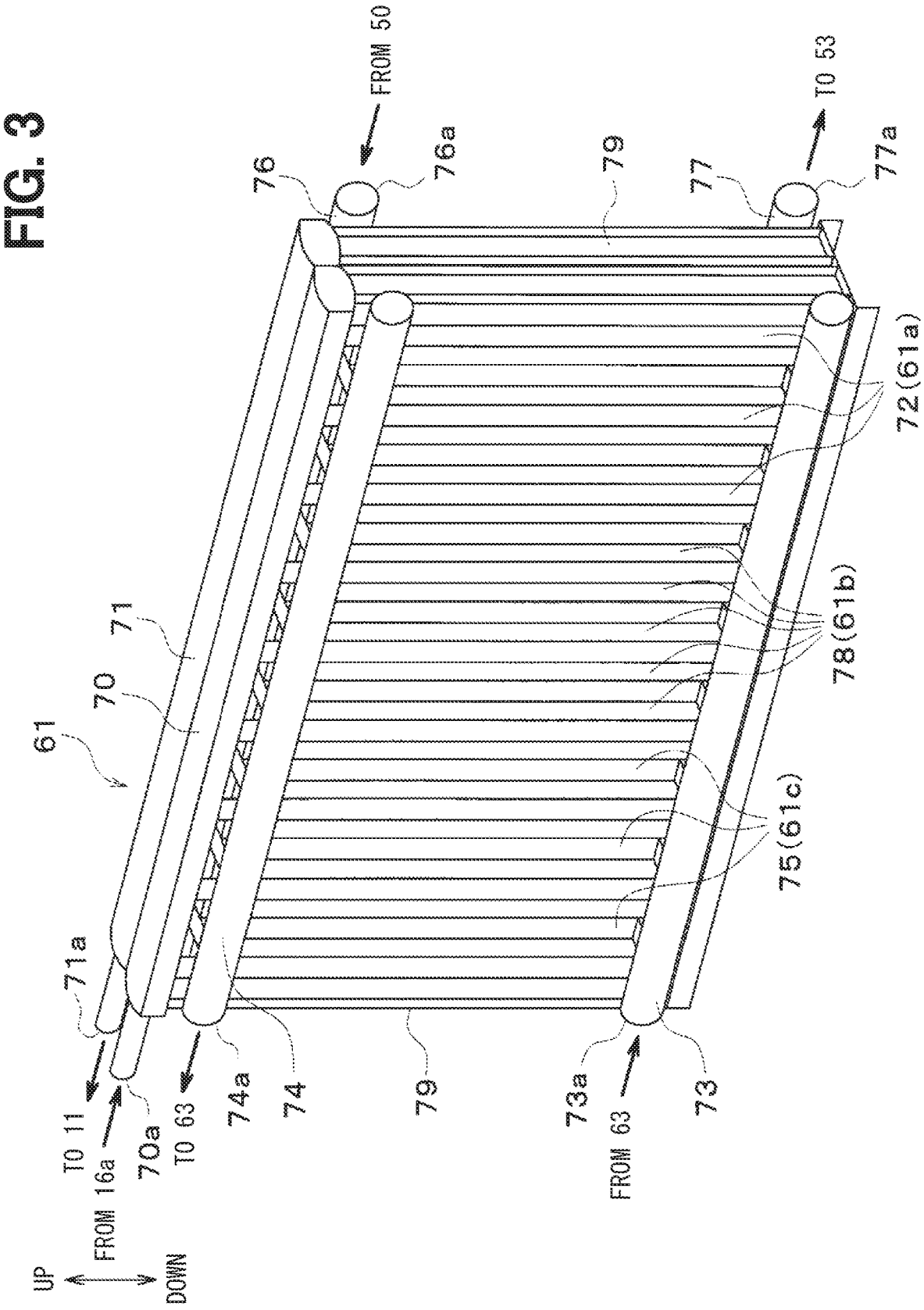
FIG. 3 is an external perspective view illustrating a combined heat exchanger according to the first embodiment.
Figure 4:
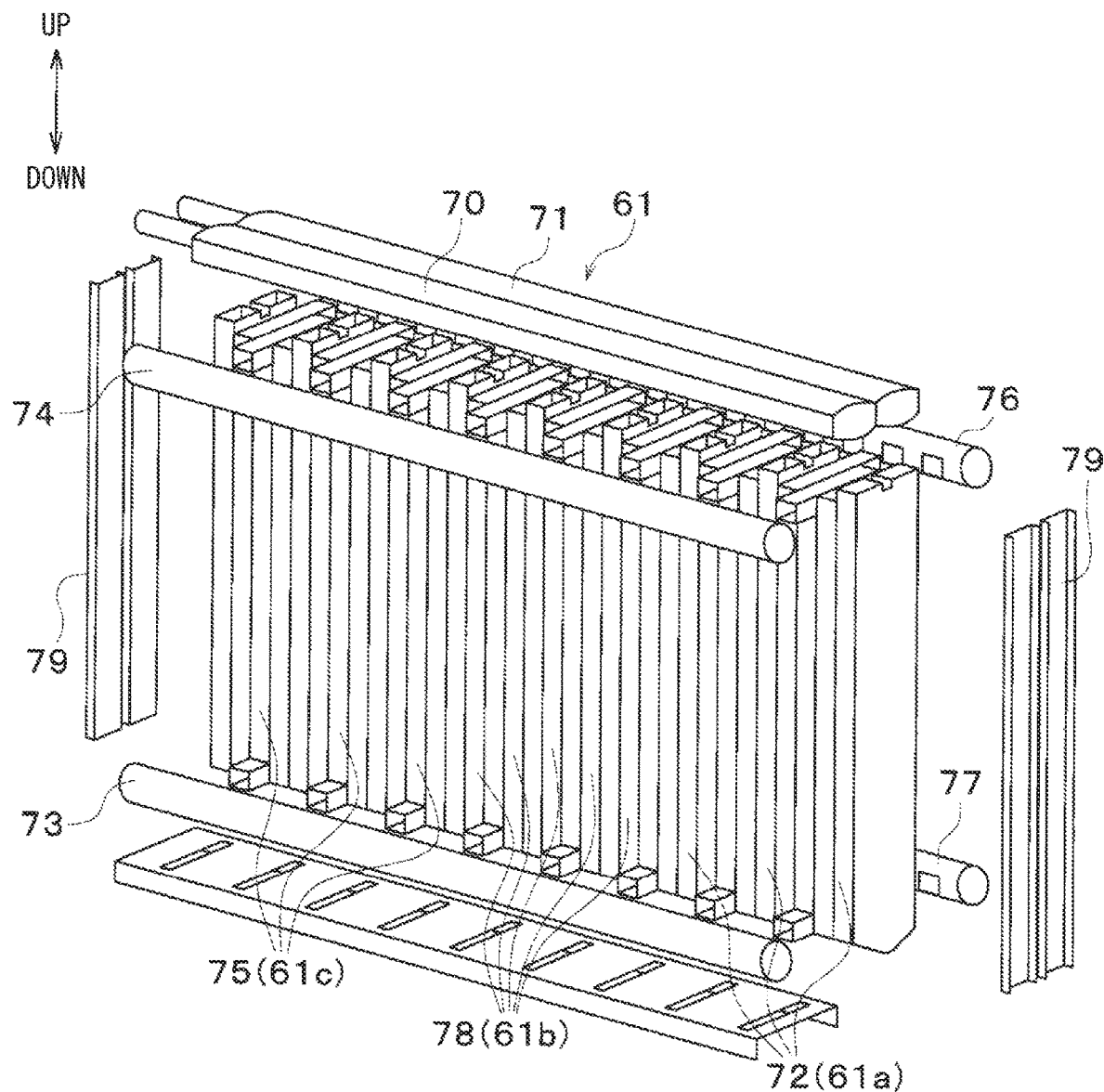
FIG. 4 is an exploded perspective view illustrating the combined heat exchanger according to the first embodiment.

More specifically, as shown in FIGS. 3 and 4, the combined heat exchanger 61 is a laminated-type heat exchanger in which the recovery tubes 72, the heating tubes 78, and the heat-discharge tubes 75 are stacked and arranged in a predetermined direction. In the laminated-type heat exchanger, by arranging tubes for passing different heat media adjacent to each other, heat can be transferred between different heat media via the adjacent tubes.

Therefore, in the combined heat exchanger 61, heat is transferred between the cycle refrigerant and the heating refrigerant by arranging at least a part of the recovery tubes 72 and the heating tubes 78 adjacent to each other. Further, by arranging at least a part of the heat-discharge tubes 75 and the heating tubes 78 adjacent to each other, heat transfer between the heat-discharge refrigerant and the heating refrigerant is made possible.

Figure 5:
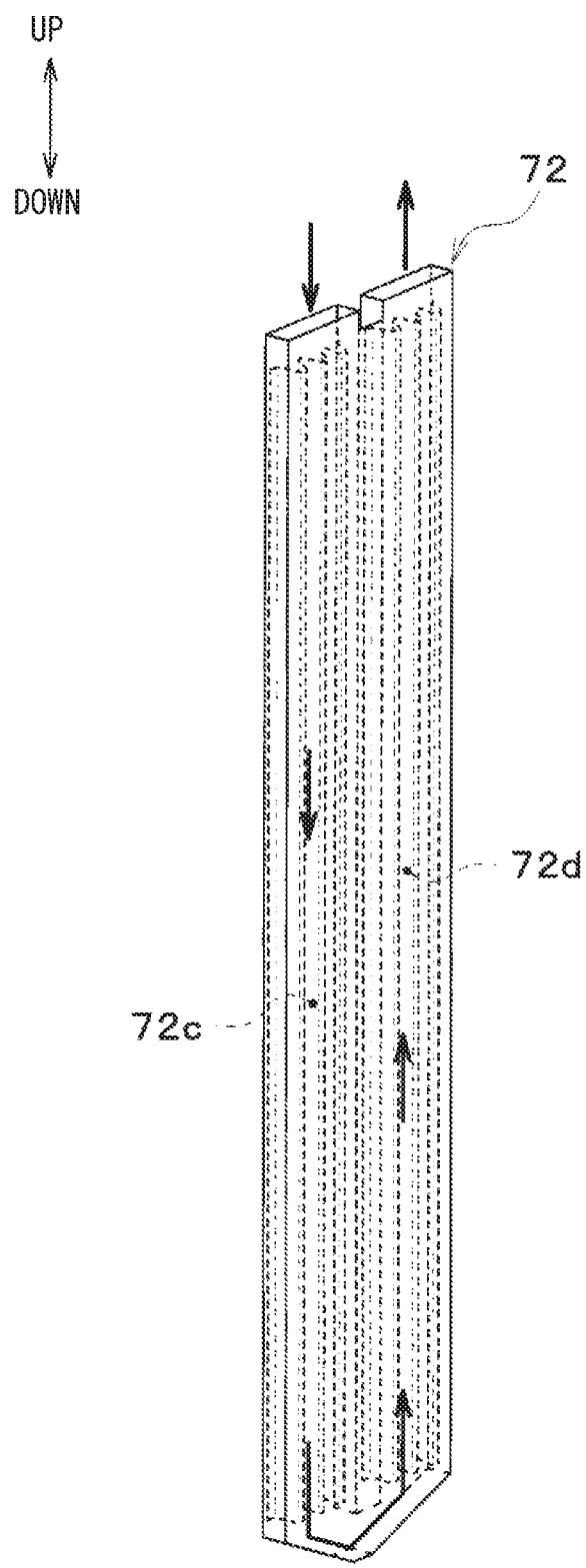
FIG. 5 is an enlarged perspective view illustrating a recovery tube of the combined heat exchanger according to the first embodiment.
Figure 6:
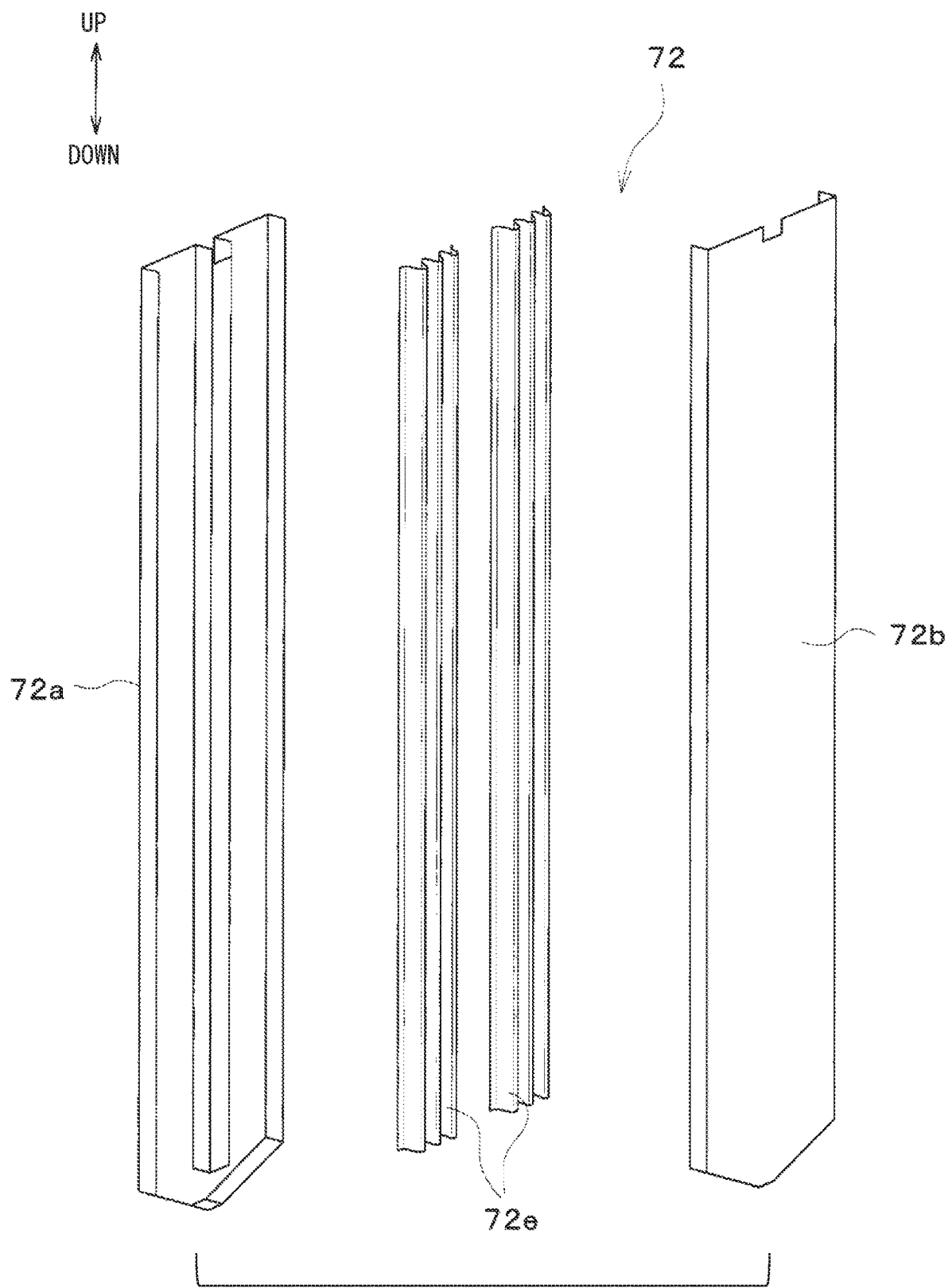
FIG. 6 is an enlarged exploded perspective view illustrating the recovery tube of the combined heat exchanger according to the first embodiment.

As shown in FIGS. 5 and 6, the recovery tube 72 is a so-called plate tube including a pair of metal plate members (in the present embodiment, a first plate member 72a and a second plate member 72b) which have a ridge-and-groove portion on their surfaces and are joined each other. The recovery tube 72 has a flat cross section perpendicular to the longitudinal direction. Inside the recovery tube 72, two rows of refrigerant passages having a flat cross section extending in the vertical direction are formed.

In the present embodiment, as shown in FIG. 5, an upstream portion of the refrigerant passage formed inside the recovery tube 72 in which the cycle refrigerant flows from an upper side to a lower side is referred to as an upstream passage portion 72c. On the other hand, a downstream portion of the refrigerant passage formed inside the recovery tube 72 in which the cycle refrigerant flows from the lower side to the upper side is referred to as a downstream passage portion 72d. The upstream passage portion 72c and the downstream passage portion 72d communicate on the lower side in the recovery tube 72.

An inner plate 72e is disposed inside the upstream passage portion 72c and the downstream passage portion 72d. The inner plate 72e is a metal plate member having a square wave cross-section. The inner plate 72e divides the refrigerant passage into multiple narrow passages so that the cycle refrigerant flows evenly in the upstream passage portion 72c and the downstream passage portion 72d. The inner plate 72e increases the area of the heat transfer surface and enhances the heat exchange performance. The inner plate 72e improves the strength of the recovery tube 72.

An inlet portion for allowing the refrigerant to flow into the recovery tube 72 is formed at an upper side of the upstream passage portion 72c in the recovery tube 72. As shown in FIGS. 3 and 4, a recovery distribution pipe 70 is connected to the inlets of the plurality of recovery tubes 72. The recovery distribution pipe 70 serves as a tank section that distributes the cycle refrigerant to the plurality of recovery tubes 72.

The recovery distribution pipe 70 is formed of a bottomed tubular metal extending in the stacking direction of the recovery tubes 72. The inlet of each recovery tube 72 is connected to the side surface of the recovery distribution pipe 70. The outlet side of the recovery open-close valve 16a of the heat pump cycle 2 is connected to the refrigerant inlet 70a formed at one end in the longitudinal direction of the recovery distribution pipe 70.

An outlet portion for allowing the refrigerant to flow out of the recovery tube 72 is formed at an upper side of the downstream passage portion 72d in the recovery tube 72. As shown in FIGS. 3 and 4, a recovery joint pipe 71 is connected to the outlets of the plurality of recovery tubes 72. The recovery joint pipe 71 serves as a tank section in which the cycle refrigerant from the plurality of recovery tubes 72 is joined.

The basic configuration of the recovery joint pipe 71 is similar to that of the recovery distribution pipe 70. The outlet of each recovery tube 72 is connected to the side surface of the recovery joint pipe 71. The intermediate pressure port 11b of the compressor 11 of the heat pump cycle 2 is connected to the refrigerant outlet 71a formed at one longitudinal end of the recovery joint pipe 71.

Therefore, in the recovery circulation section 61a, the cycle refrigerant distributed by the recovery distribution pipe 70 flows into the upstream passage portion 72c of each recovery tube 72. The cycle refrigerant flowing into the upstream passage portion 72c flows from the upper side to the lower side. The cycle refrigerant that has passed through the upstream passage portion 72c changes its flow direction on the lower side of the recovery tube 72 (that is, makes a U-turn), and flows into the downstream passage portion 72d.

The cycle refrigerant flowing into the downstream passage portion 72d flows from the lower side to the upper side in the downstream passage portion 72d. The cycle refrigerant flowing out of the downstream passage portion 72d is collected in the recovery joint pipe 71. The recovery refrigerant exchanges heat with the heating refrigerant flowing through the heating tubes 78 when the recovery refrigerant flows through the upstream passage portion 72c and the downstream passage portion 72d of the respective recovery tubes 72.

Figure 7:
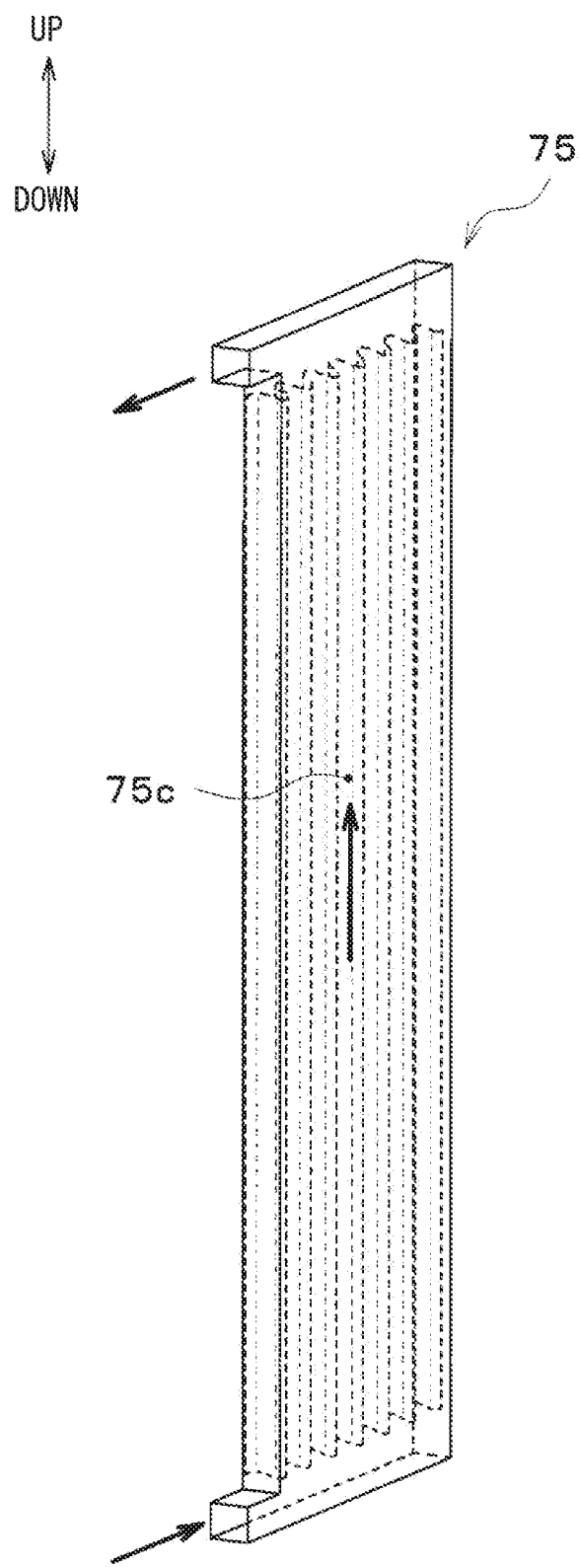
FIG. 7 is an enlarged perspective view illustrating a heat discharge tube of the combined heat exchanger according to the first embodiment.
Figure 8:
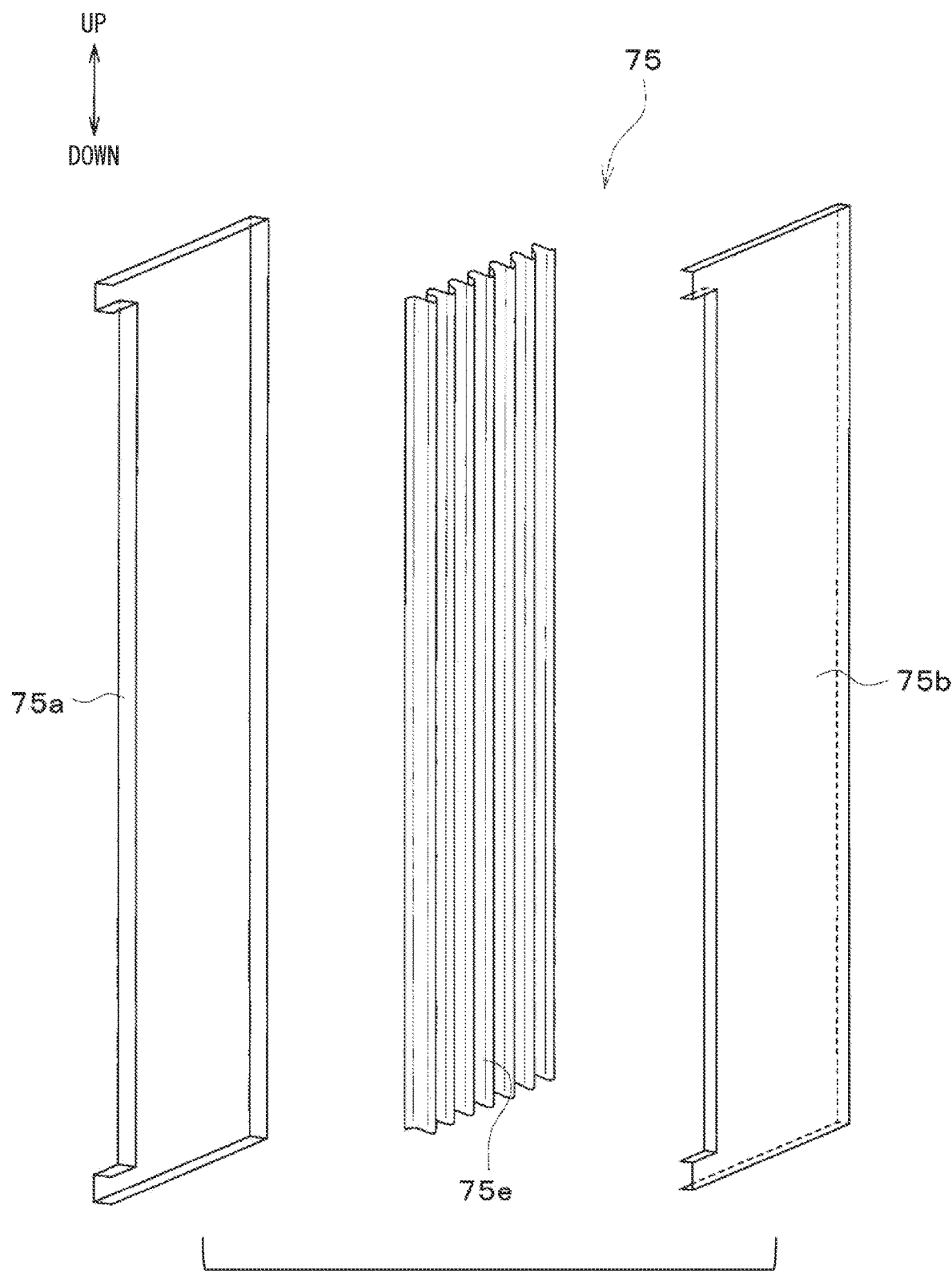
FIG. 8 is an enlarged exploded perspective view illustrating the heat discharge tube of the combined heat exchanger according to the first embodiment.

The heat-discharge refrigerant tube 75 is a plate tube similar to the recovery tube 72. As shown in FIGS. 7 and 8, the heat discharge tube 75 includes a pair of metal plate members (in the present embodiment, a first plate member 75a and a second plate member 75b) which have a ridge-and-groove portion on their surfaces and are joined each other. The heat-discharge tube 75 has a flat cross section perpendicular to the longitudinal direction.

As shown in FIG. 7, the heat-discharge tube 75 has therein a refrigerant passage 75c having a flat cross-section and extending in the up-down direction. The refrigerant passage 75c is formed so that the heat-discharge refrigerant flows from a lower side to an upper side of the heat-discharge tube 75. An inner plate 75e is arranged in the refrigerant passage 75c similarly to the recovery tube 72.

An inlet portion is formed on the lower side of the heat-discharge tube 75 to allow the heat-discharge refrigerant to flow into the heat-discharge tube 75. As shown in FIGS. 3 and 4, a heat-discharge distribution pipe 73 is connected to the inlets of the plurality of heat-discharge tubes 75. The heat-discharge distribution pipe 73 serves as a tank section that distributes the heat-discharge refrigerant to the plurality of heat-discharge tubes 75.

The basic configuration of the heat-discharge distribution pipe 73 is similar to that of the recovery distribution pipe 70. The refrigerant outlet side of the heat-discharge outdoor heat exchanger 63 is connected to the refrigerant inlet 73a formed at one longitudinal end of the heat-discharge distribution pipe 73.

An outlet portion is formed on an upper side of the heat-discharge tube 75 to allow the heat-discharge refrigerant to flow out of the heat-discharge tube 75. As shown in FIGS. 3 and 4, a heat-discharge joint pipe 74 is connected to the outlets of the plurality of heat-discharge tubes 75. The heat-discharge joint pipe 74 serves as a tank section in which the heat-discharge refrigerant flowing from the plurality of heat-discharge tubes 72 is joined.

The basic configuration of the heat-discharge joint pipe 74 is similar to that of the heat-discharge distribution pipe 73. A refrigerant inlet side of the heat-discharge outdoor heat exchanger 63 is connected to the refrigerant outlet 74a formed at one longitudinal end of the heat-discharge joint pipe 74.

Therefore, the heat-discharge refrigerant distributed by the heat-discharge distribution pipe 73 flows into respective heat-discharge tubes 75, in the heat-discharge circulation section 61c. The heat-discharge refrigerant flowing from the heat-discharge distribution pipe 73 into the heat-discharge tubes 75 flows through the heat-discharge tubes 75 from the lower side to the upper side, and collects in the heat-discharge joint pipe 74. The heat-discharge refrigerant exchanges heat with the heating refrigerant flowing through the heating tubes 78 when the heat-discharge refrigerant flows through the refrigerant passages 75c of the heat-discharge tubes 75.

Figure 9:
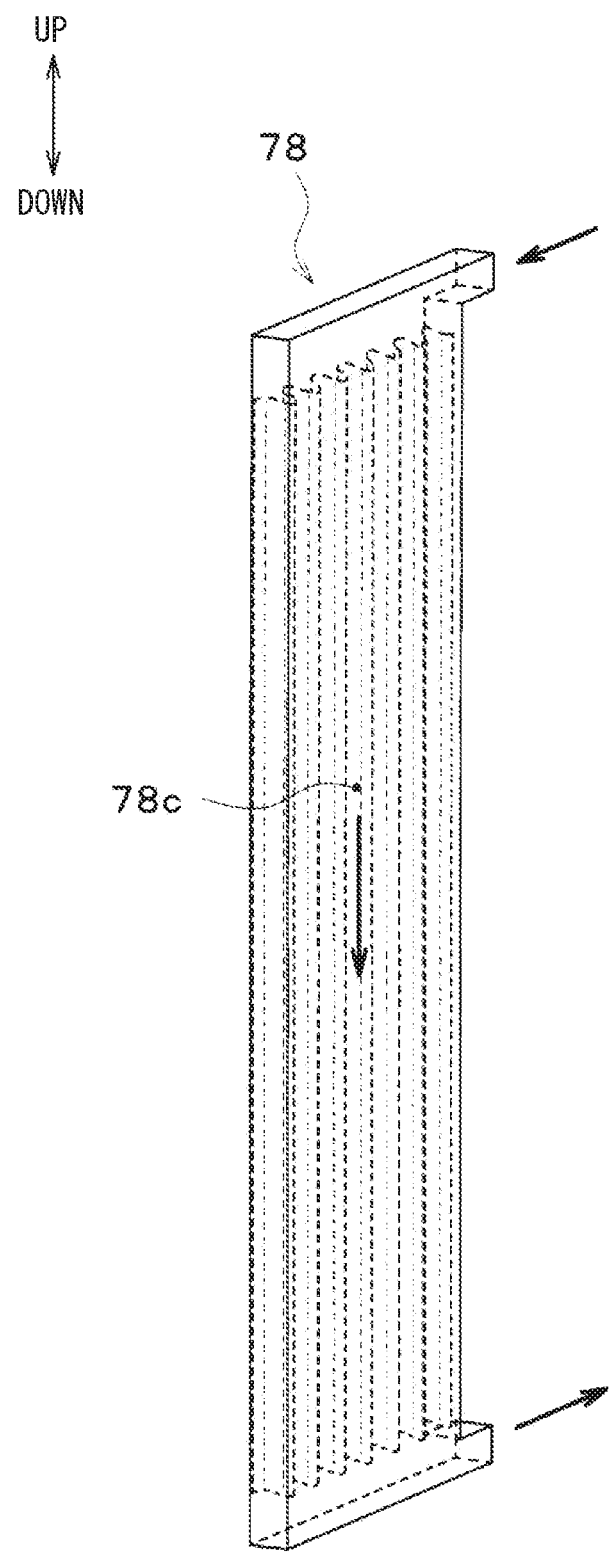
FIG. 9 is an enlarged perspective view illustrating a heating tube of the combined heat exchanger according to the first embodiment.
Figure 10:
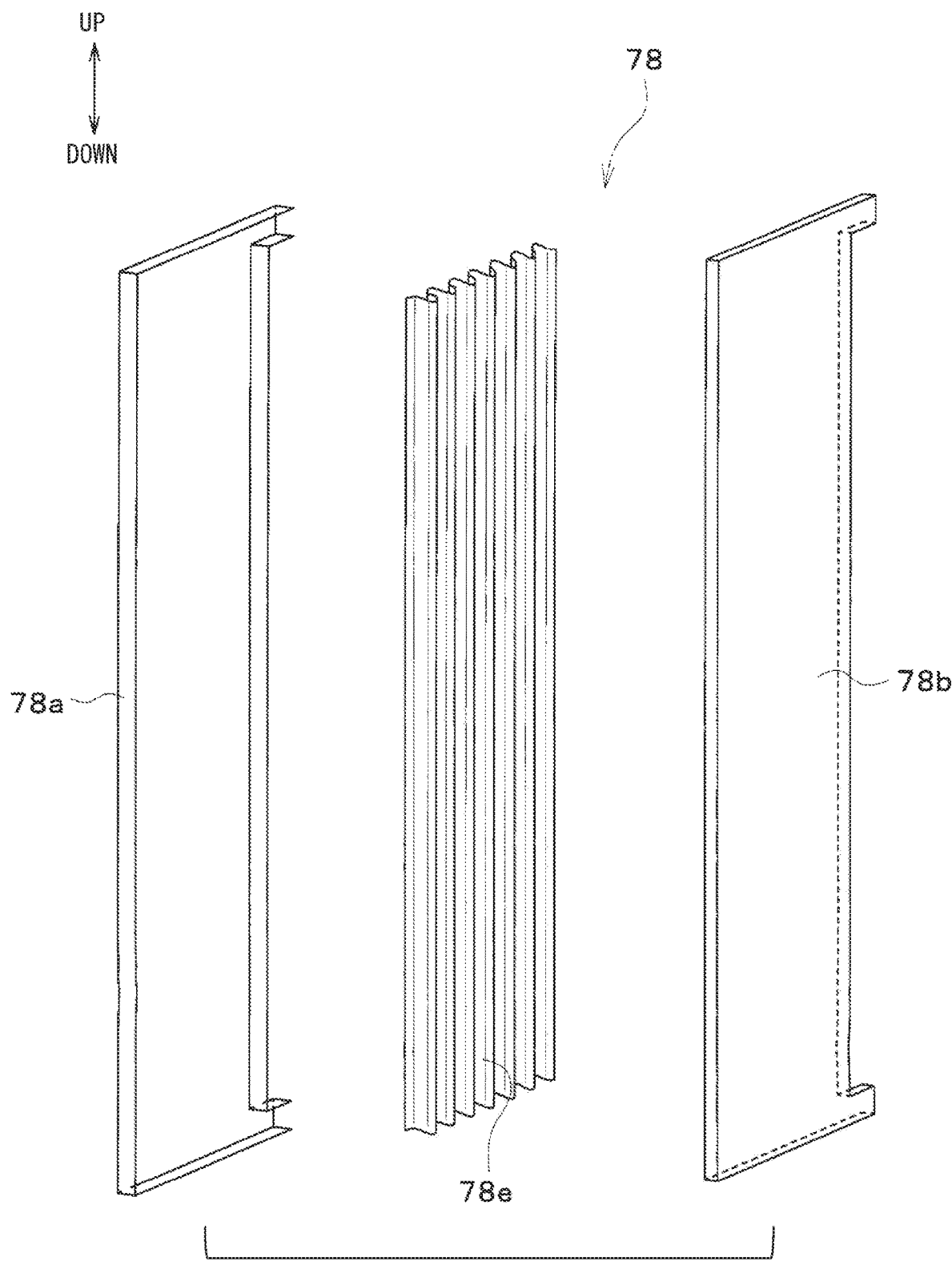
FIG. 10 is an enlarged exploded perspective view illustrating the heating tube of the combined heat exchanger according to the first embodiment.

The heating tube 78 is a plate tube similar to the recovery tube 72. As shown in FIGS. 9 and 10, the heating tube 78 includes a pair of metal plate members (in the present embodiment, a first plate member 78a and a second plate member 78b) which have a ridge-and-groove portion on their surfaces and are joined with each other. The basic configuration of the heating tube 78 is the same as that of the heat discharge tube 75.

Therefore, as shown in FIG. 9, a refrigerant passage 78c extending in the up-down direction is formed inside the heating tube 78. The refrigerant passage 78c is formed so that the heating refrigerant flows from the upper side to the lower side of the heating tube 78. An inner plate 78e is arranged in the refrigerant passage 78c similarly to the recovery tube 72.

As shown in FIGS. 3 and 4, a heating distribution pipe 76 is connected to the inlets of the plurality of heating tubes 78, located at an upper side. The basic configuration of the heating distribution pipe 76 is similar to that of the heat-discharge distribution pipe 73. The most downstream side of the refrigerant passage formed in the in-vehicle devices 50 to 53 of the heating refrigerant circulation circuit 5 (in this embodiment, an outlet side of the refrigerant passage 50a at which the battery 50 is provided) is connected to a refrigerant inlet 76a formed at the other longitudinal end of the heating distribution pipe 76.

A heating joint pipe 77 is connected to the outlets of the plurality of heating tubes 78 at a lower side of the plurality of heating tubes 78. The basic configuration of the heating joint pipe 77 is similar to that of the heat-discharge joint pipe 74. The most upstream side of the refrigerant passage formed in the in-vehicle devices 50 to 53 of the heating refrigerant circulation circuit 5 (in this embodiment, an inlet side of the refrigerant passage 53a at which the vehicle-running electric motor 53 is provided) is connected to the refrigerant outlet 77a formed at the other longitudinal end of the heating joint pipe 77.

Therefore, in the heating circulation section 61*b*, the heating refrigerant distributed by the heating distribution pipe 76 flows into respective heating tubes 78. The heating refrigerant flowing into the heating tubes 78 flows from the upper side to the lower side of the heating tubes 78 and collects in the heating joint pipe 77. When the heating refrigerant flows through the heating tubes 78, the heating refrigerant exchanges heat with the recovery refrigerant flowing through the recovery tubes 72 or the heat-discharge refrigerant flowing through the heat-discharge tubes 75.

Figure 11:
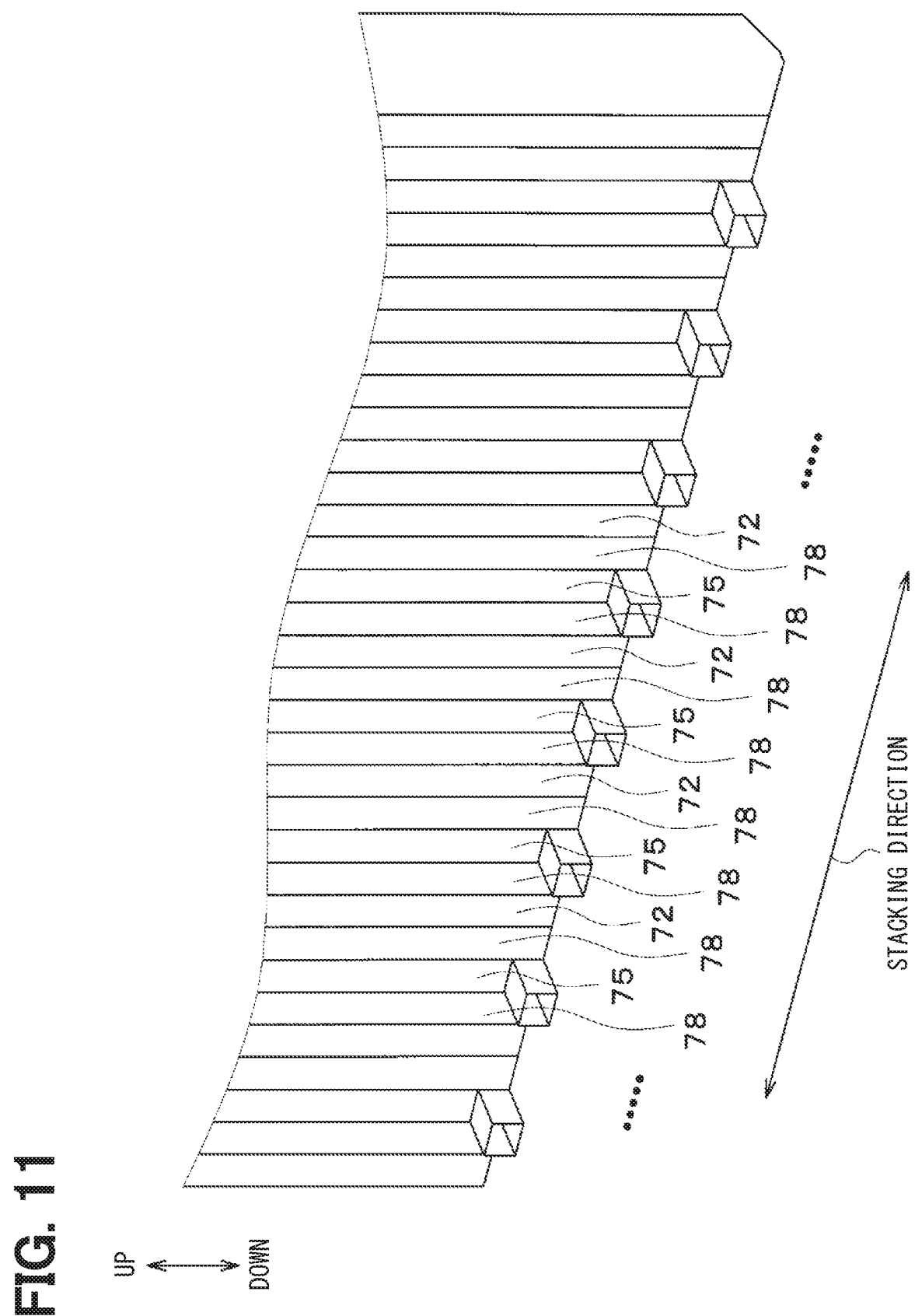
FIG. 11 is a diagram illustrating a stacking structure of the combined heat exchanger according to the first embodiment.

Furthermore, in the combined heat exchanger 61 of the present embodiment, as shown in FIG. 11, the recovery tubes 72, the heat-discharge tubes 75, and the heating tubes 78 are stacked regularly in the stacking direction. Specifically, except for both ends in the stacking direction of the combined heat exchanger 61, a lamination arrangement is set so as to have the repeat of the recovery tube 72→the heating tube 78→the heat-discharge tube 75→the heating tube 78→the recovery tube 72→the heating tube 78→the heat discharge tube 75→the heating tube 78→the recovery tube 72→the heating tube 78, in this order.

In other words, in the combined heat exchanger 61 of the present embodiment, the heating tubes 78 are arranged adjacent to two sides of the recovery tube 72 in the stacking direction, except for the two end sides in the stacking direction. Further, except for the two end sides in the stacking direction, the heating tubes 78 are arranged adjacent to two sides of the heat-discharge tube 75 in the stacking direction.

Therefore, the number of the recovery tubes 72 is less than or equal to the number of heating tubes 78. For example, the number of the heating tubes 78 is about twice of the number of the recovery tubes 72. Further, the number of the heat-discharge tubes 75 is less than or equal to the number of the heating tubes 78. For example, the number of the heating tubes 78 is about twice of the number of the heat-discharge tubes 75.

Further, in the combined heat exchanger 61, as shown in FIGS. 3 and 4, metal side plates 79 are provided at two ends of the stacked structure of the recovery tubes 72, the heat discharge tubes 75 and the heating tube 78, which are stacked in the stacking direction. The side plate 79 is a reinforcing member that improves the strength of the entire combined heat exchanger 61.

Each component of the above-described combined heat exchanger 61 is formed of the same kind of metal (e.g., aluminum in this embodiment) having excellent heat conductivity. The combined heat exchanger 61 is manufactured by integrating these components by brazing.

At this time, the flat surfaces of the recovery tubes 72, the heat-discharge tubes 75, and the heating tubes 78 are brazed and joined together. For this reason, in the combined heat exchanger 61, the respective refrigerants flowing through the tubes 72 to 78 are not mixed together inside the combined heat exchanger 61, and heat exchange of the respective refrigerants can be performed through the portions of the joint surfaces of the tubes 72 to 78.

Next, the interior air conditioning unit 30 will be described. The interior air conditioning unit 30 of the vehicle thermal management system 1 is an integrated unit of the plural components configured to blow the ventilation air having temperature-adjusted by the heat pump cycle 2 to an appropriate place in a vehicle compartment. The interior air conditioning unit 30 accommodates the air-conditioning blower 32, the indoor evaporator 23, the indoor condenser 12 and the like in an air passage provided inside the casing 31 that forms an outer shell of the interior air conditioning unit 30, as shown in FIGS. 1 and 2.

The casing 31 forms an air passage for ventilation air to be blown into the vehicle compartment. The casing 31 is a molded component made of resin having a certain degree of elasticity and an excellent strength (e.g., polypropylene). An inside-outside air switch device 33 is disposed on a most upstream side of the casing 31 in the ventilation air flow. The inside-outside air switching device 33 switches and introduces inside air (that is, air inside the vehicle compartment) and outside air (that is, air outside the vehicle compartment).

The inside-outside air switch device 33 includes an inside-outside air switch door that continuously adjusts an opening area of an inside-air introduction port for introducing the inside air into the casing 31 and an opening area of an outside-air introduction port for introducing the outside air. Thus, the inside-outside air switch device 33 can change an introduction ratio between an introduction amount of the inside air and an introduction amount of the outside air. The inside-outside air switch door is driven by an electric actuator for the inside-outside air switch door. Operation of the electric actuator is controlled in accordance with a control signal output from the controller 90.

The air-conditioning blower 32 is disposed downstream of the inside-outside air switch device 33 in the ventilation air flow. The air-conditioning blower 32 blows air sucked through the inside-outside air switch device 33 toward the inside of the vehicle compartment. The air-conditioning blower 32 is an electric blower that drives a centrifugal multi-blade fan with an electric motor. The number of revolutions (that is, the blowing capacity) of the air-conditioning blower 32 is controlled according to a control voltage output from the controller 90.

The indoor evaporator 23 and the indoor condenser 12 are disposed in this order downstream of the air-conditioning blower 32 in the ventilation air flow. In other words, the indoor evaporator 23 is disposed upstream of the indoor condenser 12 in the ventilation air flow. The casing 31 has therein a cool air bypass passage 35 that allows the ventilation air having passed through the indoor evaporator 23 to bypass the indoor condenser 12 and flow downstream.

An air mixing door 34 is disposed downstream of the indoor evaporator 23 in the ventilation air flow and upstream of the indoor condenser 12 in the ventilation air flow. The air mixing door 34 regulates the ventilation air after passing through the indoor evaporator 23 and adjusts an air volume ratio between an air volume passing through the indoor condenser 12 and an air volume passing through the cool air bypass passage 35.

The air mixing door 34 is driven by an electric actuator for driving the air mixing door. Operation of the electric actuator is controlled in accordance with a control signal output from the controller 90.

A mixing space 36 is disposed downstream of the indoor condenser 12 in the ventilation air flow and mixes the ventilation air heated by the indoor condenser 12 and the ventilation air passing through the cool air bypass passage 35 without being heated by the indoor condenser 12. Further, opening holes are provided at a most downstream portion of the casing 31 in a flow of the ventilation air so that the ventilation air (air-conditioned wind) mixed in the mixing space 36 is blown into the vehicle compartment through the opening holes.

The opening holes include a face opening hole, a foot opening hole, and a defroster opening hole (any of them is not shown). The face opening hole is an opening hole for blowing the air-conditioned wind toward an upper body of an occupant in the vehicle compartment. The foot opening hole is an opening hole for blowing the air-conditioned wind toward a foot of the occupant. The defroster opening hole is an opening hole for blowing the air-conditioned wind toward an inner surface of a vehicle front window glass.

The face opening hole, the foot opening hole, and the defroster opening hole are respectively connected to a face blowing port, a foot blowing port, and a defroster blowing port (not shown) provided in the vehicle compartment through a duct defining an air passage.

Therefore, the air mixing door 34 can adjust the air volume ratio between the air volume passing through the indoor condenser 12 and the air volume passing through the cool air bypass passage 35, thereby adjusting a temperature of the air-conditioned wind mixed in the mixing space 36. Then, it is possible to adjust the temperature of the ventilation air (air-conditioned wind) to be blown from each outlet into the vehicle compartment.

Further, a face door, a foot door, and a defroster door (none of which are shown) are arranged on upstream sides of the face opening hole, the foot opening hole, and the defroster opening hole in the air flow direction. The face door adjusts an opening area of the face opening hole. The foot door adjusts an opening area of the foot opening hole. The defroster door adjusts an opening area of the defroster opening hole.

The face door, the foot door, and the defroster door configure a blowing mode switching device for switching a blowing port through which the air-conditioned wind is blown out. The face door, the foot door, and the defroster door are connected to an electric actuator for driving the blowing port mode door through a link mechanism or the like, and are rotationally operated in conjunction with each other. Operation of the electric actuator is controlled in accordance with a control signal output from the controller 90.

Next, an arrangement of the vehicle thermal management system 1 when being mounted on the electric vehicle will be described. In the electric vehicle of the present embodiment, a driving device compartment 81 is arranged in front of a passenger compartment 80 (i.e., vehicle compartment) in which an occupant rides. The driving device compartment 81 is a space outside of the passenger compartment 80, in which at least a part of a driving device (e.g., vehicle-running electric motor 53) that outputs a driving force for running the vehicle is disposed. The driving device compartment 81 corresponds to a so-called engine room in an ordinary engine vehicle that obtains a driving force for running the vehicle from an internal combustion engine (engine).

The passenger compartment 80 and the driving device compartment 81 are separated by a partition wall 82. The partition wall 82 corresponds to a so-called dash panel or a soundproof and fireproof partition member used as a firewall in a normal engine vehicle.

The components of the heat pump cycle 2 other than the indoor condenser 12, the indoor evaporator 23, etc., the components of the heat-discharge refrigerant circulation circuit 3, and the components of the heating refrigerant circulation circuit 5 are disposed in the driving device chamber 81. Of these, the outdoor heat exchanger 20 for air conditioning of the heat pump cycle 2 and the heat-discharge outdoor heat exchanger 63 of the heat-discharge refrigerant circulation circuit 3 are arranged in the driving device compartment 81 on the vehicle front side.

A grill for introducing outside air into the driving device compartment 81 is arranged at the front most part of the vehicle in the driving device compartment 81. Therefore, when the vehicle is traveling, the traveling wind (that is, the outside air) flowing into the driving device compartment 81 via the grill is supplied to the air-conditioning outdoor heat exchanger 20 and the heat-discharge outdoor heat exchanger 63.

Furthermore, the air-conditioning outdoor heat exchanger 20 and the heat-discharge outdoor heat exchanger 63 of the present embodiment are arranged in parallel with respect to the flow direction of the outside air. FIG. 1 illustrates an example in which the air-conditioning outdoor heat exchanger 20 and the heat-discharge outdoor heat exchanger 63 are arranged in the up-down direction, but of course, the air-conditioning outdoor heat exchanger 20 and the heat-discharge outdoor heat exchanger 63 may be arranged in a right-left direction.

The interior air conditioning unit 30 is disposed inside an instrument panel at the front of the passenger compartment 80. Hence, the indoor condenser 12, the indoor evaporator 23, and the like of the heat pump cycle 2, which are housed in the casing 31 of the interior air conditioning unit 30 are also arranged in the passenger compartment 80.

Next, an electric controller of the vehicle thermal management system 1 will be described with reference to FIG. 12. The controller 90 includes a known microcomputer including CPU, ROM and RAM, and peripheral circuits. The controller 90 performs various calculations and processes based on control programs stored in the ROM, and controls the operation of various control-object devices connected to an output side of the controller 90.

Figure 12:
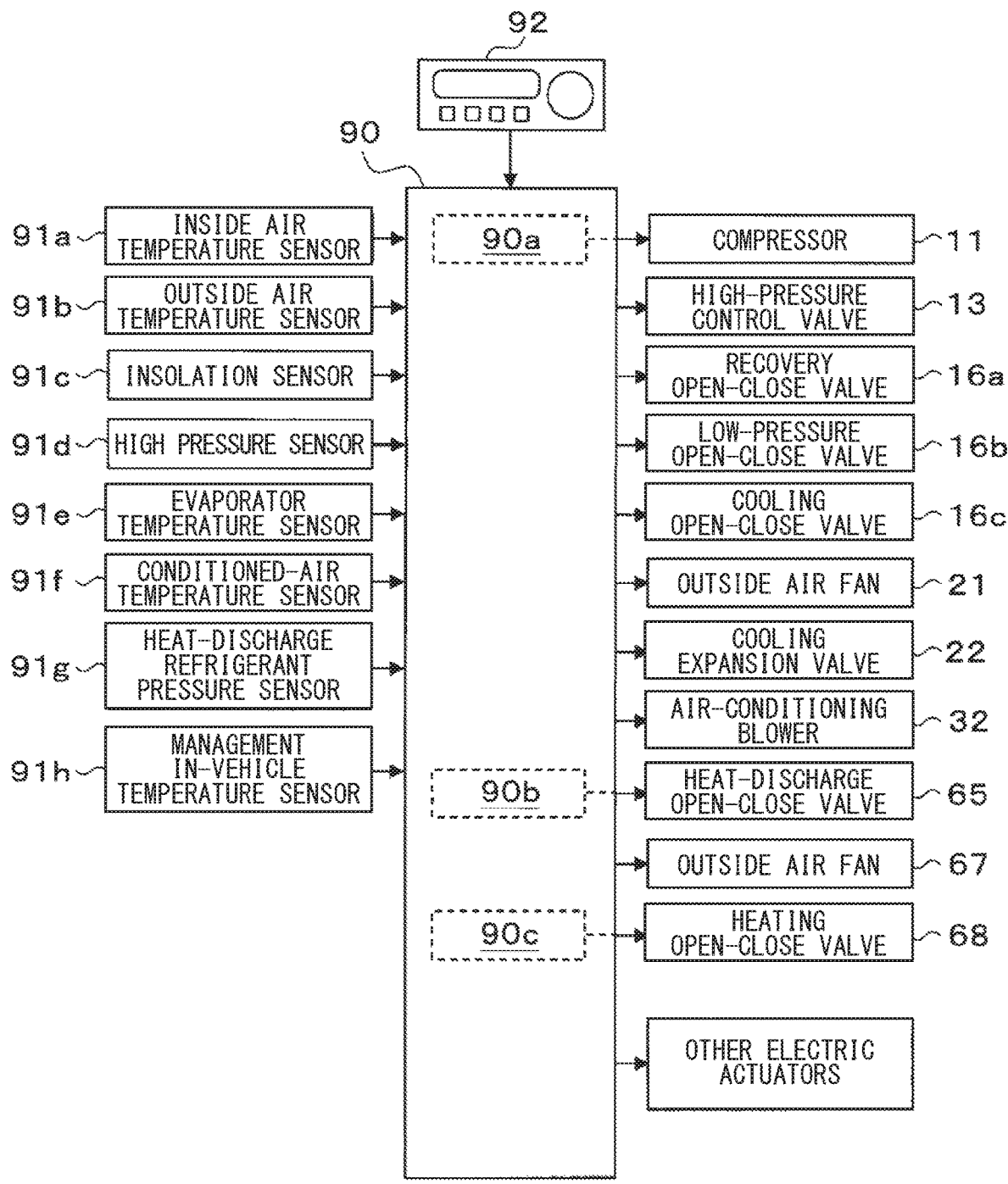
FIG. 12 is a block diagram illustrating an electric controller of the vehicle thermal management system according to the first embodiment.

As shown in FIG. 12, an input side of the controller 90 is connected with a control sensor group that includes an inside air temperature sensor 91a, an outside air temperature sensor 91b, an insolation sensor 91c, a high pressure sensor 91d, an evaporator temperature sensor 91e, a conditioned air temperature sensor 91f, a management in-vehicle temperature sensor 91h, a heat-discharge refrigerant pressure sensor 91g and the like. Detection signals of the control sensor group are input to the controller 90.

The inside air temperature sensor 91a is an inside air temperature detector that detects an interior temperature Tr (inside air temperature) of the vehicle compartment. The outside air temperature sensor 91b is an outside air temperature detector that detects an exterior temperature Tam (outside air temperature) of the vehicle compartment. The insolation sensor 91c is an insolation amount detector that detects an insolation amount As entering the vehicle compartment. The high pressure sensor 91d is a refrigerant pressure detector that detects a high-pressure cycle refrigerant pressure Pd that is a pressure of the cycle refrigerant in a flow channel from a discharge port side of the compressor 11 to an inlet side of the cooling expansion valve 22 or an inlet side of the high-pressure control valve 13.

The evaporator temperature sensor 91e is an evaporator temperature detector that detects a refrigerant evaporation temperature (evaporator temperature) Tefin of the cycle refrigerant in the indoor evaporator 23. The conditioned-air temperature sensor 91f is a conditioned-air temperature detector that detects an air temperature TAV of the ventilation air blown from the mixing space 36 to the vehicle compartment.

The management in-vehicle device temperature sensor 91h is an in-vehicle device temperature detector for management that detects a management in-vehicle device temperature Tep which is a temperature of a predetermined in-vehicle device for management among the in-vehicle devices 50 to 53. In the present embodiment, the battery 50 having the lowest temperature in a usable temperature range among the temperatures of the in-vehicle devices 50 to 53 is used as the predetermined in-vehicle device for management.

More specifically, the management in-vehicle device temperature sensor 91h is configured by a plurality of temperature sensors that detect temperatures at a plurality of locations of the predetermined in-vehicle device for management (i.e., battery 50 in this embodiment). Further, in the controller 90, an average value of the detected values of the temperature sensors is set as the management in-vehicle device temperature Tep.

The heat-discharge refrigerant pressure sensor 91g is a heat-discharge refrigerant pressure detector that detects the heat-discharge refrigerant pressure Prh, which is the pressure of the heat-discharge refrigerant circulating in the heat-discharge refrigerant circulation circuit 3. More specifically, the heat-discharge refrigerant pressure sensor 91g of the present embodiment detects the pressure of the heat-discharge gas refrigerant flowing in the heat-discharge gas pipe 62.

Furthermore, the input side of the controller 90 is connected to an operation panel 92 located near the instrument panel in the front part of the vehicle compartment. The operation panel 92 includes various operation switches, and operation signals output from the operation switches are input to the controller 90.

The various operation switches of the operation panel 92 include an air-conditioning operation switch, an air volume setting switch and a temperature setting switch. The air-conditioning operation switch is an air-conditioning operation requesting portion for an occupant to request an air conditioning of the vehicle compartment. The air volume setting switch is an input portion for the occupant to manually set an air volume of the air-conditioning blower 32. The temperature setting switch is a temperature setting portion for setting a set temperature Tset of the vehicle compartment.

The controller 90 is integrally constituted by control units that control operations of the various control-object devices connected to the output side of the controller 90. That is, configurations (hardware and software) of the controller 90, which control operations of the respective control-object devices, are the controllers or control unis controlling the operations of the corresponding control-object devices.

For example, a part (specifically, hardware and software) of the controller 90 that controls the operation of the compressor 11 of the heat pump cycle 2 is a compressor control unit 90a. Further, a control part for controlling the operation of the heat-discharge circulation shutoff unit (e.g., heat-discharge open-close valve 65 in the present embodiment) constitutes a heat-discharge circulation control unit 90b. Further, a control part for controlling the operation of the heating circulation shut-off unit (in this embodiment, the heating open-close valve 68) constitutes a heating circulation control unit 90c. Of course, these control parts may be made of controllers separated from one another.

Next, an operation of the vehicle thermal management system 1 of the present embodiment in the above configurations will be described. The vehicle thermal management system 1 performs a function of air-conditioning of the vehicle compartment in the electric vehicle and a function of releasing exhaust heat to outside air from various in-vehicle devices 50-53 that generate heat during operation. That is, the controller 90 of the vehicle thermal management system 1 controls operations of various control-object devices so as to adjust the temperature in the vehicle compartment to a desired temperature for the occupant and to maintain the temperatures of the in-vehicle devices 50 to 53 within their respective usable temperature ranges.

Figure 13:
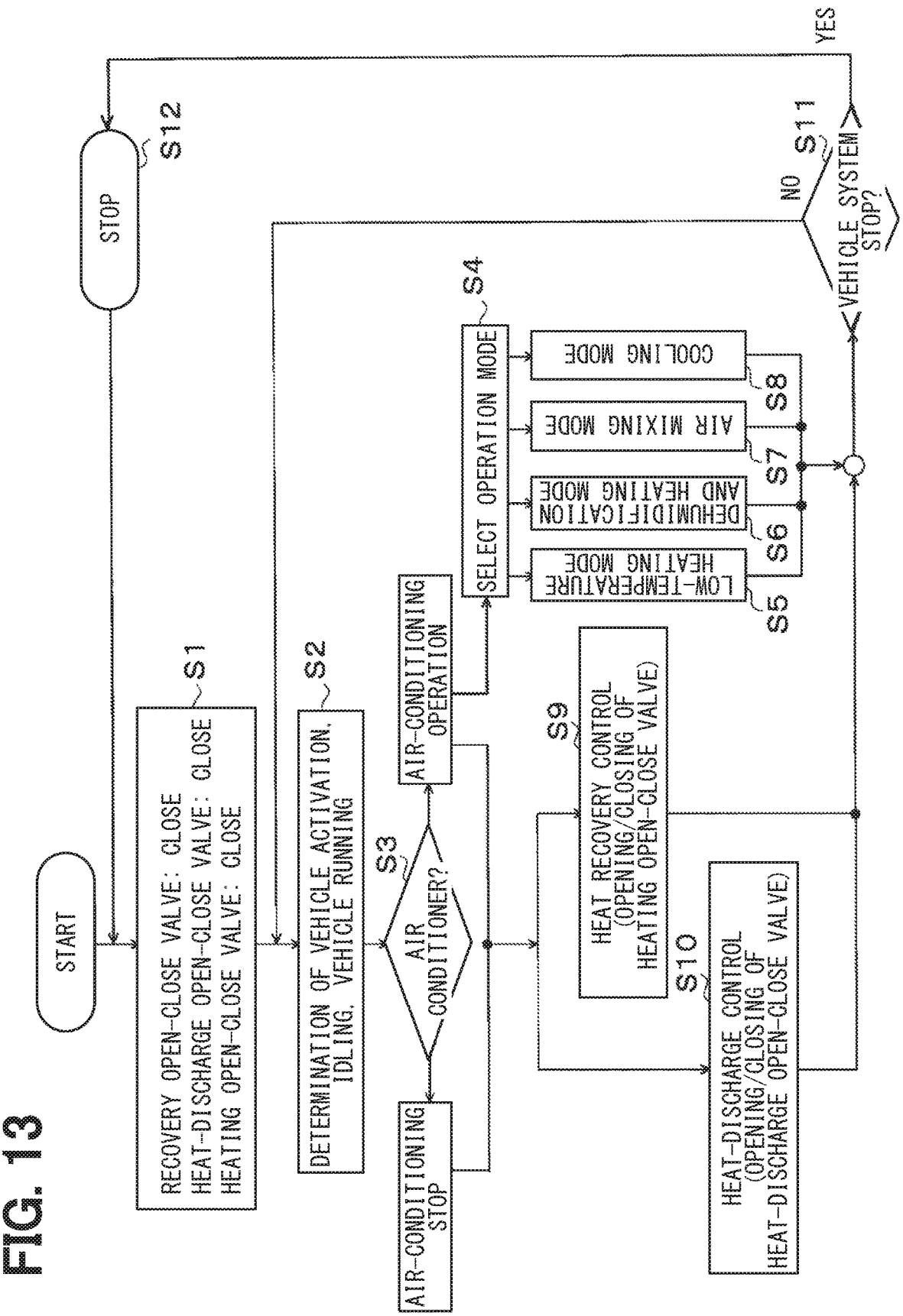
FIG. 13 is an explanatory diagram showing an outline of a control flow of the vehicle thermal management according to the first embodiment.

FIG. 13 shows an outline of a control flow executed by the controller 90. In this control flow, when the entire system of the vehicle is started, the recovery open-close valve 16a of the heat pump cycle 2 is closed for initialization. Further, the heat-discharge open-close valve 65 of the heat-discharge refrigerant circulation circuit 3 is closed. Further, the heating open-close valve 68 of the heating refrigerant circulation circuit 5 is closed (step S1 in FIG. 13).

Subsequently, a current operating state of the vehicle, for example, whether the vehicle is at time of activation, time of idling, or time of running, is determined (at step S2 in FIG. 13). Such determination of the operating state of the vehicle is performed based on detection signals of the control sensor group connected to the controller 90. Then, it is determined whether or not to an air conditioner is operating, that is, whether or not an air conditioning operation is performed (step S3 in FIG. 13). In the present embodiment, when the air-conditioning operation switch of the operation panel 92 is turned on (ON), it is determined that the air-conditioning operation is performed.

When it is determined at step S3 that the air-conditioning operation is performed, a control for performing air conditioning in the vehicle compartment is executed. In this control, an operation mode for air conditioning is selected (at step S4 in FIG. 13), and for example, an operation of the heat pump cycle 2 is controlled according to the selected operation mode (at steps S5 to S8 in FIG. 13).

Further, in this control flow, the heat recovery control (step S9 of FIG. 13) and the heat disposal control (step S10 of FIG. 13) are executed in parallel regardless of the determination result of step S3. The heat recovery control is a control for allowing the heating refrigerant to absorb the exhaust heat of the in-vehicle devices 50 to 53 and recover the exhaust heat. The heat disposal control is a control for discharging the recovered exhaust heat of the in-vehicle devices 50 to 53 to the outside air.

In the heat recovery control, the opening/closing control of the heating open-close valve 68 is performed so that the temperature of the battery 50 (that is, the management in-vehicle device temperature Tep detected by the management in-vehicle device temperature sensor 91h) is maintained in the usable temperature range of the battery 50. In the heat disposal control (i.e., heat-discharge control), the opening/closing control of the heat-discharge open-close valve 65 is performed so that the heat-discharge refrigerant pressure Prh detected by the heat-discharge refrigerant pressure sensor 91g is maintained within a predetermined reference pressure range.

Then, at step S11, it is determined whether or not the entire vehicle system is stopped. When it is determined at step S11 that the entire system of the vehicle is not stopped, the process returns to step S2, and the same control flow is repeated again. If it is determined at step S11 that the entire vehicle system is stopped, the vehicle thermal management system 1 is stopped (step S12 in FIG. 13).

Next, the air conditioning control at steps S4 to S8 of FIG. 13 will be explained. In the air conditioning control, the controller 90 calculates a target blowing temperature TAO of air to be blown to the vehicle compartment, based on detection signals from the control sensor group and operation signals from the operation panel 92. The target blowing temperature TAO is calculated by the following formula F1.

$$TAO = Kset \times Tset - Kr \times Tr - Kam \times Tam - Ks \times As + C \qquad (\text{F1})$$

Tset is a set temperature set by the temperature setting switch. Tr is an inside air temperature detected by the inside air temperature sensor 91a. Tam is an outside air temperature detected by the outside air temperature sensor 91b. Ts is a solar radiation amount detected by the insolation sensor 91c. Kset, Kr, Kam, and Ks are control gains, and C is a constant for correction.

Further, the controller 90 switches the operation mode based on the target blowing temperature TAO, the detection signals and the operation signals.

More specifically, the controller 90 switches to a cooling mode in a state where the vehicle compartment is in a cooling process when the outside temperature is relatively high as in the summer. In addition, an air mixing mode is switched when the temperature in the vehicle compartment is in a stable state after the temperature inside the vehicle compartment is decreased in summer, or in an intermediate period when the outside temperature is an intermediate temperature between the summer and the winter, such as in spring or autumn. Further, when the humidity is relatively high and the outside air temperature is slightly low, such as in the intermediate period or winter, a dehumidification and heating mode is switched. Further, when the outside temperature is extremely low in winter, a low-temperature heating mode is set. The operation in each operation mode will be described below.

(a) Cooling Mode

In the cooling mode, the controller 90 controls the high-pressure control valve 13 to be in a fully open state and controls the cooling expansion valve 22 to be in a throttled state to have a pressure reducing action. Further, the controller 90 opens the recovery open-close valve 16a, opens the low-pressure open-close valve 16b, and closes the cooling open-close valve 16c.

As a result, in the cooling mode of the heat pump cycle 2, the cycle refrigerant circulates in this order of the discharge port 11c of the compressor 11 (→the indoor condenser 12→the high-pressure control valve 13)→the gas-liquid separator 14→the intermediate-pressure fixed throttle 17b and the recovery expansion valve 60→the recovery open-close valve 16a→the recovery circulation section 61a of the combined heat exchanger 61→the intermediate pressure port 11b of the compressor 11. Further, the refrigerant cycle is configured such that the refrigerant circulates in this order of the discharge port 11c of the compressor 11 (→the indoor condenser 12→the high-pressure control valve 13)→the gas-liquid separator 14→the low pressure open-close valve 16b→the outdoor heat exchanger 20 for air conditioning→the cooling expansion valve 22→the indoor evaporator 23→the accumulator 24→the suction port 11a of the compressor 11.

In the cycle configuration, the controller 90 determines control signals or the like output to the various control-object devices connected to the output side of the controller 90, and the controller 90 controls the operation of the various control-object devices.

For example, the controller 90 determines a control signal output to the compressor 11 such that the refrigerant evaporation temperature Tefin detected by the evaporator temperature sensor 91e becomes equal to a target evaporation temperature TEO. The target evaporation temperature TEO is determined based on the target blowing temperature TAO with reference to a control map for the cooling mode stored in advance in the controller 90.

Specifically, in the control map, the target evaporation temperature TEO increases in accordance with an increase in the target blowing temperature TAO so that the ventilation air temperature TAV detected by the conditioned air temperature sensor 91f approaches the target blowing temperature TAO. Further, the target evaporation temperature TEO is determined to be within a range in which frosting of the indoor evaporator 23 can be reduced (specifically, 1 degree Celsius or more).

The controller 90 determines a control voltage output to the air-conditioning blower 32 based on the target blowing temperature TAO with reference to a control map which is stored in advance in the controller 90. More specifically, in the control map, an air blowing volume of the air-conditioning blower 32 is maximized in an extremely low temperature range (maximum cooling range) of the target blowing temperature TAO and an extremely high temperature range (maximum heating range) of the target blowing temperature TAO. The air blowing volume is decreased as the target blowing temperature TAO approaches an intermediate temperature range.

The controller 90 determines a control signal output to the cooling expansion valve 22 such that a degree of sub-cooling of the refrigerant flowing into the cooling expansion valve 22 approaches a target degree of sub-cooling. The target degree of sub-cooling is determined such that a coefficient of performance (COP) of the cycle approaches a maximum value.

The controller 90 also determines a control signal output to the electric actuator for driving the air mixing door such that the cool air bypass passage 35 is fully opened and an air passage of the indoor condenser 12 is closed. Further, the controller 90 determines a control voltage output to the outside air fan 21 so that a predetermined air-blowing capacity can be obtained. The controller 90 also appropriately determines control signals output to the other various control-object devices. At the same time, the control signals and the like are corrected according to the operation state of the vehicle determined at step S2 described above.

The controller 90 outputs the control signals and the like determined as described above to the various control-object devices. Thereafter, a control routine is repeated at a predetermined control cycle until a stop of air-conditioning operation is required. In the control routine, for example, the above-described detection signals and the operation signals are read in→the target blowing temperature TAO is calculated→the control signals and the like output to the various control-object devices are determined→the control signals and the like are output. Such repetition of the control routine is similarly performed in other operation modes.

Thus, in the cooling mode of the heat pump cycle 2, a gas-injection cycle is formed in which the air-conditioning outdoor heat exchanger 20 functions as a condenser and the indoor evaporator 23 functions as an evaporator.

More specifically, in the cooling mode of the heat pump cycle 2, the air mixing door 34 closes the air passage on the indoor condenser 12, and the high-pressure control valve 13 is fully opened. Therefore, the cycle refrigerant in the refrigerant passage from the discharge port 11c of the compressor 11 to the inlet of the intermediate-pressure fixed throttle 17b and the recovery expansion valve 60, via the gas-liquid separator 14 becomes a high-pressure high-temperature refrigerant. Further, the cycle refrigerant in the refrigerant flow path from the discharge port 11c of the compressor 11 to the inlet of the cooling expansion valve 22 via the gas-liquid separator 14 becomes a high-pressure high-temperature refrigerant.

Further, the cycle refrigerant in the refrigerant flow path from the outlet of the intermediate-pressure fixed throttle 17b and the outlet of the recovery expansion valve 60 to the intermediate pressure port 11b of the compressor 11 via the recovery circulation section 61a of the combined heat exchanger 61 becomes in an intermediate pressure refrigerant. Further, the cycle refrigerant in the refrigerant flow path from the outlet of the cooling expansion valve 22 to the suction port 11a of the compressor 11 via the indoor evaporator 23 becomes a low-pressure low-temperature refrigerant.

Then, in the cooling mode of the heat pump cycle 2, the heat absorbed from the air when the cycle refrigerant is evaporated in the indoor evaporator 23 is dissipated to the outside air at the air-conditioning outdoor heat exchanger 20, so that the ventilation air can be cooled. Therefore, in the cooling mode, the ventilation air can be cooled in the indoor evaporator 23 and blown into the vehicle compartment, and thereby the vehicle compartment can be cooled.

Further, in the cooling mode of the heat pump cycle 2, the recovery open-close valve 16a is open. Therefore, by the heat recovery control described later, when the heating open-close valve 68 of the heating refrigerant circulation circuit 5 is open, the cycle refrigerant flowing through the recovery circulation section 61a can absorbs heat of the heating refrigerant flowing through the heating circulation section 61b.

According to this, the pressure of the cycle refrigerant, which is an intermediate pressure refrigerant, can be increased, and the density of the cycle refrigerant drain from the intermediate pressure port 11b can be increased. Therefore, the refrigerant circulation flow rate circulating in the cycle can be increased without increasing the rotation speed (refrigerant discharge capacity) of the compressor 11. In other words, in the present embodiment, the number of rotations of the compressor 11 (refrigerant discharge capacity) required for exhibiting the same cooling performance can be reduced by the combined heat exchanger 61, as compared with a cycle in which the cycle refrigerant does not absorb heat from the heating refrigerant.

That is, the exhaust heat of the in-vehicle devices 50 to 53 absorbed by the heating refrigerant can be converted into the power of the compressor 11, and thereby the power consumption of the compressor 11 can be reduced and the COP of the cycle can be improved.

(B) Air Mixing Mode

In the air mixing mode, the controller 90 causes the high-pressure control valve 13 into a throttled state and causes the cooling expansion valve 22 into a throttled state. Further, the controller 90 opens the recovery open-close valve 16a, opens the low-pressure open-close valve 16b, and closes the cooling open-close valve 16c.

As a result, in the air mixing mode of the heat pump cycle 2, the cycle refrigerant circulates in this order of the discharge port 11c of the compressor 11→the indoor condenser 12→the high-pressure control valve 13→the gas-liquid separator 14→the intermediate-pressure fixed throttle 17b and the recovery expansion valve 60→the recovery open-close valve 16a→the recovery circulation section 61a of the combined heat exchanger 61→the intermediate pressure port 11b of the compressor 11. Further, the refrigerant cycle is configured such that the refrigerant circulates in this order of the discharge port 11c of the compressor 11→the indoor condenser 12→the high-pressure control valve 13→the gas-liquid separator 14→the low pressure open-close valve 16b→the outdoor heat exchanger 20 for air conditioning→the cooling expansion valve 22→the indoor evaporator 23→the accumulator 24→the suction port 11a of the compressor 11.

That is, the air mixing mode of the heat pump cycle 2 configures a cycle in which the cycle refrigerant circulates substantially in the same order as in the cooling mode.

In the cycle configuration, the controller 90 determines control signals or the like output to the various control-object devices connected to the output side of the controller 90, and the controller 90 controls the operation of the various control-object devices. For example, the controller 90 determines a control signal output to the compressor 11, a control voltage output to the air-conditioning blower 32, and a control signal output to the cooling expansion valve 22, as in the cooling mode.

Furthermore, the controller 90 determines a control signal output to the high-pressure control valve 13 so that the high-pressure cycle refrigerant pressure Pd detected by the high pressure sensor 91d becomes equal to a target high-pressure PCO. The target high-pressure PCO is determined based on the target blowing temperature TAO with reference to a control map for the air mixing mode stored in advance in the controller 90. As a result, the pressure of the high-pressure side cycle refrigerant is maintained substantially constant.

The controller 90 also determines a control signal output to the electric actuator for driving the air mixing door such that both the cool air bypass passage 35 and the air passage of the indoor condenser 12 are open. In the present embodiment, the opening degree of the air mixing door 34 is adjusted so that the actual air temperature TAV approaches the target blowing temperature TAO. The controller 90 also appropriately determines control signals output to the other various control-object devices.

Thus, in the air mixing mode of the heat pump cycle 2, a gas-injection cycle is formed in which the indoor condenser 12 and the air-conditioning outdoor heat exchanger 20 function as a condenser and the indoor evaporator 23 functions as an evaporator.

More specifically, in the air mixing mode of the heat pump cycle 2, because the high-pressure control valve 13 is in a throttled state, the cycle refrigerant in the refrigerant flow path from the discharge port 11c of the compressor 11 to the inlet of the high-pressure control valve 13 becomes in a high-pressure high-temperature refrigerant.

Further, the cycle refrigerant in the refrigerant flow path from the outlet of the high-pressure control valve 13 to the inlet of the intermediate-pressure fixed throttle 17b and the recovery expansion valve 60 via the gas-liquid separator 14 is a semi-high pressure refrigerant decompressed by the high-pressure control valve 13. Further, the cycle refrigerant in the refrigerant flow path from the outlet of the high-pressure control valve 13 to the inlet of the cooling expansion valve 22 via the gas-liquid separator 14 becomes a semi-high pressure refrigerant decompressed by the high-pressure control valve 13.

Further, the cycle refrigerant in the refrigerant flow path from the outlet of the intermediate-pressure fixed throttle 17b and the outlet of the recovery expansion valve 60 to the intermediate pressure port 11b of the compressor 11 via the recovery circulation section 61a of the combined heat exchanger 61 becomes in an intermediate pressure refrigerant, similarly to the cooling mode. Further, the cycle refrigerant in the refrigerant flow path from the outlet of the cooling expansion valve 22 to the suction port 11a of the compressor 11 via the indoor evaporator 23 becomes a low-pressure low-temperature refrigerant as in the cooling mode.

In the air mixing mode of the heat pump cycle 2, the ventilation air is cooled when the cycle refrigerant is evaporated in the indoor evaporator 23, and becomes cool air. Further, a part of the heat absorbed from the air when the cycle refrigerant is evaporated in the indoor evaporator 23, and the heat absorbed from the heating refrigerant when the cycle refrigerant is evaporated in the combined heat exchanger 61 are dissipated to a part of the cool air in the indoor condenser 12 so as to generate heated air (hot air).

Then, by adjusting the opening degree of the air mixing door 34, it is possible to change the mixing ratio of the cool air and the heated air, and conditioned air adjusted to a desired temperature is blown into the vehicle compartment.

Further, in the air mixing mode of the heat pump cycle 2, because the recovery open-close valve 16a is opened, it is possible to cause the cycle refrigerant to absorb the heat from the heating refrigerant. Accordingly, similarly to the cooling mode, it is possible to reduce the power consumption of the compressor 11 and improve the COP of the cycle.

Further, in the air mixing mode, the heat of the cycle refrigerant absorbed from the heating refrigerant is also used as a heat source for heating the ventilation air, in addition to the heat of the cycle refrigerant absorbed from the ventilation air in the indoor evaporator 23 and the heat generated by the compression work of the compressor 11. That is, the ventilation air can be heated by using the exhaust heat of the in-vehicle devices 50 to 53 as a heat source. Therefore, in the air mixing mode, the heating capacity of the ventilation air can be improved.

(c) Dehumidification and Heating Mode

In the dehumidifying and heating mode, the controller 90 controls the high-pressure control valve 13 to be in a throttle state and controls the cooling expansion valve 22 to be a fully open state. Further, the controller 90 opens the recovery open-close valve 16a, closes the low-pressure open-close valve 16b, and closes the cooling open-close valve 16c.

As a result, in the dehumidifying and heating mode of the heat pump cycle 2, the cycle refrigerant circulates in this order of the discharge port 11c of the compressor 11→the indoor condenser 12→the high-pressure control valve 13→the gas-liquid separator 14→the intermediate-pressure fixed throttle 17b and the recovery expansion valve 60→the recovery open-close valve 16a→the recovery circulation section 61a of the combined heat exchanger 61→the intermediate pressure port 11b of the compressor 11. Further, the refrigerant cycle is configured such that the refrigerant circulates in this order of the discharge port 11c of the compressor 11→the indoor condenser 12→the high-pressure control valve 13→the gas-liquid separator 14→the low-stage fixed throttle 17a→the outdoor heat exchanger 20 for air conditioning (→the cooling expansion valve 22)→the indoor evaporator 23→the accumulator 24→the suction port 11a of the compressor 11.

In the cycle configuration, the controller 90 determines control signals or the like output to the various control-object devices connected to the output side of the controller 90, and the controller 90 controls the operation of the various control-object devices. For example, the controller 90 determines a control signal output to the compressor 11, a control voltage output to the air-conditioning blower 32, and a control signal output to the cooling expansion valve 22, as in the air mixing mode.

Further, the controller 90 determines the control signal output to the high-pressure control valve 13 so that the refrigerant pressure Pd on a high-pressure side becomes the target high pressure PCO. The target high pressure PCO is determined based on the target blowing temperature TAO with reference to a control map for the dehumidifying and heating mode stored in advance in the controller 90. As a result, the pressure of the high-pressure side cycle refrigerant is maintained substantially constant.

The controller 90 determines a control signal output to the electric actuator for driving the air mixing door such that the cool air bypass passage 35 is closed and the air passage of the indoor condenser 12 is fully open. Further, the controller 90 stops the outside air fan 21. The controller 90 also appropriately determines control signals output to the other various control-object devices.

Thus, in the dehumidifying and heating mode of the heat pump cycle 2, a gas-injection cycle is formed in which the indoor condenser 12 functions as a condenser and the indoor evaporator 23 functions as an evaporator.

More specifically, in the dehumidifying and heating mode of the heat pump cycle 2, because the high-pressure control valve 13 is in a throttled state, the cycle refrigerant in the refrigerant flow path from the discharge port 11c of the compressor 11 to the inlet of the high-pressure control valve 13 becomes in a high-pressure high-temperature refrigerant.

Further, the cycle refrigerant in the refrigerant flow path from the outlet of the high-pressure control valve 13 to the inlet of the intermediate-pressure fixed throttle 17b and the recovery expansion valve 60 via the gas-liquid separator 14 is a semi-high pressure refrigerant decompressed by the high-pressure control valve 13. Further, the cycle refrigerant in the refrigerant flow path from the outlet of the high-pressure control valve 13 to the inlet of the low-stage fixed throttle 17a via the gas-liquid separator 14 becomes a semi-high pressure refrigerant decompressed by the high-pressure control valve 13.

Further, the cycle refrigerant in the refrigerant flow path from the outlet of the intermediate-pressure fixed throttle 17b and the outlet of the recovery expansion valve 60 to the intermediate pressure port 11b of the compressor 11 via the recovery circulation section 61a of the combined heat exchanger 61 becomes in an intermediate pressure refrigerant, similarly to the cooling mode or the like. The cycle refrigerant in the refrigerant passage from the outlet of the low-stage fixed throttle 17a to the suction port 11a of the compressor 11 via the air-conditioning outdoor heat exchanger 20 and the indoor evaporator 23 becomes a low-pressure low-temperature refrigerant.

In the dehumidifying and heating mode of the heat pump cycle 2, the heat absorbed from the air when the cycle refrigerant is evaporated in the indoor evaporator 23, and the heat absorbed from the heating refrigerant when the cycle refrigerant is evaporated in the combined heat exchanger 61 are dissipated to the cool air in the indoor condenser 12. As a result, the ventilation air that has been cooled and dehumidified is reheated so that the heated dry air can be blown into the vehicle compartment.

Further, in the dehumidifying and heating mode of the heat pump cycle 2, because the recovery open-close valve 16a is opened, the cycle refrigerant can absorb the heat from the heating refrigerant. Accordingly, similarly to the cooling mode, it is possible to reduce the power consumption of the compressor 11 and improve the COP of the cycle.

Further, in the dehumidifying and heating mode, the heat of the cycle refrigerant absorbed from the heating refrigerant is also used as a heat source for heating the ventilation air, in addition to the heat of the cycle refrigerant absorbed from the ventilation air in the indoor evaporator 23 and the heat generated by the compression work of the compressor 11. That is, the ventilation air can be heated by using the exhaust heat of the in-vehicle devices 50 to 53 as a heat source.

Therefore, the heating capacity can be improved in the dehumidification and heating mode.

(D) Low-Temperature Heating Mode

In the low-temperature heating mode, the controller 90 controls the high-pressure control valve 13 to be in a throttle state and controls the cooling expansion valve 22 to be a fully closed state. Further, the controller 90 opens the recovery open-close valve 16a, closes the low-pressure open-close valve 16b, and opens the cooling open-close valve 16c.

As a result, in the low-temperature heating mode of the heat pump cycle 2, the cycle refrigerant circulates in this order of the discharge port 11c of the compressor 11→the indoor condenser 12→the high-pressure control valve 13→the gas-liquid separator 14→the intermediate-pressure fixed throttle 17b and the recovery expansion valve 60→the recovery open-close valve 16a→the recovery circulation section 61a of the combined heat exchanger 61→the intermediate pressure port 11b of the compressor 11. Further, the refrigerant cycle is configured such that the refrigerant circulates in this order of the discharge port 11c of the compressor 11→the indoor condenser 12→the high-pressure control valve 13→the gas-liquid separator 14→the low-stage fixed throttle 17a→the outdoor heat exchanger 20 for air conditioning→the cooling open-close valve 16c→the accumulator 24→the suction port 11a of the compressor 11.

In the cycle configuration, the controller 90 determines control signals or the like output to the various control-object devices connected to the output side of the controller 90, and the controller 90 controls the operation of the various control-object devices.

For example, the controller 90 determines the control signal output to the high-pressure control valve 13 so as to be set at a predetermined throttle opening for the low-temperature heating mode.

Further, the controller 90 determines the control signal output to the compressor 11 so that the refrigerant pressure Pd on a high-pressure side becomes a target high pressure PCO. The target high pressure PCO is determined based on the target blowing temperature TAO with reference to a control map for the low-temperature heating mode stored in advance in the controller 90. As a result, the pressure of the high-pressure side cycle refrigerant is maintained substantially constant.

The control voltage output to the air conditioning blower 32, the control signal output to the electric actuator for driving the air mixing door, and the like are determined in the same manner as in the dehumidifying and heating mode. The controller 90 also appropriately determines control signals output to the other various control-object devices.

Thus, in the low-temperature heating mode of the heat pump cycle 2, a gas-injection cycle is formed in which the indoor condenser 12 functions as a condenser and the outdoor heat exchanger 20 functions as an evaporator. Further, the state of the cycle refrigerant in the low-temperature heating mode of the heat pump cycle 2 changes as shown in the schematic Mollier diagram of FIG. 14.

More specifically, the cycle refrigerant (point a in FIG. 14), discharged from the compressor 11 and becoming in a high-pressure high-temperature refrigerant, flows into the indoor condenser 12. In the low-temperature heating mode, since the air mixing door 34 fully opens the air passage of the indoor condenser 12, the cycle refrigerant flowing in the indoor condenser 12 exchanges heat with the ventilation air blown from the air-conditioning blower 32, and then releases heat and condenses (point a→point b in FIG. 14). Accordingly, the ventilation air is heated in the indoor condenser 12.

The condensation temperature of the cycle refrigerant in the indoor condenser 12 during the low-temperature heating mode may rise to about 80 degrees Celsius. Further, a heating capacity Qh for heating the ventilation air in the low-temperature operation mode can be defined as an enthalpy difference obtained by subtracting an enthalpy of the refrigerant at point b from an enthalpy of the refrigerant at point a shown in FIG. 14.

Figure 14:
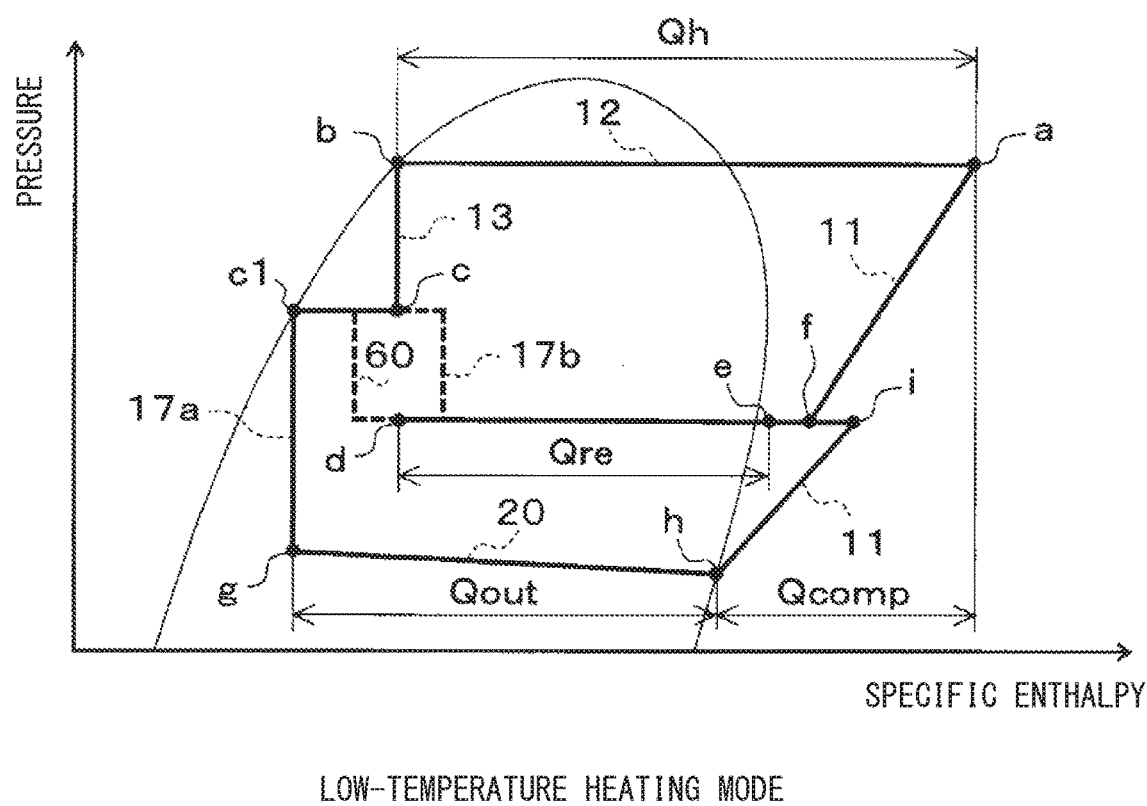
FIG. 14 is a schematic Mollier diagram illustrating a change in state of refrigerant in the heat pump cycle during a low-temperature heating mode, according to the first embodiment.

The cycle refrigerant condensed in the indoor condenser 12 flows into the high-pressure control valve 13, and is decompressed to be a semi-high pressure refrigerant (point b→point c in FIG. 14).

The cycle refrigerant flowing out of the high-pressure control valve 13 flows into the gas-liquid separator 14 and is separated into liquid-phase refrigerant and gas-phase refrigerant. The cycle refrigerant in liquid phase flowing out of the first liquid-phase outflow port 14c of the gas-liquid separator 14 is decompressed by the recovery expansion valve 60 to become in an intermediate-pressure refrigerant. The throttling degree of the recovery expansion valve 60 is adjusted such that a degree of superheat of the cycle refrigerant on an outlet side of the recovery circulation section 61a approaches a reference degree of superheat (point e in FIG. 14).

The gas-phase cycle refrigerant flowing out of the gas-phase outflow port 14b of the gas-liquid separator 14 is decompressed to an intermediate-pressure refrigerant by the intermediate-pressure fixed throttle 17b. As a result, the cycle refrigerant flowing out of the gas-phase outflow port 14b has the same pressure as the refrigerant flowing out of the recovery expansion valve 60.

The cycle refrigerant flowing out of the recovery expansion valve 60 and the cycle refrigerant flowing out of the intermediate-pressure fixed throttle 17b are joined at the joint portion 15c to become a gas-liquid two-phase state having a relatively low-vapor quality (point d in FIG. 14).

The dashed lines in FIG. 14 just schematically shows decompression of the cycle refrigerant in liquid phase flowing out of the first liquid-phase outflow port 14c of the gas-liquid separator 14 and decompression of the cycle refrigerant in gas phase flowing out of the gas-phase outflow port 14b. Therefore, the actual refrigerant is not decompressed along the dashed lines.

The cycle refrigerant flowing out of the joint portion 15c flows into the recovery circulation section 61a. At this time, the pressure of the cycle refrigerant flowing through the recovery circulation section 61a becomes lower than the pressure of the heating refrigerant flowing through the heating circulation section 61b due to the depressurizing action of the intermediate-pressure fixed throttle 17b and the recovery expansion valve 60. That is, the temperature of the cycle refrigerant flowing through the recovery circulation section 61a becomes lower than the temperature of the heating refrigerant flowing through the heating circulation section 61b.

Therefore, the cycle refrigerant flowing through the recovery circulation section 61a absorbs heat from the heating refrigerant flowing through the heating circulation section 61b and evaporates to become a vapor phase refrigerant having a superheat degree (point d→point e in FIG. 14).

Here, the evaporation temperature of the cycle refrigerant in the recovery circulation section 61a in the low-temperature heating mode is about 20 degrees Celsius to 30 degrees Celsius. In addition, the exhaust-heat recovery heat quantity Qre, which is an absorbed heat of the cycle refrigerant absorbed in the recovery circulation section 61a from the heating refrigerant flowing in the heating circulation section 61b, is calculated by using the enthalpy difference between the enthalpy of the refrigerant at point e and the enthalpy of the refrigerant at point d in FIG. 14.

The cycle refrigerant flowing out of the recovery circulation section 61a is sucked into the intermediate pressure port 11b of the compressor 11. The cycle refrigerant sucked from the intermediate pressure port 11b of the compressor 11 merges with an intermediate pressure refrigerant discharged from the low-stage compression mechanism of the compressor 11 (point f in FIG. 14), and then compressed in the high-stage compression mechanism (point f→point a in FIG. 14).

On the other hand, the cycle refrigerant in liquid phase flowing out of the second liquid-phase outflow port 14d of the gas-liquid separator 14 (point c1 in FIG. 14) is decompressed by the low-stage fixed throttle 17a and become in a low-pressure refrigerant (point c1→point g in FIG. 14).

The cycle refrigerant flowing out of the low-stage fixed throttle 17a flows into the air-conditioning outdoor heat exchanger 20. The cycle refrigerant flowing into the air-conditioning outdoor heat exchanger 20 absorbs heat from the outside air and evaporates (point g→point h in FIG. 14).

Here, the evaporation temperature of the cycle refrigerant in the outdoor heat exchanger 20 for air conditioning in the low-temperature heating mode may decrease to 1 degrees Celsius or lower. An outside-air absorbed heat quantity Qout which is a heat quantity absorbed by the cycle refrigerant from the outside air in the air-conditioning outdoor heat exchanger 20 can be defined as an enthalpy difference obtained by subtracting an enthalpy of the refrigerant at point g from an enthalpy of the refrigerant at point h in FIG. 14.

The cycle refrigerant flowing out of the air-conditioning outdoor heat exchanger 20 flows into the accumulator 24m and is separated into gas and liquid. The cycle refrigerant in gas phase separated by the accumulator 24 is drawn into the suction port 11a of the compressor 11. The refrigerant sucked from the suction port 11a of the compressor 11 is compressed by the low-stage compression mechanism (point h point i in FIG. 14), and then merges with the refrigerant flowing from the intermediate pressure port 11b (point f in FIG. 14).

Therefore, in the low-temperature heating mode of the heat pump cycle 2, the air to be blown into the vehicle compartment is heated by the indoor condenser 12 so that the heating of the vehicle compartment can be performed.

Further, in the low-temperature heating mode of the heat pump cycle 2, because the recovery open-close valve 16a is opened, the cycle refrigerant can absorb the heat from the heating refrigerant. Accordingly, similarly to the cooling mode, it is possible to reduce the power consumption of the compressor 11 and improve the COP of the cycle.

Further, in the low-temperature heating mode, the ventilation air can be heated by using the heat of the cycle refrigerant absorbed from the heating refrigerant in the combined heat exchanger 61, in addition to the heat absorbed by the cycle refrigerant from the outside air in the air-conditioning outdoor heat exchanger 20 and the heat generated by the compression work of the compressor 11, as a heat source.

In the low-temperature heating mode, unlike the dehumidifying and heating mode, the ventilation air is not cooled by the indoor evaporator 23, so that the heating capacity of the blast air is prevented from being offset. Therefore, in the low-temperature heating mode, the heating capacity of the ventilation air can be greatly improved as compared with that in the dehumidifying-heating mode.

Next, a heat recovery control at step S9 of FIG. 13 will be explained. In the heat recovery control, the controller 90 controls the opening/closing of the heating open-close valve 68 of the heating refrigerant circulation circuit 5 based on the detection signal of the control sensor group.

More specifically, the controller 90 opens the heating open-close valve 68 when the management in-vehicle device temperature Tep becomes equal to or higher than a reference upper limit temperature KTep1. Further, when the management in-vehicle device temperature Tep becomes equal to or lower than a reference lower limit temperature KTep2, the heating open-close valve 68 is closed.

As a result, in the heat recovery control, the management in-vehicle device temperature Tep (in the present embodiment, the temperature of the battery 50) is maintained in the usable temperature range of the battery 50. Further, the temperature difference between the reference upper limit temperature KTep1 and the reference lower limit temperature KTep2 has a hysteresis width for preventing control hunting.

When the management in-vehicle device temperature Tep becomes equal to or higher than the reference upper limit temperature KTep1 and the controller 90 opens the heating open-close valve 68, the heat-discharge refrigerant in the liquid phase state or the gas-liquid two-phase state flows into the refrigerant passages 50a to 53a of the in-vehicle devices 50 to 53, in the heating refrigerant circulating circuit 5.

The heating refrigerant flowing into the refrigerant passages 50a to 53a of the in-vehicle devices 50 to 53 absorbs the heat generated by the in-vehicle devices 50 to 53 and evaporates, so that the in-vehicle devices 50 to 53 are cooled. The heating refrigerant evaporated in the refrigerant passages 50a to 53a flows into the heating circulation section 61b of the combined heat exchanger 61.

The heating refrigerant in the vapor phase flowing into the heating circulation section 61b dissipates heat to the heat-discharge refrigerant flowing through the heat-discharge circulation section 61c, and is condensed. As a result, the heat-discharge refrigerant absorbs heat and evaporates, and the heat-discharge refrigerant pressure Prh increases. Further, the heating refrigerant in the vapor phase flowing into the heating circulation section 61b radiates heat to the cycle refrigerant passing through the recovery circulation section 61a, and is condensed.

The liquid-phase heating refrigerant or the heating refrigerant in the gas-liquid two-phase state, condensed in the heating circulation section 61b, flows into the refrigerant passages 50a to 53a of the in-vehicle devices 50 to 53 by the action of gravity when the heating open-close valve 68 is opened. Then, when the management in-vehicle device temperature Tep becomes equal to or lower than the reference lower limit temperature KTep2, the controller 90 closes the heating open-close valve 68. As a result, the circulation of the heating refrigerant in the heating refrigerant circulation circuit 5 is interrupted.

Therefore, in the heat recovery control, when the temperature Tep of the management in-vehicle device becomes equal to or higher than the reference upper limit temperature KTep1, the exhaust heat of the in-vehicle device 50 can be effectively absorbed and recovered by utilizing the phase change of the heating refrigerant in the respective refrigerant passages 50a to 53a. Then, the exhaust heat absorbed by the heating refrigerant can be efficiently dissipated to the heat-discharge refrigerant or the cycle refrigerant in the combined heat exchanger 61 by utilizing the phase change of the heating refrigerant.

Further, when the management in-vehicle device temperature Tep becomes equal to or lower than the reference lower limit temperature KTep2, the circulation of the heating refrigerant in the heating refrigerant circulation circuit 5 is interrupted, and thereby it can prevent the heat of the heating refrigerant from being transferred to the heat-discharge refrigerant or/and the cycle refrigerant. Therefore, by performing the heat recovery control, the temperatures of the in-vehicle devices 50 to 53 can be maintained within the respective usable temperature zones.

Next, a heat disposal control (heat-discharge control) at step S10 of FIG. 13 will be explained. In the heat-discharge control, the controller 90 controls the opening/closing of the heat-discharge open-close valve 65 of the heat-discharge refrigerant circulation circuit 3 based on the detection signal of the control sensor group.

More specifically, when the heat-discharge refrigerant pressure Prh becomes equal to or higher than a predetermined reference upper limit pressure KPrh1, the controller 90 opens the heat-discharge open-close valve 65 and controls the outside air fan 67 so as to have a predetermined blowing capacity. Further, when the heat-discharge refrigerant pressure Prh becomes equal to or lower than a predetermined reference lower limit pressure KPrh2, the heat-discharge open-close valve 65 is closed and the outside air fan 67 is stopped.

As a result, in the heat-discharge control, the heat-discharge refrigerant pressure Prh is maintained within a predetermined reference pressure range. Further, a pressure difference between the reference upper limit pressure KPrh1 and the reference lower limit pressure KPrh2 has a hysteresis width for preventing control hunting. The outside air fan 67 may be set to be always operated after the entire system of the vehicle is activated.

When the heat-discharge refrigerant pressure Prh becomes equal to or higher than the reference upper limit pressure KPrh1 and the controller 90 opens the heat-discharge open-close valve 65, the heat-discharge refrigerant circulation circuit 3 causes the heat-discharge refrigerant in a liquid phase state or a gas-liquid two-phase state to flow into the heat-discharge circulation section 61c of the combined heat exchanger 61.

At this time, when the heat-discharge refrigerant flowing into the heat-discharge circulation section 61c absorbs heat from the refrigerant flowing through the heating circulation section 61b and evaporates, the evaporated heat-discharge refrigerant flows into the heat-discharge outdoor heat exchanger 63. The heat-discharge refrigerant in the vapor phase flowing into the heat-discharge outdoor heat exchanger 63 dissipates heat to the outside air blown from the outside-air fan 67 and condenses.

As a result, the heat absorbed by the heat-discharge refrigerant from the heating refrigerant (that is, the waste heat of the in-vehicle devices 50 to 53) is dissipated to the outside air. The heat-discharge refrigerant in the liquid phase state or the gas-liquid two phase state condensed in the heat-discharge outdoor heat exchanger 63 flows into the heat-discharge circulation section 61c again by the action of gravity.

On the other hand, when the heat-discharge refrigerant pressure Prh is below the reference lower limit pressure KPrh2 and the heat-discharge refrigerant flowing into the heat-discharge section 61c does not absorb heat from the heating refrigerant flowing through the heating circulation section 61b, the controller 90 closes the heat-discharge open-close valve 65. As a result, the circulation of the heat-discharge refrigerant in the heat-discharge refrigerant circulation circuit 3 is interrupted.

Therefore, in the heat-discharge control, when the heat-discharge refrigerant pressure Prh becomes equal to or higher than the reference upper limit pressure KPrh1, the combined heat exchanger 61 utilizes the phase change of the heat-discharge refrigerant so that the heat-discharge refrigerant can absorb the heat from the heating refrigerant. Here, the heat of the heating refrigerant is the exhaust heat of the in-vehicle devices 50 to 53. Then, the exhaust heat absorbed by the heat-discharge refrigerant can be efficiently dissipated to the outside air in the heat-discharge outdoor heat exchanger 63 by utilizing the phase change of the heat-discharge refrigerant.

Further, when the heat-discharge refrigerant pressure Prh becomes equal to or lower than the reference lower limit pressure KPrh2, the circulation of the heat-discharge refrigerant in the heat-discharge refrigerant circulation circuit 3 is interrupted, and thereby it can prevent the exhaust heat of the in-vehicle devices 50 to 53 from being dissipated to the outside air as unnecessary.

Since the vehicle thermal management system 1 of the present embodiment operates as described above, it is possible to obtain the following excellent effects.

That is, according to the vehicle thermal management system 1 of the present embodiment, the combined heat exchanger 61 can be configured to exchange heat between the heating refrigerant and the cycle refrigerant in any operation mode. Therefore, in the all seasons, the exhaust heat absorbed by the heating refrigerant from the in-vehicle devices 50 to 53 can be effectively used for improving the COP of the heat pump cycle 2 regardless of the season.

In addition to this, in the low-temperature heating mode, the air mixing mode, and the dehumidifying and heating mode, the exhaust heat absorbed by the heating refrigerant from the in-vehicle devices 50 to 53 can be effectively used as a heat source for heating the ventilation air. Therefore, in the low-temperature heating mode, the air mixing mode, and the dehumidifying and heating mode, it is possible to exhibit a high air-heating capacity of ventilation air (that is, a high heating capacity).

The low-temperature heating mode with a highest improvement effect of the heating capacity will be described as an example. In a general heat pump cycle without having the recovery circulation section 61a as in a conventional technique, only heat absorbed from the outside air and heat generated by the compression work of the compressor 11 can be used as a heat source for heating the ventilation air. The heat absorbed from the outside air corresponds to Qout in FIG. 14. The heat generated by the compression work of the compressor 11 corresponds to Qcomp in FIG. 14. This is the same even in a cycle forming a gas injection cycle.

On the other hand, in the heat pump cycle 2 of the present embodiment, in addition to the heat absorbed from the outside air in the air-conditioning outdoor heat exchanger 20 and the heat generated by the compression work of the compressor 11, the recovery circulation section 61a can use the heat from the heating refrigerant flowing through the heating circulation section 61b as a heat source for heating the ventilation air.

The heat absorbed from the outside air in the air-conditioning outdoor heat exchanger 20 corresponds to Qout in FIG. 14. The heat generated by the compression work of the compressor 11 corresponds to Qcomp in FIG. 14. Further, the heat absorbed in the recovery circulation section 61a from the heating refrigerant flowing through the heating circulation section 61*b* corresponds to Qre in FIG. 14.

At this time, the heat absorbed by the cycle refrigerant from the outside air (corresponding to Qout in FIG. 14) and the heat absorbed from the heating refrigerant (corresponding to Qre in FIG. 14) are independent heat sources and do not cancel each other.

That is, a heating capacity Qh (i.e., air-heating capacity) for heating the ventilation air in the low-temperature heating mode of the heat pump cycle 2 of the present embodiment can be represented by the following equation F2.

$$Qh = Qout + Qre + Qcomp \quad (F2)$$

Therefore, according to the vehicle thermal management system 1 of the present embodiment, the exhaust heats of the in-vehicle devices 50 to 53 can be effectively used as heat sources, in the low-temperature heating mode, for heating the ventilation air. Thus, in the low-temperature heating mode, high heating capacity can be exhibited.

According to the study by the present inventors of the present disclosure, the vehicle thermal management system 1 of the present embodiment is confirmed to be capable of achieving a sufficient heating of the vehicle compartment even under an extremely-low outside-air temperature in winter season (for example, under an operating condition in which the outside air temperature is about −15 degrees Celsius (° C.)).

Further, since the evaporation temperature of the cycle refrigerant in the recovery circulation section 61*a* in the low-temperature heating mode is about 20° C. to 30° C., the temperature of the heating refrigerant flowing out of the heating circulation section 61*b* is also about the same. Therefore, in the heating refrigerant circulation circuit 5, the heating refrigerant cooled in the heating circulation section 61*b* can be used for cooling the in-vehicle devices 50 to 53, so that the in-vehicle devices 50 to 53 can be cooled mildly.

That is, the heating refrigerant of about 20° C. to 30° C. cooled in the heating circulation section 61*b* flows through the refrigerant passages 50*a* to 53*a* of the in-vehicle devices 50 to 53. Thus, it is possible to prevent the temperature of the in-vehicle devices 50 to 53 from falling below the possible temperature range. Therefore, a sudden temperature change (so-called heat shock) and dew condensation in the in-vehicle devices 50 to 53 can be prevented, and thereby a longer life, higher performance, and higher output of the in-vehicle devices 50 to 53 can be achieved.

Further, according to the vehicle thermal management system 1 of the present embodiment, because the combined heat exchanger 61 can be configured to exchange heat between the heating refrigerant and the heat-discharge refrigerant, the exhaust heat absorbed by the heating refrigerant can be dissipated to the outside air in the heat-discharge outdoor heat exchanger 63.

That is, when the air conditioning operation is stopped or when it is not necessary to use the exhaust heat of the in-vehicle devices 50 to 53 to heat the ventilation air, the exhaust heat of the in-vehicle devices 50 to 53 is discharged to the outside air. Further, even in the low-temperature heating mode, if the exhaust heat of the in-vehicle devices 50 to 53 is larger than the exhaust-heat recovery heat quantity Qre to be absorbed by the cycle refrigerant in the combined heat exchanger 61, the surplus exhaust heat is discharged to the outside air.

In addition to this, in the vehicle thermal management system 1 of the present embodiment, as the heating refrigerant, the cycle refrigerant, and the heat-discharge refrigerant, a heat medium that accompanies the phase change at the time of heat transportation is adopted. Therefore, efficient and rapid heat transfer due to latent heat change can be realized during heat exchange between the refrigerants. Therefore, the exhaust heat of the in-vehicle devices 50 to 53 can be quickly radiated to the outside air, and the temperature rise of the in-vehicle devices 50 to 53 can be effectively suppressed with high responsiveness.

Furthermore, since a heat medium that undergoes a phase change at the time of heat transfer is used as the heat-discharge refrigerant, the refrigerant passages 50*a* to 53*b* of the in-vehicle devices 50 to 53 can be formed by connecting refrigerant pipes in which refrigerant in a liquid phase state or a gas-liquid two-phase state flows. As the refrigerant pipe, a duct having a small diameter can be adopted in a case where air is circulated around the in-vehicle devices 50 to 53 to adjust the temperature of the in-vehicle devices 50 to 53.

Therefore, the refrigerant passages 50*a* to 53*b* of the in-vehicle devices 50 to 53 can be easily connected to each other regardless of the mounting layout of the in-vehicle devices 50 to 53 in the vehicle. As a result, the mountability of the entire vehicle thermal management system 1 on the vehicle can be improved. Moreover, since the outer surface of the refrigerant pipe having a small diameter is also small, the heat of the heating refrigerant is prevented from being unnecessarily radiated to the outside air, and the heat of the heating refrigerant can be effectively utilized.

Therefore, according to the vehicle thermal management system 1 of the present embodiment, the exhaust heats of the in-vehicle devices 50 to 53 which generate heat when being operated can be effectively used as heat sources for heating the ventilation air. Further, the residual exhaust heat that does not need to be used to heat the ventilation air can be quickly discharged to the outside air, and the temperature rise of the in-vehicle devices 50 to 53 can be effectively suppressed with a high quality. Therefore, the in-vehicle devices 50 to 53 can be adjusted respectively to have appropriate temperatures.

When the vehicle thermal management system 1 of the present embodiment is applied to an electric vehicle, it is possible to reduce the electric energy consumed for air conditioning in the vehicle compartment, and to extend the mileage per charge.

Further, in the vehicle thermal management system 1 of the present embodiment, the heat pump cycle 2 with the gas injection cycle can be adopted in any operation mode. Therefore, in any of the operation modes, it is possible to improve the heating capacity of the blown air or the COP, as compared with a normal vapor-compression refrigeration cycle in which an intermediate pressure refrigerant is not merged with the refrigerant in the compression process in the compressor.

Furthermore, since the normal refrigeration cycle and the gas injection cycle are not switched at the time of switching the operation mode, the cycle is not temporarily stopped. Therefore, the driving mode can be smoothly switched without making the occupant feel uncomfortable.

Further, in the vehicle thermal management system 1 of the present embodiment, as the combined heat exchanger 61, a stack-type heat exchanger is used in which a plurality of recovery tubes 72, a plurality of heat-discharge tubes 75, and a plurality of heating tubes 78 are stacked and arranged.

Then, at least a part of the recovery tube 72 and the heating tube 78 are arranged adjacent to each other so that heat can be transferred between the cycle refrigerant and the heating refrigerant. Further, by arranging at least a part of the heat-discharge tubes 75 and the heating tubes 78 adjacent to each other, heat transfer between the heat-discharge refrigerant and the heating refrigerant is made possible.

Specifically, the recovery tube 72 and the heating tube 78 adjacent each other are brazed and joined, and the heat-discharge tube 75 and the heating tube 78 adjacent each other are brazed and joined. According to this, it is possible to indirectly perform heat exchange through the joint surface of the metal tubes having excellent heat conductivity, and thereby improving heat exchange efficiency between the refrigerants when being heat exchanged.

Further, in the combined heat exchanger 61 of the present embodiment, the number of the recovery tubes 72 is less than or equal to the number of the heating tubes 78, and the number of the heat-discharge tubes 75 is less than or equal to the number of the heating tubes 78. That is, the number of the heating tubes 78 is larger than the number of the recovery tubes 72 and the number of the heat-discharge tubes 75.

Therefore, it is easy to dissipate the exhaust heat of the in-vehicle devices 50 to 53, which is absorbed by the heating refrigerant, to both the cycle refrigerant and the heat-discharge refrigerant. Further, by adjusting the numbers of the recovery tubes 72 and the heat-discharge tubes 75 according to the usage states of the exhaust heat of the in-vehicle devices 50 to 53, the amount of heat released from the heating refrigerant to the cycle refrigerant and the heat-discharge refrigerant can be easily adjusted.

For example, in the vehicle thermal management system 1 of the present embodiment, it is assumed that, of the exhaust heat of the in-vehicle devices 50 to 53, the amount of heat used to heat the ventilation air and the amount of heat discarded to the outside air are about the same. In this case, each of the number of the recovery tubes 72 and the number of the heat-discharge tubes 75 may be about half of the number of the heating tubes 78.

Further, in the combined heat exchanger 61 of the present embodiment, the recovery tubes 72 are arranged so that the cycle refrigerant flows vertically. Further, in the recovery tubes 72, the refrigerant passages are formed in two rows, so that the flow direction of the cycle refrigerant is turned.

According to this, the passage cross-sectional area of the recovery tube 72 can be reduced as compared with the case where the refrigerant passages are formed in one row. Therefore, it is possible to increase the flow rate of the cycle refrigerant and improve the heat exchange capacity, and it is possible to prevent the refrigerating machine oil from staying in the recovery tube 72.

Further, the heating tubes 78 are arranged so that the heating refrigerant flows from the upper side to the lower side. The heating tube 78 serves as a condensing part of a thermosiphon. Therefore, in the heating refrigerant circulation circuit 5, the heating tubes 78 are arranged so that the heating refrigerant flows from the upper side to the lower side, and thereby the heating refrigerant is circulated by utilizing the density difference of the heating refrigerant. As a result, it is possible to reduce the pressure loss when the heating refrigerant circulates in the heating refrigerant circulation circuit 5.

Further, the heat-discharge tubes 75 are arranged so that the heat-discharge refrigerant flows from the lower side toward the upper side. The heat-discharge tube 75 serves as an evaporation part of the thermosiphon. Therefore, in the heat-discharge refrigerant circulation circuit 3, the heat-discharge tubes 75 are arranged so that the heat-discharge refrigerant flows from the lower side to the upper side, and the heat-discharge refrigerant is circulated by utilizing the density difference of the heat-discharge refrigerant. As a result, it is possible to reduce the pressure loss when the heating refrigerant circulates in the heat-discharge refrigerant circulation circuit 3.

In addition to this, in the combined heat exchanger 61 of the present embodiment, the flow directions of the refrigerant in all the refrigerant tubes 72, 75, and 78 are the vertical directions, and the flow directions of the respective refrigerants are opposite to each other or in parallel with each other. Therefore, it is easy to adjust the heat exchange performance between the refrigerants.

In addition, the vehicle thermal management system 1 of the present embodiment includes the management in-vehicle device temperature sensor 91h configured to detect the management in-vehicle device temperature Tep of the battery 50 that is the management in-vehicle device. Then, the controller 90 (specifically, a heating circulation control unit 90c) controls opening or closing of the heating open-close valve 68 so that the management in-vehicle device temperature Tep is maintained within a predetermined usable temperature range. That is, heat recovery control is performed.

According to this, the temperature of the battery 50 can be maintained in the usable temperature range of the battery 50 by opening or closing the heating open-close valve 68 without requiring complicated control. Further, by appropriately setting the pressure coefficients of the respective refrigerant passages 50a to 53a, the temperatures of the in-vehicle devices 51 to 53 other than the battery 50 can be maintained in their respective usable temperature zones.

Further, the vehicle thermal management system 1 of the present embodiment includes the heat-discharge refrigerant pressure sensor 91g that detects the heat-discharge refrigerant pressure Prh of the heat-discharge refrigerant of the heat-discharge refrigerant circulation circuit 3. Then, the controller 90 (specifically, the heat-discharge circulation control unit 90b) opens or closes the heat-discharge open-close valve 65 so that the heat-discharge refrigerant pressure Prh is maintained within a predetermined reference pressure range. That is, heat discharge control is performed.

According to this, by opening or closing the heat-discharge open-close valve 65 without requiring complicated control, the excess exhaust heat of the heating refrigerant is absorbed by the heat-discharge refrigerant, and the excess heat of the heat-discharge refrigerant can be dissipated to the outside air in the heat-discharge outdoor heat exchanger 63.

Further, since the heat recovery control and the heat discharge control are executed in parallel in the controller 90, it is possible to easily switch a heat radiation mode in which the heat absorbed by the heating refrigerant from the in-vehicle devices 50 to 53 is transferred to the cycle refrigerant or the heat-discharge refrigerant in the combined heat exchanger 61.

For example, the heating open-close valve 68 is opened to allow the heating refrigerant to flow through the heating circulation section 61b, the heat-discharge open-close valve 65 is closed, and the recovery open-close valve 16a is opened so as to circulate the cycle refrigerant to the recovery circulation section 61a. In this case, it possible to set a first heat radiation mode in which the heat absorbed by the heating refrigerant from the in-vehicle devices 50 to 53 is dissipated only to the cycle refrigerant.

Alternatively, the heating open-close valve 68 is opened to allow the heating refrigerant to flow through the heating circulation section 61b, the heat-discharge open-close valve 65 is opened to allow the heat-discharge refrigerant to flow through the heat-discharge circulation section 61c, and the recovery open-close valve 16a is closed. In this case, it possible to set a second heat radiation mode in which the heat absorbed by the heating refrigerant from the in-vehicle devices 50 to 53 is dissipated only to the heat-discharge refrigerant.

Alternatively, the heating open-close valve 68 is opened to allow the heating refrigerant to flow through the heating circulation section 61b, the heat-discharge open-close valve 65 is opened to allow the heat-discharge refrigerant to flow through the heat-discharge circulation section 61c, and the recovery open-close valve 16a is opened to allow the cycle refrigerant to flow through the recovery flow section 61a. In this case, it possible to set a third heat radiation mode in which the heat absorbed by the heating refrigerant from the in-vehicle devices 50 to 53 is dissipated to both the cycle refrigerant and the heat-discharge refrigerant.

Further, by closing the heating open-close valve 68, it is possible to switch to a non-heat dissipation mode in which the heat absorbed by the heating refrigerant from the in-vehicle devices 50 to 53 is not radiated to either the cycle refrigerant or the heat-discharge refrigerant.

Second Embodiment

Figure 15:
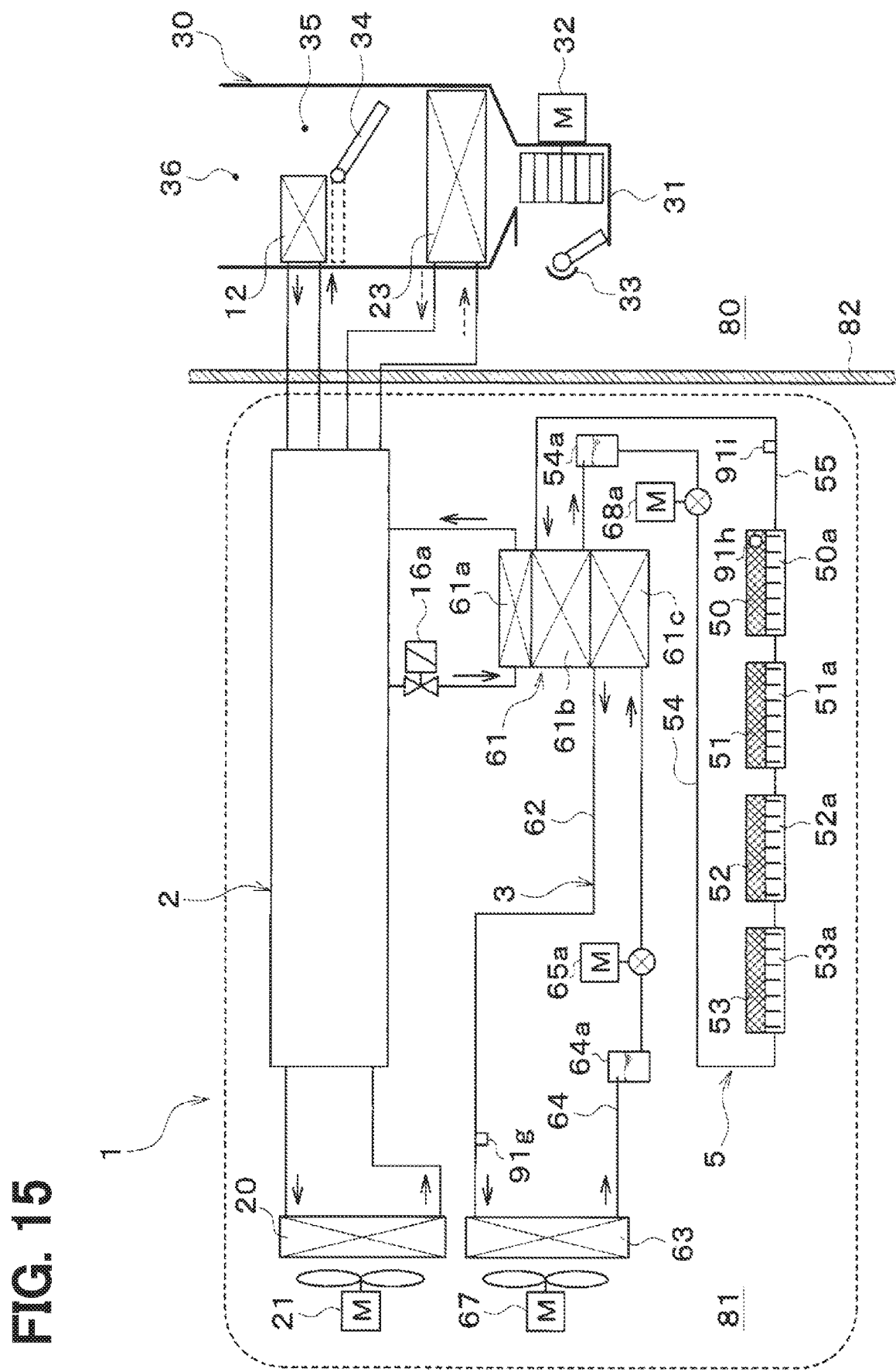
FIG. 15 is an overall configuration diagram of a vehicle thermal management system of a second embodiment.

In the present embodiment, an example in which the configurations of the heat-discharge refrigerant circulation circuit 3 and the heating refrigerant circulation circuit 5 are changed from the first embodiment as shown in the overall configuration diagram of FIG. 15 will be described. FIG. 15 is a drawing corresponding to FIG. 1 described in the first embodiment. In FIG. 15, the same or equivalent parts as those of the first embodiment are denoted by the same reference numerals. This also applies to the following drawings.

Specifically, in the heat-discharge refrigerant circulation circuit 3 of the present embodiment, a heat-discharge flow control valve 65a and a heat-discharge storage tank 64a are used instead of the heat-discharge open-close valve 65.

The basic configuration of the heat-discharge flow control valve 65a is similar to that of the high-pressure control valve 13 or the cooling expansion valve 22 described in the first embodiment. The heat-discharge flow control valve 65a has a fully closing function. Therefore, the heat-discharge flow control valve 65a can be used as a heat-discharge circulation shutter in the present embodiment.

The heat-discharge storage tank 64a is arranged on a refrigerant flow upstream side of the heat-discharge flow control valve 65a. The heat-discharge storage tank 64a separates the heat-discharge refrigerant flowing out of the heat-discharge outdoor heat exchanger 63 into gas and liquid, and stores the separated liquid-phase heat-discharge refrigerant therein.

Further, in the heating refrigerant circulation circuit 5 of the present embodiment, a heating flow control valve 68a and a heating storage tank 54a are adopted instead of the heating open-close valve 68. The basic structure of the heating flow control valve 68a is the same as that of the heat-discharge flow control valve 65a. Therefore, the heating flow control valve 68a can be used as a heating circulation shutter in the present embodiment.

The heat-discharge storage tank 54a is arranged on a refrigerant flow upstream side of the heat-discharge flow control valve 68a. The heating storage tank 54a separates the gas-liquid of the heating refrigerant flowing out from the heating circulation section 61b of the combined heat exchanger 61, and stores the separated liquid-phase heating refrigerant therein.

In addition, an in-vehicle device pressure sensor 91i of a control sensor group is connected to the controller 90 of the present embodiment. The in-vehicle device pressure sensor 91i is an in-vehicle device pressure detector that detects an in-vehicle device downstream side pressure Pep, which is a pressure of the heating refrigerant flowing out of the refrigerant passage formed in the in-vehicle device disposed on the most downstream side of the heating refrigerant flow in the heating refrigerant circulation circuit 5. In the present embodiment, the refrigerant passage formed in the in-vehicle device arranged on the most downstream side of the heating refrigerant flow is the refrigerant passage 50a in which the battery 50 is formed. The other configurations of the vehicle thermal management system 1 are the same as those of the first embodiment.

An operation of the above configuration according to the present embodiment will be next described. The operation in the air conditioning control of the vehicle thermal management system 1 of the present embodiment is similar to that of the first embodiment.

In the heat recovery control, the controller 90 operates the heating flow control valve 68a so that the management in-vehicle device temperature Tep is maintained within the usable temperature range of the battery 50, as in the first embodiment. As a result, the temperatures of the in-vehicle devices 50 to 53 are maintained within their respective usable temperature ranges, respectively.

More specifically, the controller 90 opens the heating flow control valve 68a when the management in-vehicle device temperature Tep becomes equal to or higher than a reference upper limit temperature KTep1. Further, when the temperature Tep of the management in-vehicle device becomes equal to or lower than the reference lower limit temperature KTep2, the heating open-close valve 68 is fully closed.

Further, the controller 90 controls the opening degree of the heating flow control valve 68a so that the superheat degree of the refrigerant flowing out of the refrigerant passage formed in the in-vehicle device arranged on the most downstream side among the in-vehicle devices 50 to 53 approaches a predetermined reference superheat degree. In the present embodiment, the refrigerant passage formed in the in-vehicle device arranged on the most downstream side of the heating refrigerant flow is the refrigerant passage 50a in which the battery 50 is formed. The reference superheat degree is set to 0 degrees Celsius, for example. In other words, the controller 90 controls the opening degree of the heating flow control valve 68a so that the superheat degree of the refrigerant flowing into the heating circulation section 61b approaches the reference superheat degree.

At this time, the controller 90 detects the superheat degree of the heating refrigerant on the outlet side of the refrigerant passage 50a based on the management in-vehicle device temperature Tep and the in-vehicle device downstream pressure Pep.

Further, in the heat-discharge control, the controller 90 controls the operation of the heat-discharge flow control valve 65a so that the heat-discharge refrigerant pressure Prh is maintained within the reference pressure range, as in the first embodiment. As a result, the exhaust heat of the in-vehicle devices 50 to 53 is properly radiated to the outside air.

More specifically, the controller 90 opens the heat-discharge flow control valve 65a when the heat-discharge refrigerant pressure Prh becomes equal to or higher than the reference upper limit pressure KPrh1. Further, when the heat-discharge refrigerant pressure Prh becomes equal to or lower than the reference lower limit pressure KPrh2, the heat-discharge flow control valve 65a is fully closed. Further, the controller 90 increases the opening degree of the heat-discharge flow control valve 65a, as the value obtained by subtracting the reference upper limit pressure KPrh1 from the heat-discharge refrigerant pressure Prh increases.

Since the vehicle thermal management system 1 of the present embodiment operates as described above, the exhaust heat of the in-vehicle devices 50 to 53 that generate heat during operation can be effectively used as a heat source for heating the ventilation air, as in the first embodiment. Further, the residual exhaust heat that does not need to be used to heat the ventilation air can be quickly radiated to the outside air, and the temperature rise of the in-vehicle devices 50 to 53 can be suppressed with a high responsibility.

Further, in the vehicle thermal management system 1 of the present embodiment, since the heat-discharge refrigerant circulation circuit 3 is provided with the heat-discharge flow control valve 65a, it can suppress a sudden change in the flow rate of the refrigerant in the heat-discharge refrigerant circulation circuit 3. As a result, it is possible to realize a stable flow rate control by suppressing a hypersensitive control or a response delay due to overshoot.

In addition, since the heat-discharge storage tank 64a is arranged in the heat-discharge refrigerant circulation circuit 3, the separated heat-discharge refrigerant in the liquid phase can flow into the heat-discharge flow control valve 65a. According to this, it is possible to suppress mixing of particles (that is, bubbles) of the gas-phase refrigerant in the liquid-phase refrigerant, and to realize more stable flow rate control.

Further, since the heating flow control valve 68a and the heating storage tank 54a are arranged in the heating refrigerant circulation circuit 5, the stability of the flow rate control of the heating refrigerant circulating in the heating refrigerant circulation circuit 5 can be improved, similarly to the heat-discharge refrigerant circulation circuit 3.

In the vehicle thermal management system 1 of the present embodiment, the controller 90 adjusts the opening degree of the heating flow control valve 68a so that the superheat degree of the heating refrigerant on the outlet side of the refrigerant passage 50a formed in the battery 50 approaches the reference superheat degree. According to this, since the liquid-phase refrigerant can be evaporated in all the refrigerant passages 50a to 53a, the heating refrigerant efficiently absorbs the exhaust heat of the in-vehicle devices 50 to 53 and cooling efficiency of the in-vehicle devices 50 to 53 can be improved.

Further, in the present embodiment, the heat-discharge storage tank 64a and the heating storage tank 54a are employed. Thus, by attaching stop valves that close the inlet and outlet of these liquid storage parts of the tanks 64a, 54a, the liquid storage parts filled with a predetermined refrigerant can be mounted on the vehicle. According to this, it is possible to improve the mountability when the vehicle thermal management system 1 is mounted on the vehicle.

Third Embodiment

Figure 16:
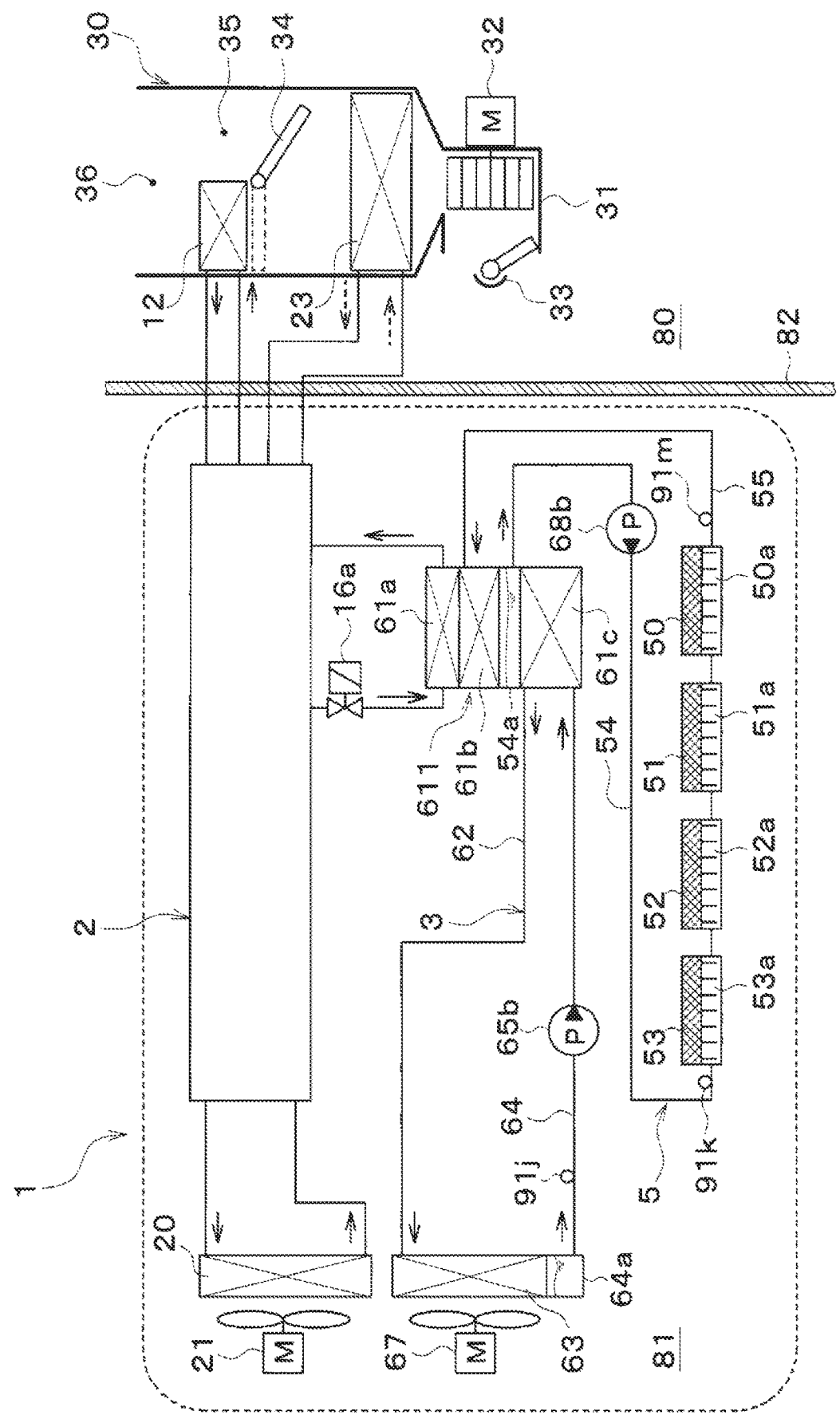
FIG. 16 is a diagram illustrating an entire configuration of a vehicle thermal management system according to a third embodiment.

In the present embodiment, as compared with the first embodiment, as shown in the overall configuration diagram of FIG. 16, the configurations of the heat-discharge refrigerant circulation circuit 3 and the heating refrigerant circulation circuit 5 are changed, and a combined heat exchanger 611 is adopted instead of the combined heat exchanger 61.

Specifically, in the heat-discharge refrigerant circulation circuit 3 of the present embodiment, a heat-discharge refrigerant pump 65b and a heat-discharge storage tank 64a are used instead of the heat-discharge open-close valve 65 of the above-described first embodiment.

The heat-discharge refrigerant pump 65b is an electric pump that pressure-feeds the heat-discharge refrigerant in a liquid phase flowing out from the heat-discharge storage tank 64a to the heat-discharge circulation section 61c of the combined heat exchanger 61. The number of revolutions (i.e., discharge capacity) of the heat-discharge refrigerant pump 65b is controlled based on a control voltage output from the controller 90.

Further, the heat-discharge refrigerant pump 65b has a function of blocking inflow of the heat-discharge refrigerant thereinto when the heat-discharge refrigerant pump 68 is stopped. Therefore, the heat-discharge refrigerant pump 65b also has a function as a heat discharge circulation shutter. The heat-discharge storage tank 64a is integrally formed with the most downstream side of the heat-discharge outdoor heat exchanger 63 in the refrigerant flow.

Further, in the heating refrigerant circulation circuit 5 of the present embodiment, a heating refrigerant pump 68b and a heating storage tank 54a are adopted instead of the heating open-close valve 68 of the first embodiment.

The heating refrigerant pump 68b is an electric pump that pressure-sends the heating refrigerant in the liquid phase flowing from the heating storage tank 54a to an inlet of the refrigerant passage connected to the most upstream side of the refrigerant flow among the refrigerant passages 50a to 53a of the in-vehicle devices 50 to 53. In the present embodiment, the refrigerant passage connected to the most upstream side of the refrigerant flow is the refrigerant passage 53a of the vehicle-running electric motor 53.

The basic structure of the heating refrigerant pump 68b is the same as that of the heat-discharge refrigerant pump 65b. Therefore, the heating refrigerant pump 68b also has a function as a refrigerant circulation shutter that interrupts the circulation of the heating refrigerant. Further, the vehicle thermal management system 1 of the present embodiment employs the combined heat exchanger 611 in which the heating storage tank 54a is integrally formed.

Next, a detailed configuration of the combined heat exchanger 611 of the present embodiment, in which the heating storage tank 54a is integrally formed, will be described with reference to FIGS. 17 to 19.

The combined heat exchanger 611 includes the recovery tubes 72 and the heat-discharge tubes 75 similar to those in the first embodiment. Furthermore, in the combined heat exchanger 611, the heating tubes 78 described in the first embodiment are eliminated, and an interposition member 78f that forms a refrigerant passage is arranged between the recovery tube 72 and the heat-discharge tube 75.

Figure 19:
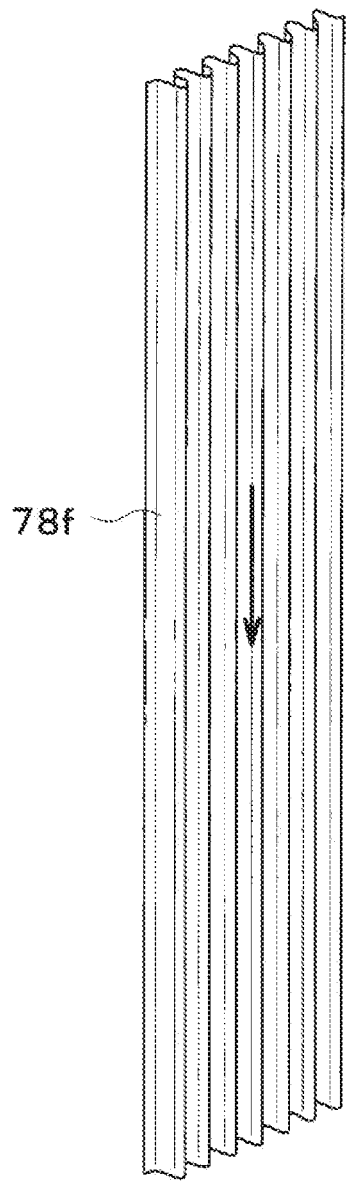
FIG. 19 is an enlarged external perspective view illustrating an interposition member of the combined heat exchanger according to the third embodiment.

As shown in FIG. 19, the interposition member 78f is a metal plate whose cross section is bent in a square wave shape, and has substantially the same shape as the inner plate 78e described in the first embodiment. The surface of the interposition member 78f that protrudes toward the recovery tube 72 is brazed to the flat surface of the recovery tube 72. The surface of the interposition member 78f that protrudes toward the heat-discharge tube 75 is brazed to the flat surface of the heat discharge tube 75.

Therefore, a plurality of spaces surrounded by the outer surface of the recovery tube 72, the outer surface of the heat discharge tube 75, and the interposition member 78f are formed as a refrigerant passage between the recovery tube 72 and the heat discharge tube 75. In the combined heat exchanger 611, this refrigerant passage is used as a heating tube for flowing the heating refrigerant from the upper side to the lower side. In other words, in the combined heat exchanger 611, a heating tube is defined by the outer surface of the recovery tube 72, the outer surface of the heat-discharge tube 75, and the interposition member 78f.

Figure 17:
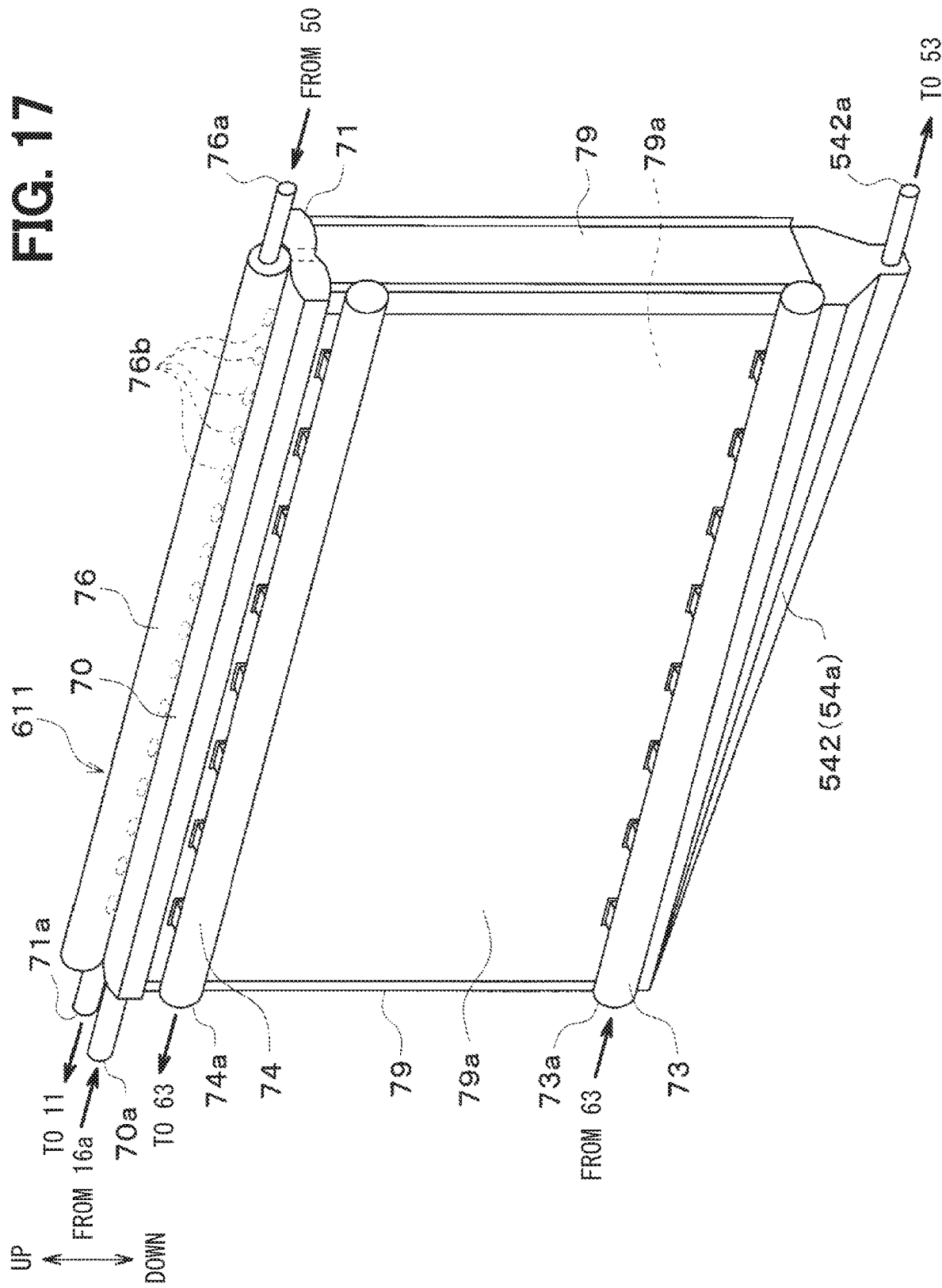
FIG. 17 is an external perspective view illustrating a combined heat exchanger according to the third embodiment.
Figure 18:
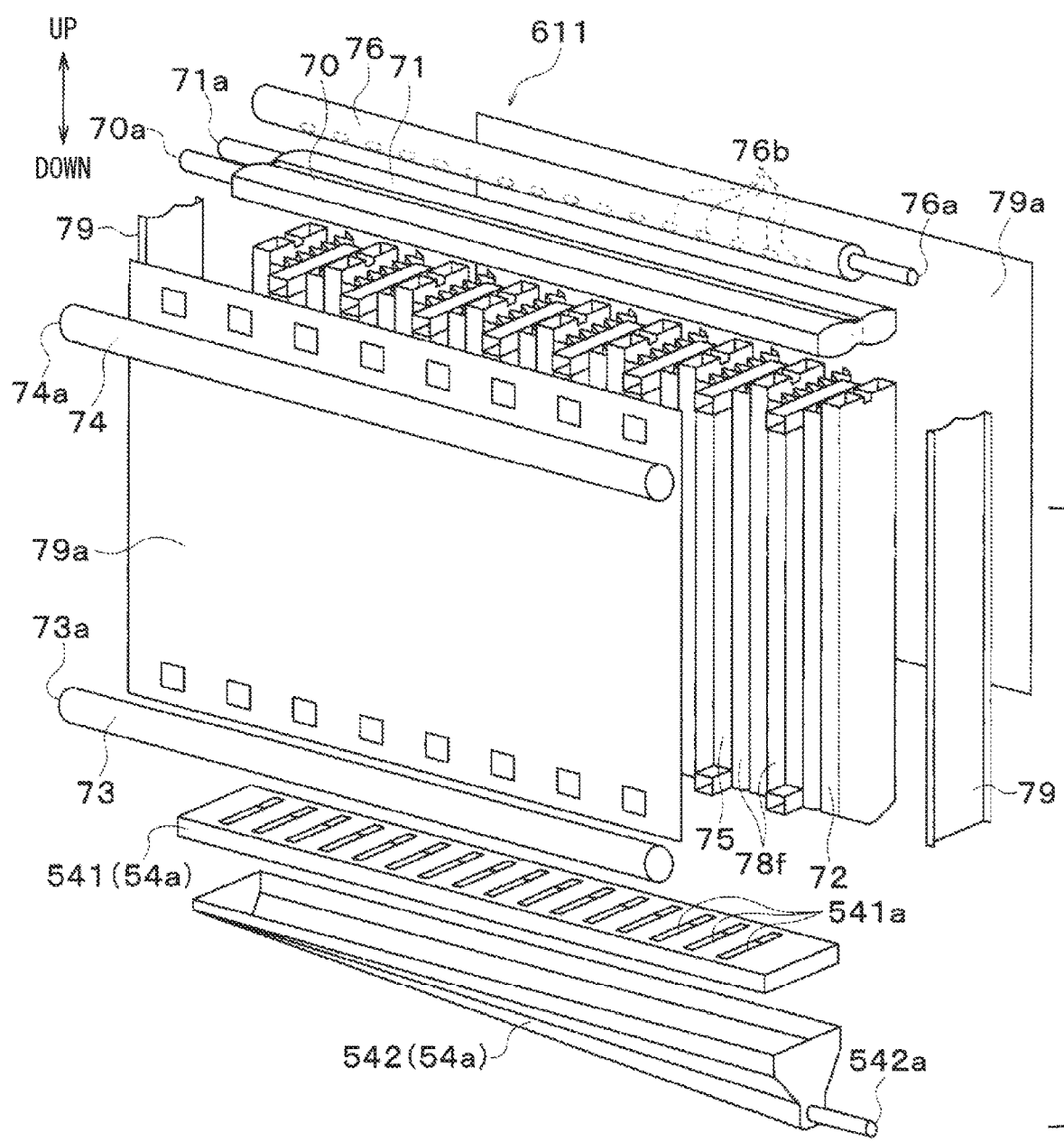
FIG. 18 is an exploded perspective view illustrating the combined heat exchanger according to the third embodiment.

Further, as shown in FIGS. 17 and 18, the combined heat exchanger 611 is provided with a panel plate 79a formed of a thin metal plate and extending in parallel to the stacking direction of the tubes and the longitudinal direction of the tubes (that is, the refrigerant flow direction). The panel plate 79a is brazed and joined to stacking surfaces at both sides of the stacked tube structure. For this reason, the heating refrigerant flowing in the heating tube with the stacking surfaces does not leak outside.

Further, in the combined heat exchanger 611, the heating distribution pipe 76, the recovery distribution pipe 70, and the recovery joint pipe 71 are arranged in parallel. More specifically, the cylindrical side surface of the heating distribution pipe 76 is arranged so as to contact both the cylindrical side surface of the recovery distribution pipe 70 and the cylindrical side surface of the recovery joint pipe 71. The heating distribution pipe 76 is arranged at an upper side between the recovery distribution pipe 70 and the recovery joint pipe 71.

A plurality of distribution holes 76b are formed in the cylindrical side surface of the heating distribution pipe 76. The distribution hole 76b of the heating distribution pipe 76 is a refrigerant outlet port through which the heating refrigerant flowing from the refrigerant inlet 76a of the heating distribution pipe 76 flows to the heating tube side. The heating refrigerant flowing out of the distribution hole 76b is distributed to the respective heating tubes via the space between the recovery distribution pipe 70 and the recovery joint pipe 71.

Further, in the combined heat exchanger 611, the heating storage tank 54a is arranged at a lower side of the recovery tube 72, the heat-discharge tube 75, and the interposition member 78f. The heating storage tank 54a includes a plate header 541 and a tank header 542.

The plate header 541 is connected to respective the lower ends of the heat-discharge tubes 75. The plate header 541 is provided with a plurality of slit holes 541a through which the heating refrigerant flowing through the heating tubes flows out. The tank header 542 is a tank space forming member that is combined with the plate header 541 to form a storage space for storing therein the heating refrigerant in a liquid phase state.

The storage space formed by combining the tank header 542 and the plate header 541 is formed in an elongated shape extending in the stacking direction of the recovery tubes 72, the heat-discharge tubes 75, and the interposition member 78f. Therefore, the heating storage tank 54a serves as a tank portion that collects the refrigerant flowing through the heating tubes, similarly to the heating joint pipe 77 described in the first embodiment.

Further, the storage space is formed in such a shape that the dimension in the depth direction becomes larger as being closer to the refrigerant outlet 542a formed at the other end of the tank header 542 in the tank longitudinal direction. The refrigerant outlet 542a of the heating storage tank 54a is arranged on a lowermost side of the tank header 542. Therefore, in the heating storage tank 54a, the heating refrigerant in the liquid phase is surely and easily discharged from the refrigerant outlet 542a.

Further, the controller 90 of the present embodiment is connected to a heat-discharge liquid-phase refrigerant temperature sensor 91j, an upstream heating refrigerant temperature sensor 91k, and a downstream heating refrigerant temperature sensor 91m of a control sensor group.

The heat-discharge liquid-phase refrigerant temperature sensor 91j is a refrigerant temperature detector configured to detect a heat-discharge liquid-phase refrigerant temperature Trhr that is the temperature of the heat-discharge refrigerant in the liquid phase flowing through the refrigerant passage extending from the outlet of the heat-discharge storage tank 64a to a suction port of the heat-discharge refrigerant pump 65b. Here, the heat-discharge liquid-phase refrigerant temperature Trhr is a physical quantity having a correlation with the heat-discharge refrigerant pressure Prh. Therefore, the heat-discharge liquid-phase refrigerant temperature sensor 91j also functions as a heat-discharge refrigerant pressure detector.

The upstream heating refrigerant temperature sensor 91k is a temperature detector configured to detect an in-vehicle device upstream temperature TepU. The in-vehicle device upstream temperature TepU is a temperature of the heating refrigerant flowing into a most upstream refrigerant passage of the refrigerant passage 50a to 53a formed in the in-vehicle devices 50 to 53. In the present embodiment, the most upstream refrigerant passage is the refrigerant passage 53a of the vehicle-running electric motor 53.

The downstream heating refrigerant temperature sensor 91m is a temperature detector configured to detect a downstream temperature TepL of the in-vehicle device. The in-vehicle device downstream-side temperature TepL is the temperature of the heating refrigerant flowing out of a most downstream refrigerant passage of the refrigerant passages 50a to 53a formed in the in-vehicle devices 50 to 53. In the present embodiment, the most downstream refrigerant passage is the refrigerant passage 50a formed in the battery 50. The other configurations of the vehicle thermal management system 1 of the present embodiment are the same as those of the first embodiment.

An operation of the above configuration according to the present embodiment will be next described. The operation in the air conditioning control of the vehicle thermal management system 1 of the present embodiment is similar to that of the first embodiment.

In the heat recovery control, the controller 90 operates the heating refrigerant pump 68b so that the in-vehicle device downstream-side temperature TepL is maintained within the usable temperature range of the battery 50. As a result, the temperatures of the in-vehicle devices 50 to 53 are controlled to be maintained within their respective usable temperature ranges.

More specifically, the controller 90 controls the heating refrigerant pump 68b to be operated when the in-vehicle device downstream temperature TepL becomes equal to or higher than the reference upper limit temperature KTep1. Further, when the temperature TepL on the downstream side of the in-vehicle device becomes equal to or lower than the reference lower limit temperature KTep2, the heating refrigerant pump 68b is stopped.

Further, the controller 90 controls operation of the heating refrigerant pump 68 so that the superheat degree of the heating refrigerant on the outlet side of the refrigerant passage connected to the most downstream side of the refrigerant flow among the refrigerant passages 50a to 53a of the in-vehicle devices 50 to 53 approaches a predetermined reference superheat degree. In the present embodiment, the refrigerant passage connected to the most downstream side of the refrigerant flow is the refrigerant passage 50a of the battery 50. The reference superheat degree is set to 0 degrees Celsius, for example. In other words, the controller 90 controls the opening degree of the heating refrigerant pump 68b so that the superheat degree of the refrigerant flowing into the heating circulation section 61b approaches the reference superheat degree.

At this time, the controller 90 detects the saturation temperature of the heating refrigerant flowing into the refrigerant passage arranged on the most downstream side of the refrigerant flow among the refrigerant passages 50a to 53a, based on the in-vehicle device upstream temperature TepU. Further, the controller 90 detects the degree of superheat of the heating refrigerant flowing out of the refrigerant passage arranged on the most downstream side of the refrigerant flow among the refrigerant passages 50a to 53a, based on the temperature difference obtained by subtracting the in-vehicle device upstream temperature TepU from the in-vehicle device downstream temperature TepL.

Further, in the heat discharge control, the controller 90 controls the operation of the heat-discharge refrigerant pump 65b so that the heat-discharge liquid-phase refrigerant temperature Trhr is maintained within a predetermined reference temperature range. As a result, the exhaust heat of the in-vehicle devices 50 to 53 is properly radiated to the outside air.

More specifically, the controller 90 operates the heat-discharge refrigerant pump 65b when the heat discharge liquid-phase refrigerant temperature Trhr becomes equal to or higher than a predetermined heat-discharge reference upper limit temperature KTrh1. Further, when the heat-discharge liquid-phase refrigerant temperature Trhr becomes equal to or lower than a heat-discharge reference lower limit temperature KTrh2, the heat-discharge refrigerant pump 65b is stopped.

Further, the controller 90 increases the pumping capacity (i.e., pressure-sending capacity) of the heat-discharge refrigerant pump 65b as a difference value obtained by subtracting the heat-discharge reference upper limit temperature KTrh1 from the heat-discharge liquid-phase refrigerant temperature Trhr increases.

Here, the heat-discharge liquid-phase refrigerant temperature Trhr is a physical quantity having a correlation with the heat-discharge refrigerant pressure Prh. Therefore, in the heat discharge control of the present embodiment, the controller 90 controls the operation of the heat-discharge refrigerant pump 65b so that the heat-discharge refrigerant pressure Prh is substantially maintained within a predetermined reference pressure range.

Since the vehicle thermal management system 1 of the present embodiment operates as described above, the exhaust heat of the in-vehicle devices 50 to 53 that generate heat during operation can be effectively used as a heat source for heating the ventilation air, as in the first embodiment. Further, the residual exhaust heat that does not need to be used to heat the ventilation air can be quickly radiated to the outside air, and the temperature rise of the in-vehicle devices 50 to 53 can be suppressed with a high responsibility.

Further, in the vehicle thermal management system 1 of the present embodiment, since the heat-discharge refrigerant circulation circuit 3 is provided with the heat-discharge refrigerant pump 65b, it can suppress a sudden change in the flow rate of the refrigerant circulating in the heat-discharge refrigerant circulation circuit 3. As a result, it is possible to realize a stable flow rate control by suppressing a hypersensitive control or a response delay due to overshoot.

In addition to this, the heat-discharge refrigerant can be forcibly circulated by the refrigerant-discharge capability of the heat-discharge refrigerant pump 65b, so that the circulation flow rate of the heat-discharge refrigerant circulating in the heat-discharge refrigerant circulation circuit 3 can be adjusted more appropriately.

Further, in the vehicle thermal management system 1 of the present embodiment, since the heat-discharge storage tank 64a is arranged in the heat-discharge refrigerant circulation circuit 3, liquid-phase heat-discharge refrigerant can flow into the heat-discharge refrigerant pump 65b. According to this, it is possible to suppress mixing of particles (that is, bubbles) of the gas-phase refrigerant in the liquid-phase refrigerant, and to suppress idle running of the heat-discharge refrigerant pump 65b, so as to realize more stable flow rate control.

Further, since the heating refrigerant pump 68b and the heating storage tank 54a are arranged in the heating refrigerant circulation circuit 5, the stability of the flow rate control of the heating refrigerant circulating in the heating refrigerant circulation circuit 5 can be improved, similarly to the heat-discharge refrigerant circulation circuit 3.

In the vehicle thermal management system 1 of the present embodiment, the controller 90 adjusts the operation of the heating refrigerant pump 68b so that the superheat degree of the heating refrigerant on the outlet side of the refrigerant passage 50a formed in the battery 50 approaches the reference superheat degree. According to this, as in the second embodiment, it is possible to improve the cooling efficiency of the in-vehicle devices 50 to 53.

Further, in the vehicle thermal management system 1 of the present embodiment, the heat discharge storage tank 64a and the heating storage tank 54a are arranged. Therefore, the mountability of the vehicle thermal management system 1 to be mounted to a vehicle can be improved. Further, since the heating storage tank 54a is formed integrally with the combined heat exchanger 611, the mountability when the vehicle thermal management system 1 is mounted on the vehicle can be further improved.

In the combined heat exchanger 611, the heating tube in which the heating refrigerant flows from an upper side to a lower side is formed by the outer surface of the recovery tube 72, the outer surface of the heat-discharge tube 75, and the interposition member 78f. According to this, the thickness of the metal interposed between the refrigerants is reduced, and the heat exchange efficiency between the refrigerants can be further improved.

Fourth Embodiment

Figure 20:
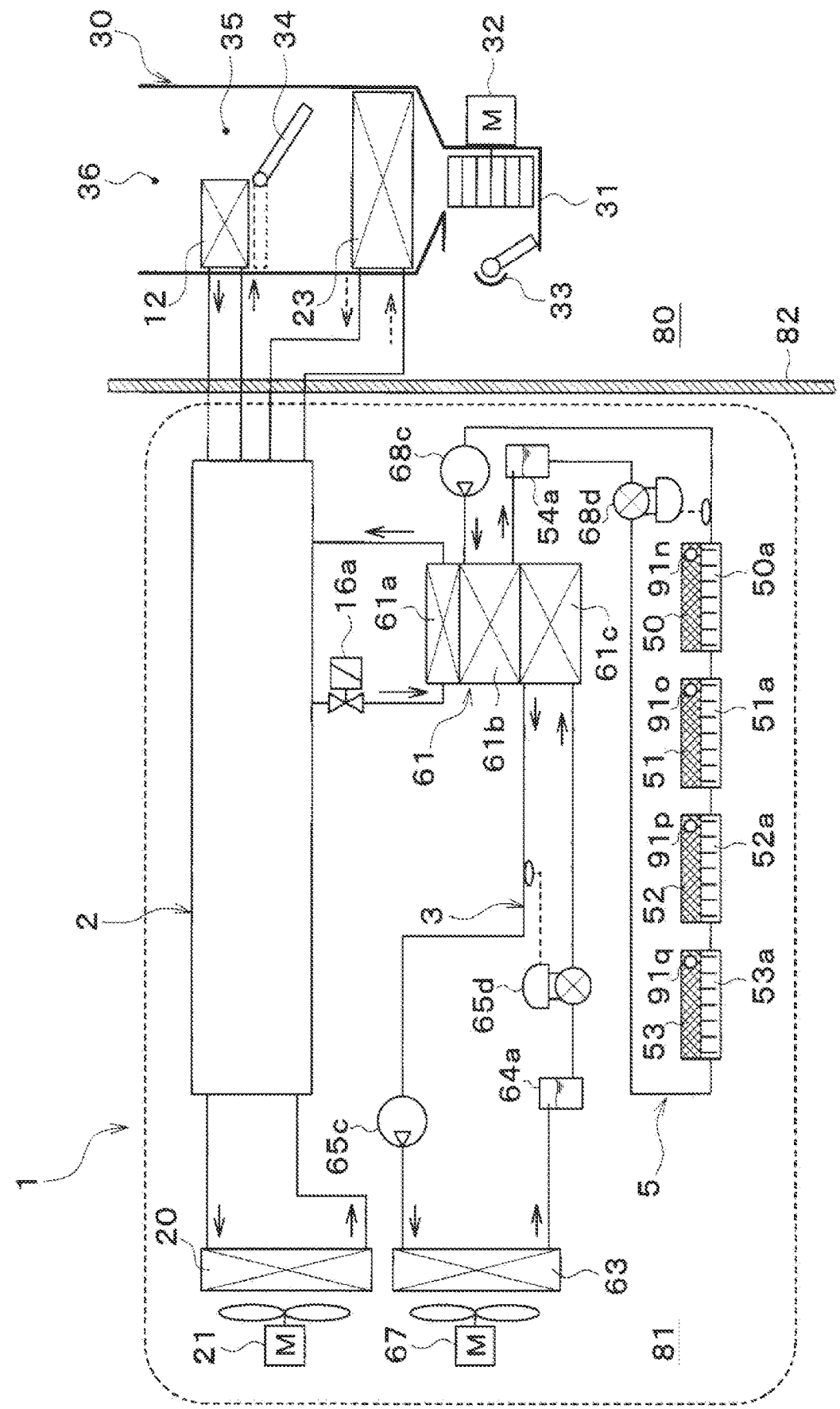
FIG. 20 is a diagram illustrating an entire configuration of a vehicle thermal management system according to a fourth embodiment.

In the present embodiment, an example in which the configurations of the heat-discharge refrigerant circulation circuit 3 and the heating refrigerant circulation circuit 5 are changed from the first embodiment as shown in the overall configuration diagram of FIG. 20 will be described.

Specifically, in the heat-discharge refrigerant circulation circuit 3 of the present embodiment, a heat-discharge compressor 65c and a heat-discharge expansion valve 65d are used instead of the heat-discharge open-close valve 65. Further, a heat-discharge storage tank 64a is used as in the second embodiment.

The heat-discharge compressor 65c is a compressor that compresses the gas-phase heat-discharge refrigerant flowing out of the heat-discharge circulation section 61c, and discharges the compressed refrigerant The heat-discharge compressor 65c is a single-stage booster-type electric compressor. The operation of the heat-discharge compressor 65c is controlled by a control signal output from a controller 90.

Further, the heat-discharge compressor 65c has a function of blocking inflow of the heat-discharge refrigerant thereinto when the heat-discharge compressor 65c is stopped. Therefore, the heat-discharge compressor 65c also has a function as a refrigerant circulation shutter that interrupts the circulation of the heat-discharge refrigerant.

The heat-discharge expansion valve 65d is a thermal expansion valve that reduces the pressure of the liquid heat-discharge refrigerant flowing out of the heat-discharge storage tank 64a. The basic configuration of the heat-discharge expansion valve 65d is the same as that of the recovery expansion valve 60 of the heat pump cycle 2. The heat-discharge expansion valve 65d changes its degree of throttling such that a superheat degree of the heat-discharge refrigerant on an outlet side of the heat-discharge circulation section 61c of the combined heat exchanger 61 approaches a predetermined reference superheat degree.

In other words, in the heat-discharge refrigerant circuit 3 of the present embodiment, a vapor-compression refrigeration cycle is formed in which the heat-discharge refrigerant evaporates in the heat-discharge circulation section 61c while the heat-discharge refrigerant releases the absorbed heat to the outside air and condenses in the heat-discharge outdoor heat exchanger 63.

Further, in the heating refrigerant circulation circuit 5 of the present embodiment, a heating compressor 68c and a heating expansion valve 68d are adopted instead of the heating open-close valve 68. Further, a heating storage tank 54a is used as in the second embodiment.

The heating compressor 68c is a compressor that compresses and discharges the heating refrigerant in the vapor phase flowing out of the refrigerant passages 50a to 53a formed in the in-vehicle devices 50 to 53. The basic configuration of the heating compressor 68c is the same as that of the heat-discharge compressor 65c. Therefore, the heating compressor 68c also has a function as a refrigerant circulation shutter that interrupts the circulation of the heating refrigerant.

The heating expansion valve 68d is a thermal expansion valve that reduces the pressure of the liquid-phase heating refrigerant flowing out of the heating storage tank 54a. The basic configuration of the heating expansion valve 68d is the same as that of the heating expansion valve 65d. The heating expansion valve 68d changes the throttle opening so that the superheat degree of the heating refrigerant drawn into the heating compressor 68c approaches a predetermined reference superheat degree.

That is, in the heating refrigerant circulation circuit 5 of the present embodiment, the heating refrigerant is evaporated in the refrigerant passages 50a to 53a formed in the in-vehicle devices 50 to 53. A vapor compression refrigeration cycle is constructed in which the heat absorbed from the in-vehicle devices 50 to 53 is radiated to the cycle refrigerant or the heat-discharge refrigerant in the heating circulation section 61b to condense the heating refrigerant.

Further, the in-vehicle device temperature sensor 91h for management is omitted from the control sensor group, and the first to fourth in-vehicle device temperature sensors 91n to 91q are connected to the controller 90 of the present embodiment. The first in-vehicle device temperature sensor 91n is a battery temperature detector configured to detect a first in-vehicle device temperature Tve1 that is a temperature of the battery 50. Therefore, the first in-vehicle device temperature sensor 91n is substantially the same as the management in-vehicle device temperature sensor 91h described in the first embodiment.

The second in-vehicle device temperature sensor 91o is a charging generator temperature detector configured to detect a second in-vehicle device temperature Tve2 that is a temperature of the charging generator 51. The third in-vehicle device temperature sensor 91p is a power control unit temperature detector configured to detect a third in-vehicle device temperature Tve3 that is a temperature of the power control unit 52. The fourth in-vehicle device temperature sensor 91q is a vehicle-running electric motor temperature detector configured to detect a fourth in-vehicle device temperature Tve4 that is a temperature of the vehicle-running electric motor 53.

The first to fourth in-vehicle device temperature sensors 91n to 91q may be a plurality of temperature sensors each of which is similar to the management in-vehicle device temperature sensor 91h. The other configurations of the vehicle thermal management system 1 are the same as those of the first embodiment.

An operation of the above configuration according to the present embodiment will be next described. The operation in the air conditioning control of the vehicle thermal management system 1 of the present embodiment is similar to that of the first embodiment.

In the heat recovery control, the controller 90 controls the operation of the heating compressor 68c so that the first to fourth in-vehicle device temperatures Tve1 to Tve4 detected by the first to fourth in-vehicle device temperature sensors 91n to 91q correspond to the usable temperature ranges of the corresponding in-vehicle devices 50 to 53.

Specifically, the controller 90 causes the heating compressor 68c to be operated when at least one of the first to fourth in-vehicle device temperatures Tve1 to Tve4 is higher than the reference upper limit temperature set within the usable temperature range of the corresponding in-vehicle devices 50 to 53. Further, the controller 90 stops the heating compressor 68c when at least one of the first to fourth in-vehicle device temperatures Tve1 to Tve4 is lower than a reference lower limit temperature set within the usable temperature range of the corresponding in-vehicle device 50 to 53.

Further, in the heat discharge control, the controller 90 operates the heat-discharge compressor 65c in connection with the operation state of the heating compressor 68c.

Here, when the controller 90 operates the heating compressor 68c, the exhaust heat of the in-vehicle devices 50 to 53 is absorbed by the heating refrigerant, and the exhaust heat absorbed by the heating refrigerant is released to the cycle refrigerant or the heat-discharge refrigerant in the combined heat exchanger 61. Therefore, the controller 90 operates the heat-discharge compressor 65c when the heating compressor 68c operates. Further, when the air conditioning control is in the low-temperature heating mode, the refrigerant discharge capacity of the heat-discharge compressor 65c is reduced.

Since the vehicle thermal management system 1 of the present embodiment operates as described above, the exhaust heat of the in-vehicle devices 50 to 53 that generate heat during operation can be effectively used as a heat source for heating the ventilation air, as in the first embodiment. Further, the residual exhaust heat that does not need to be used to heat the ventilation air can be quickly radiated to the outside air, and the temperature rise of the in-vehicle devices 50 to 53 can be suppressed with a high responsibility.

In the vehicle thermal management system 1 of the present embodiment, the heating refrigerant circulation circuit 5 is adapted to configure a vapor-compression refrigeration cycle. The refrigerant passages 50a to 53a formed in the in-vehicle devices 50 to 53 function as an evaporator. Therefore, the in-vehicle devices 50 to 53 can be reliably cooled. Further, by changing the refrigerant discharge capacity of the heating compressor 68c according to the heat generation amount of the in-vehicle devices 50 to 53, the respective temperatures of the in-vehicle devices 50 to 53 can be easily maintained within the usable temperature range.

In the vehicle thermal management system 1 of the present embodiment, the heat-discharge refrigerant circulation circuit 3 is adapted to configure a vapor-compression refrigeration cycle. In this case, the heat-discharge circulation section 61c functions as an evaporator. Therefore, the exhaust heat of the in-vehicle devices 50 to 53 can be surely dissipated from the heating refrigerant to the heat-discharge refrigerant. Furthermore, by an operation link control in which the heat-discharge compressor 65c and the heating compressor 68c are operatively linked with each other, it is possible to properly dissipate the waste heat of the in-vehicle devices 50 to 53 to the outside air, while suppressing the waste heat of the in-vehicle devices 50 to 53 from being unnecessarily dissipated to the outside air.

Fifth Embodiment

Figure 21:
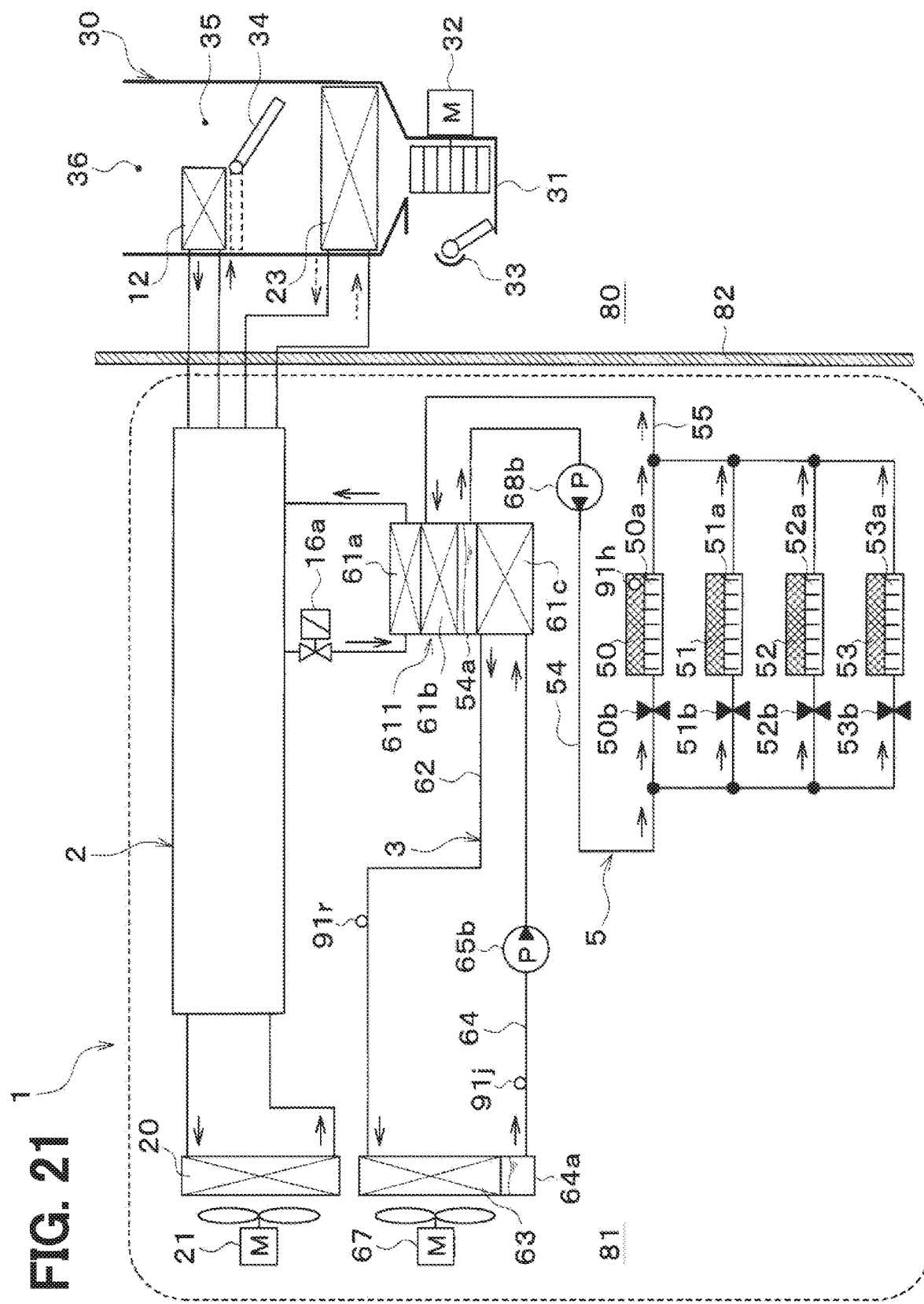
FIG. 21 is a diagram illustrating an entire configuration of a vehicle thermal management system according to a fifth embodiment.

In the present embodiment, as shown in the schematic diagram of FIG. 21, an example will be described, in which the configuration of the heating refrigerant circuit 5 is changed from that of the third embodiment.

Further, in this embodiment, the refrigerant passages 50a to 53a provided in the in-vehicle devices 50 to 53 are connected in parallel. Fixed throttles 50b to 53b as heating decompression units for decompressing the heating refrigerant flowing into the respective refrigerant passages 50a to 53a are arranged at the refrigerant flow upstream side of the respective refrigerant passages 50a to 53a. As the fixed throttles 50b to 53b, an orifice, a capillary tube, a nozzle or the like can be used.

Therefore, in the present embodiment, in a condition where the temperature of the battery 50 that is the management in-vehicle temperature Tep is maintained within a usable temperature range of the battery 50, the pressure coefficients (i.e., passage resistances) of the fixed throttles 50b to 53b are set so that the temperatures of the other in-vehicle devices 51 to 53 can be maintained in the respective usable temperature ranges.

Further, to the controller 90 of the present embodiment, in addition to the heat-discharge liquid-phase refrigerant temperature sensor 91j, a heat-discharge gas-phase refrigerant temperature sensor 91r of a control sensor group, is connected. The heat-discharge gas-phase refrigerant temperature sensor 91r is a refrigerant temperature detector configured to detect a heat-discharge gas-phase refrigerant temperature Trhg that is the temperature of the heat-discharge refrigerant in the gas phase flowing through the refrigerant passage extending from the outlet of the heat-discharge circulation section 61c to a refrigerant inlet of the heat-discharge outdoor heat exchanger 63. The other configurations of the vehicle thermal management system 1 are the same as those of the third embodiment.

An operation of the above configuration according to the present embodiment will be next described. The operation in the air conditioning control of the vehicle thermal management system 1 of the present embodiment is similar to that of the first embodiment.

In the heat recovery control, the controller 90 operates the heating refrigerant pump 68b so that the management in-vehicle device temperature Tep is maintained within the usable temperature range of the battery 50. As a result, the temperatures of the in-vehicle devices 50 to 53 are maintained within the respective usable temperature ranges.

More specifically, the controller 90 operates the heating refrigerant pump 68b when the management in-vehicle device temperature Tep becomes equal to or higher than the reference upper limit temperature KTep1. Further, when the management in-vehicle device temperature Tep becomes equal to or lower than the reference lower limit temperature KTep2, the heating refrigerant pump 68b is stopped. Further, the controller 90 increases the refrigerant pumping capacity of the heating refrigerant pump 68b, as the different value, obtained by subtracting the reference upper limit temperature KTep1 from the management in-vehicle device temperature Tep, increases.

Further, in the heat-discharge control, the controller 90 controls the operation of the heat-discharge refrigerant pump 65b so that the heat-discharge liquid-phase refrigerant temperature Trhr is maintained within a predetermined reference temperature range, similarly to the third embodiment.

Further, the controller 90 controls operation of the heat-discharge refrigerant pump 65b so that the heat-discharge refrigerant flowing out from the heat discharge circulation section 61c approaches a predetermined reference superheat degree (0° C. in the present embodiment). At this time, the controller 90 detects the superheat degree of the heat-discharge refrigerant flowing out of the heat-discharge circulation section 61c based on the heat-discharge liquid-phase refrigerant temperature Trhr and the heat-discharge gas-phase refrigerant temperature Trhg.

Since the vehicle thermal management system 1 of the present embodiment operates as described above, the exhaust heat of the in-vehicle devices 50 to 53 that generate heat during operation can be effectively used as a heat source for heating the ventilation air, as in the third embodiment. Further, the residual exhaust heat that does not need to be used to heat the ventilation air can be quickly radiated to the outside air, and the temperature rise of the in-vehicle devices 50 to 53 can be suppressed with a high responsibility.

Further, in the vehicle thermal management system 1 of the present embodiment, the controller 90 controls the operation of the heat-discharge refrigerant pump 65b so that the superheat degree of the heat-discharge refrigerant flowing out of the heat-discharge circulation section 61c approaches the reference superheat degree. According to this, the flow rate of the heat-discharge refrigerant circulating in the heat-discharge refrigerant circulation circuit 3 is appropriately adjusted to prevent the waste heat of the in-vehicle devices 50 to 53 from being unnecessary discharged to the outside air.

Further, in the vehicle thermal management system 1 of the present embodiment, the refrigerant passages 50a to 53a formed in the in-vehicle devices 50 to 53 are connected in parallel, and the fixed throttles 50b to 53b are arranged at upstream sides in the respective refrigerant passages 50a to 53a. According to this, it is possible to supply an appropriate flow rate of the heating refrigerant to each of the refrigerant passages 50a to 53a in accordance with the amount of heat generated by each of the in-vehicle devices 50 to 53.

Sixth Embodiment

Figure 22:
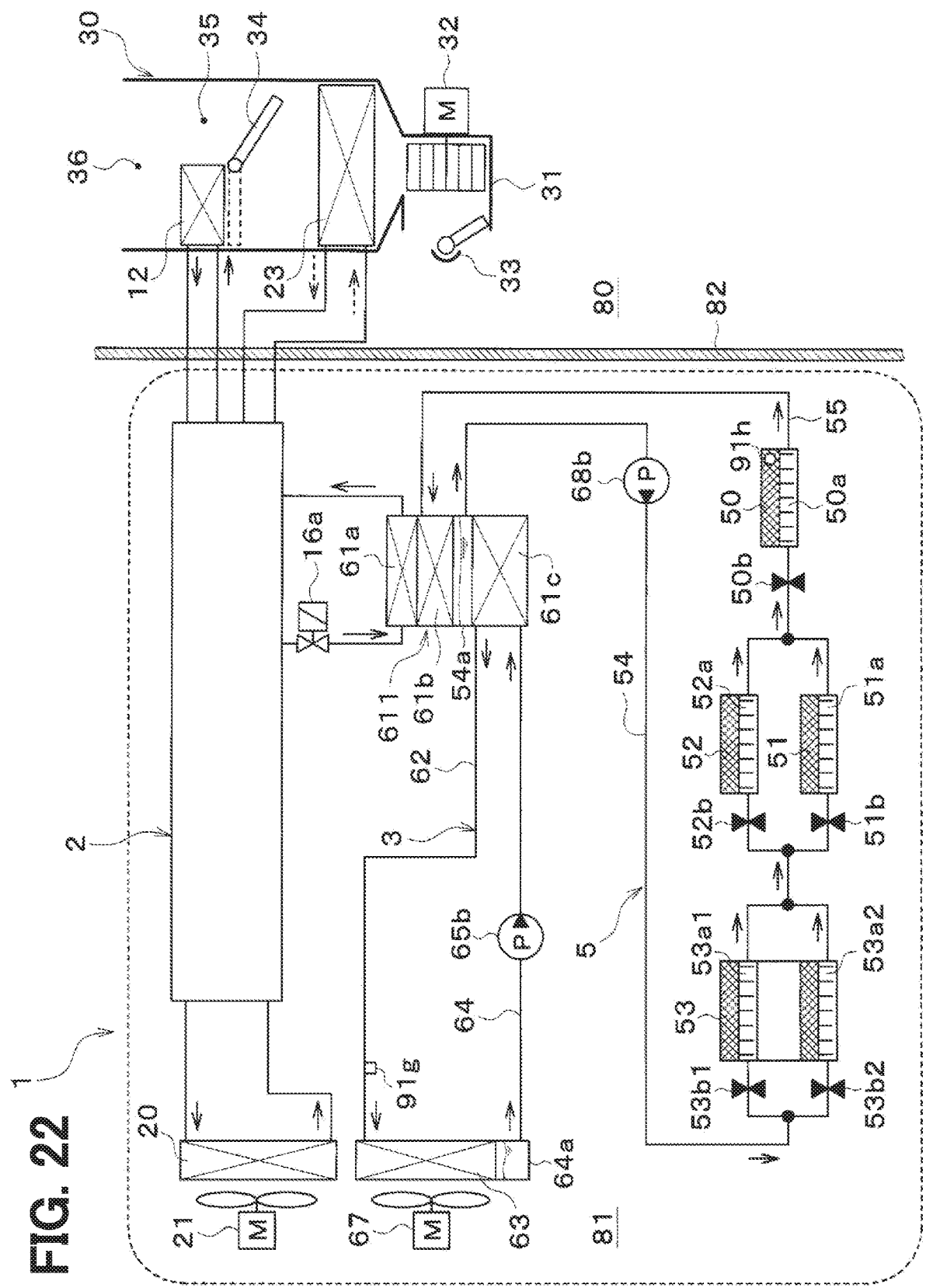
FIG. 22 is a diagram illustrating an entire configuration of a vehicle thermal management system according to a sixth embodiment.

In the present embodiment, as shown in the schematic diagram of FIG. 22, an example will be described, in which the configuration of the heating refrigerant circuit 5 is changed from that of the third embodiment.

Specifically, the vehicle-running electric motor 53 of the present embodiment has two refrigerant passages that are a first refrigerant passage 53a1 and a second refrigerant passage 53a2. The first refrigerant passage 53a1 and the second refrigerant passage 53a2 are connected in parallel with each other. A first fixed throttle 53b1 as a heating decompression unit that decompresses the heating refrigerant flowing into the first refrigerant passage 53a1 and a second fixed throttle 53b2 as a heating decompression unit that decompresses the heating refrigerant flowing into the second refrigerant passage 53a2 are arranged respectively on the refrigerant flow upstream sides of the first refrigerant passage 53a1 and the second refrigerant passage 53a2.

In the heating refrigerant circulation circuit 5, a refrigerant passage 51a formed in the charging generator 51 and a refrigerant passage 52a formed in the electric power control unit 52 are connected to a downstream refrigerant side of the first refrigerant passage 53a1 and the second refrigerant passage 53a2 formed in the vehicle-running electric motor 53. The refrigerant passage 51a and the refrigerant passage 52a are connected in parallel. Therefore, both the refrigerant passage 51a and the refrigerant passage 52a are connected in series with respect to both the first refrigerant passage 53a1 and the second refrigerant passage 53a2 on the downstream side of the refrigerant flow.

In the heating refrigerant circulation circuit 5, the refrigerant passage 50a formed in the battery 50 is connected to a downstream side of both the refrigerant passage 51a formed in the charging generator 51 and the refrigerant passage 52a formed in the power control unit 52. Therefore, the refrigerant passage 50a formed in the battery 50 is serially connected to the downstream refrigerant side of both the refrigerant passage 51a and the refrigerant passage 52a. Fixed throttles 50b to 52b as heating decompression units are arranged respectively on the refrigerant-flow upstream sides of the refrigerant passages 50a to 52a, similar to those in the fifth embodiment.

Therefore, in the present embodiment, in a condition where the temperature of the battery 50 that is the management in-vehicle temperature Tep is maintained within a usable temperature range of the battery 50, the pressure coefficients (i.e., passage resistances) of the fixed throttles 50b to 52b, 53b1, 53b2 are set so that the temperatures of the other in-vehicle devices 51 to 53 are maintained in the respective usable temperature ranges.

Further, the controller 90 of the present embodiment is connected to a heat-discharge refrigerant pressure sensor 91g, a management in-vehicle device temperature sensor 91h and the like of a control sensor group. The other configurations of the vehicle thermal management system 1 are the same as those of the third embodiment.

An operation of the above configuration according to the present embodiment will be next described. The operation in the air conditioning control of the vehicle thermal management system 1 of the present embodiment is similar to that of the first embodiment.

In the heat recovery control, the controller 90 operates the heating refrigerant pump 68b so that the management in-vehicle device temperature Tep is maintained within the usable temperature range of the battery 50. As a result, the temperatures of the in-vehicle devices 50 to 53 are maintained within their respective usable temperature ranges.

More specifically, the controller 90 operates the heating refrigerant pump 68b when the management in-vehicle device temperature Tep becomes equal to or higher than the reference upper limit temperature KTep1. Further, when the management in-vehicle device temperature Tep becomes equal to or lower than the reference lower limit temperature KTep2, the heating refrigerant pump 68b is stopped. Further, the controller 90 increases the refrigerant pumping capacity of the heating refrigerant pump 68b, as the different value, obtained by subtracting the reference upper limit temperature KTep1 from the management in-vehicle device temperature Tep, increases.

In the heat-discharge control, opening-closing control of the heat-discharge open-close valve 65 is performed so that the heat-discharge refrigerant pressure Prh is maintained within a reference pressure range. As a result, the exhaust heat of the in-vehicle devices 50 to 53 is properly radiated to the outside air.

More specifically, the controller 90 causes the heat-discharge refrigerant pump 65b to be operated when the heat-discharge refrigerant pressure Prh becomes equal to or higher than the reference upper limit pressure KPrh1. Further, when the heat-discharge refrigerant pressure Prh becomes equal to or lower than the reference lower limit pressure KPrh2, the operation of the heat-discharge refrigerant pump 65b is stopped. Further, the controller 90 increases the pumping capacity of the heat-discharge refrigerant pump 65b, as the different value, obtained by subtracting the reference upper limit pressure KPrh1 from the heat-discharge refrigerant pressure Prh, increases.

Since the vehicle thermal management system 1 of the present embodiment operates as described above, the exhaust heat of the in-vehicle devices 50 to 53 that generate heat during operation can be effectively used as a heat source for heating the ventilation air, as in the third embodiment. Further, the residual exhaust heat that does not need to be used to heat the ventilation air can be quickly radiated to the outside air, and the temperature rise of the in-vehicle devices 50 to 53 can be suppressed with a high responsibility.

Further, in the vehicle thermal management system 1 of the present embodiment, the refrigerant passages 50a to 52a, 53a1 and 53a2 formed in the in-vehicle devices 50 to 53 are connected in parallel or in series. In addition, fixed throttles 50b to 52b, 53b1 and 53b2 are arranged on the refrigerant-flow upstream sides of the respective refrigerant passages 50a to 52a, 53a1 and 53a2.

According to this, in the in-vehicle devices in which the refrigerant passages are connected in parallel, it is possible to supply an appropriate flow rate of the heating refrigerant to the refrigerant passages of the in-vehicle devices according to the heat generation amount of each in-vehicle device. For example, an appropriate flow rate of the heating refrigerant can be supplied to the refrigerant passage 51a formed in the charging generator 51 and the refrigerant passage 52a formed in the power control unit 52 according to the heat generation amount of the respective in-vehicle device.

Further, in the in-vehicle devices in which the refrigerant passages are connected in series, the refrigerant evaporation temperature in the refrigerant passage formed in the in-vehicle device connected on the downstream side can be changed. For example, the refrigerant evaporation temperature in the refrigerant passage 50a formed in the battery 50 can be changed with respect to the refrigerant passage 51a formed in the charging generator 51 or the refrigerant passage 52a formed in the power control unit 52.

According to this, it is possible to supply the heating refrigerant in an appropriate temperature range to each refrigerant passage in the in-vehicle devices. As a result, the temperatures of the in-vehicle devices 50 to 53 can be adjusted within their respective usable temperature ranges with higher accuracy.

Seventh Embodiment

Figure 23:
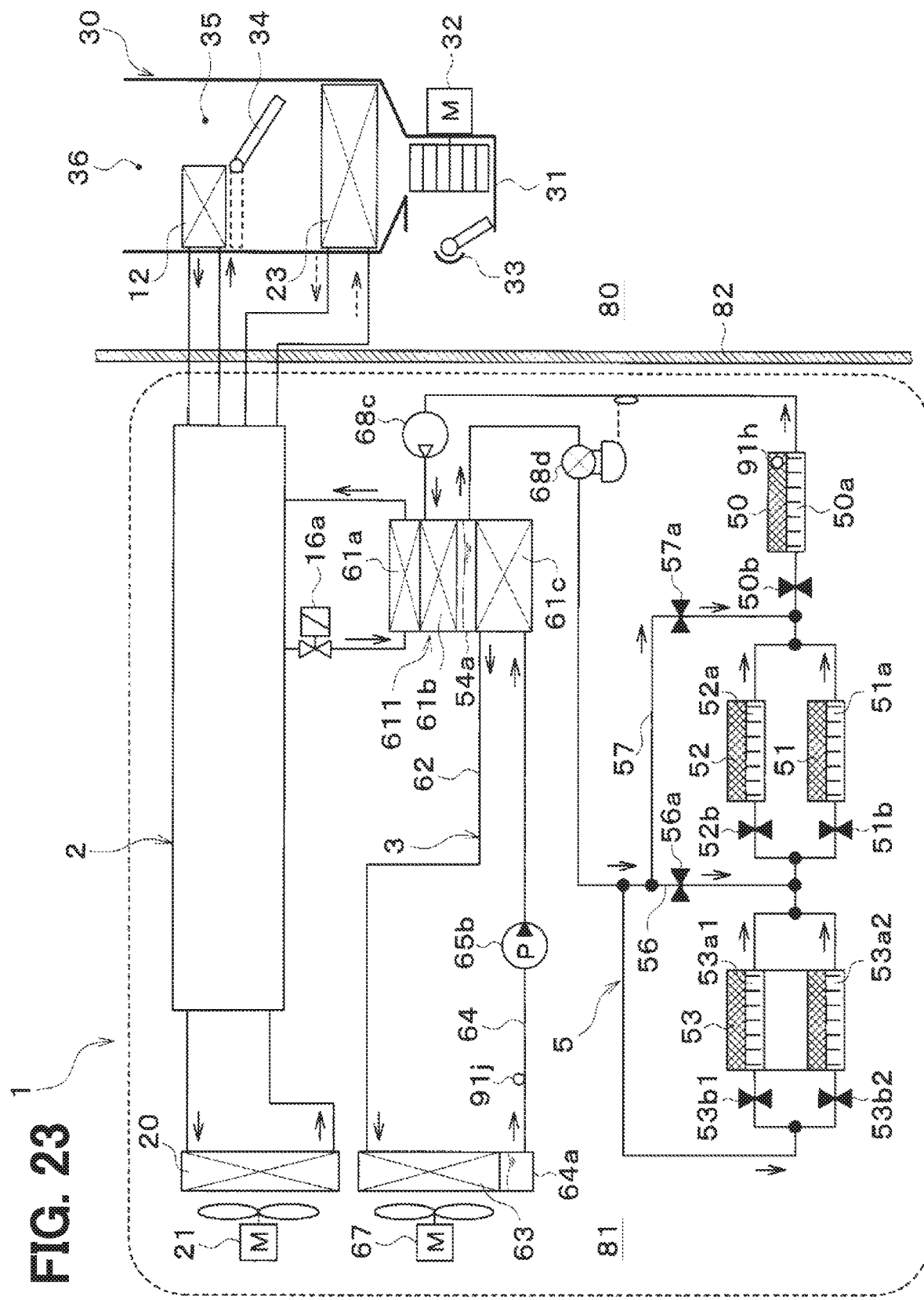
FIG. 23 is a diagram illustrating an entire configuration of a vehicle thermal management system according to a seventh embodiment.

In the present embodiment, an example will be described, in which the configuration of the heating refrigerant circuit 5 is changed from that of the sixth embodiment as shown in the schematic diagram of FIG. 23.

Further, in the heating refrigerant circulation circuit 5 of the present embodiment, a heating compressor 68c and a heating expansion valve 68d are adopted similarly to the fourth embodiment. Further, a first bypass passage 56 and a second bypass passage 57 are connected to the heating refrigerant circulation circuit 5. Through the first bypass passage 56 and the second bypass passage 57, the heating refrigerant decompressed by the heating expansion valve 68d bypasses the first refrigerant passage 53a1 and the second refrigerant passage 53a2 which are used as the heating absorbing portion formed in the vehicle-running electric motor 53.

The first bypass passage 56 is a refrigerant passage through which the heating refrigerant decompressed by the heating expansion valve 68d is introduced to an inlet side of the refrigerant passage 51a formed in the charging generator 51 and the refrigerant passage 52a formed in the power control unit 52 while bypassing the first refrigerant passage 53a1 and the second refrigerant passage 53a2 of the vehicle-running electric motor 53. A first fixed throttle 56a is arranged in the first bypass passage 56.

The second bypass passage 57 is a refrigerant passage through which the heating refrigerant decompressed by the heating expansion valve 68d is introduced to an inlet side of the refrigerant passage 50a formed in the battery 50 while bypassing the first refrigerant passage 53a1 and the second refrigerant passage 53a2. A second fixed throttle 57a is arranged in the second bypass passage 57. The basic configurations of the first fixed throttle 56a and the second fixed throttle 57a are the same as those of the fixed throttles 50b to 53b.

Therefore, in the present embodiment, in a condition where the temperature of the battery 50 that is the management in-vehicle temperature Tep is maintained within a usable temperature range of the battery 50, the pressure coefficients (i.e., passage resistances) of the respective fixed throttles 50b to 53b, 56a, 57a are set so that the temperatures of the other in-vehicle devices 51 to 53 are maintained in the respective usable temperature ranges.

In addition, a management in-vehicle device temperature sensor 91h of the control sensor group is connected to the controller 90 of the present embodiment. The other configurations of the vehicle thermal management system 1 are the same as those of the sixth embodiment.

An operation of the above configuration according to the present embodiment will be next described. The operation in the air conditioning control of the vehicle thermal management system 1 of the present embodiment is similar to that of the first embodiment.

In the heat recovery control, the controller 90 controls operation of the heating compressor 68c so that the management in-vehicle device temperature Tep is maintained within the usable temperature range of the battery 50. Further, in the heat-discharge control, the controller 90 controls the operation of the heat-discharge refrigerant pump 65b so that the heat-discharge liquid-phase refrigerant temperature Trhr is maintained within a predetermined reference temperature range, similarly to the fifth embodiment.

Since the vehicle thermal management system 1 of the present embodiment operates as described above, the exhaust heat of the in-vehicle devices 50 to 53 that generate heat during operation can be effectively used as a heat source for heating the ventilation air, as in the sixth embodiment. Further, the residual exhaust heat that does not need to be used to heat the ventilation air can be quickly radiated to the outside air, and the temperature rise of the in-vehicle devices 50 to 53 can be suppressed with a high responsibility.

Further, the vehicle thermal management system 1 of the present embodiment has the bypass passages 56 and 57 and the fixed throttles 56a and 57a. Therefore, the flow rate of the refrigerant supplied to the refrigerant passages 50a to 52a, 53a1 and 53a2 formed in the in-vehicle devices 50 to 53 can be adjusted more accurately. As a result, the temperatures of the in-vehicle devices 50 to 53 can be adjusted within their respective usable temperature ranges with higher accuracy.

Eighth Embodiment

In the present embodiment, an example in which the structure of the heat pump cycle 2 is changed as compared with the first embodiment will be described.

Figure 24:
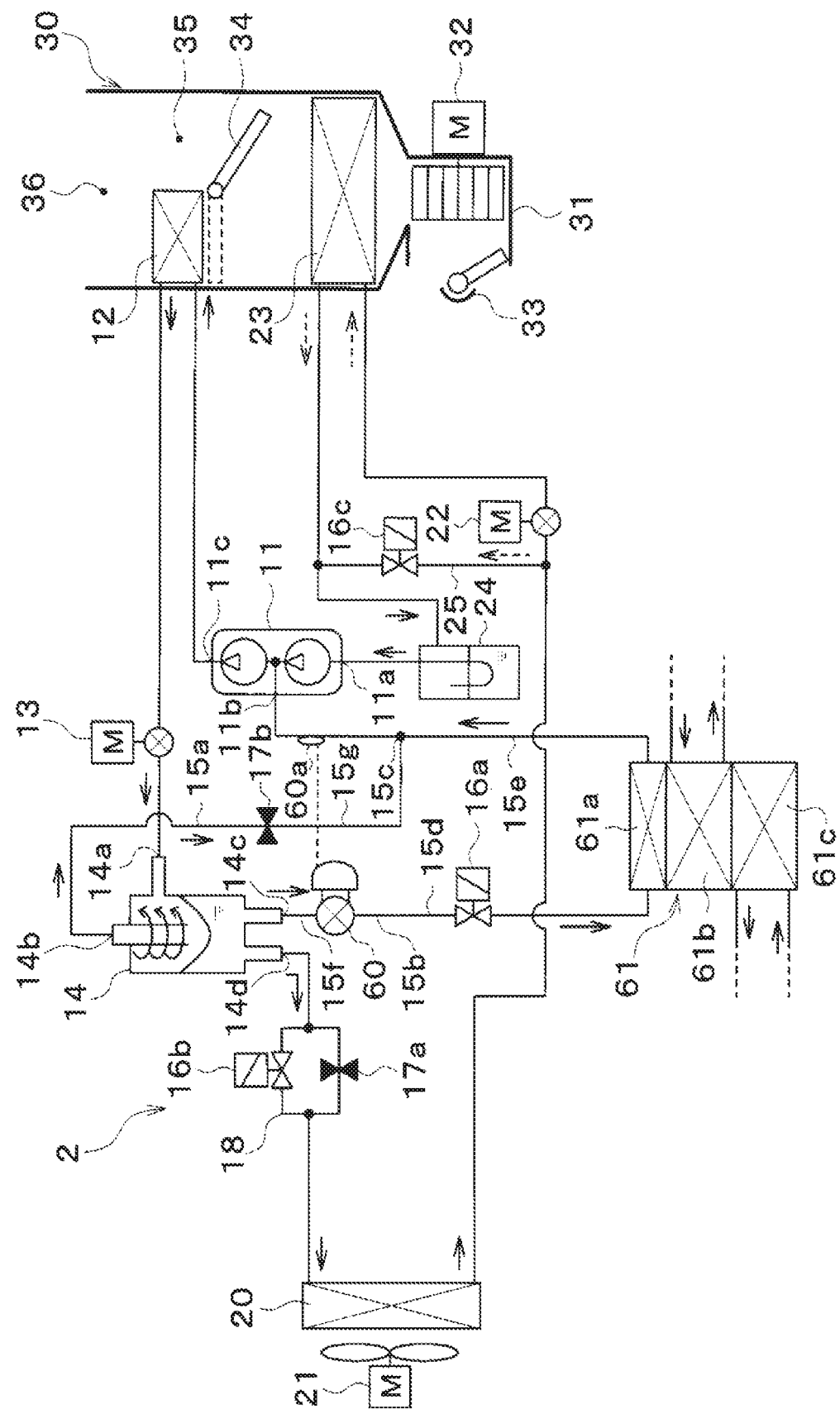
FIG. 24 is a diagram illustrating an entire configuration of a heat pump cycle according to an eighth embodiment.

More specifically, in this embodiment, as shown in the overall configuration diagram of FIG. 24, the arrangement of the joint portion 15c is changed. The joint portion 15c of the present embodiment is arranged in an outlet-side intermediate pressure refrigerant passage 15e at an upstream side of the cycle refrigerant flow with respect to the temperature sensing portion 60a of the recovery expansion valve 60. Therefore, the gas-phase refrigerant flowing out of the gas-phase outflow port 14b of the gas-liquid separator 14 is depressurized by the intermediate-pressure fixed throttle 17b and then guided to the downstream side of the refrigerant flow in the recovery circulation section 61a.

The other configurations and operations of the heat pump cycle 2 and the vehicle thermal management system 1 are the same as those of the fourth embodiment.

In the vehicle thermal management system 1 of the present embodiment, the exhaust heat of the in-vehicle devices 50 to 53 that generate heat during operation can be effectively used as a heat source for heating the ventilation air, as in the first embodiment. Further, the residual exhaust heat that does not need to be used to heat the ventilation air can be quickly radiated to the outside air, and the temperature rise of the in-vehicle devices 50 to 53 can be suppressed with a high responsibility.

Further, in the present embodiment, the gas-phase refrigerant flowing out from the gas-phase outlet port 14b of the gas-liquid separator 14 is guided to the downstream refrigerant side of the recovery circulation section 61a. Thereby, it is possible to reduce the bubbles contained in the liquid-phase refrigerant flowing into the recovery circulation section 61a. In other words, the dryness of the cycle refrigerant flowing into the recovery circulation section 61a can be reduced.

Therefore, the amount of heat absorbed when the cycle refrigerant absorbs heat from the heating refrigerant in the recovery circulation section 61a can be increased. Further, it can suppress an increase in refrigerant-passing sound, an increase in pressure loss, and instability of cycle behavior, which may be caused by the gas-liquid two-phase cycle refrigerant having a high degree of dryness flowing in the recovery circulation section 61a.

Ninth Embodiment

Figure 25:
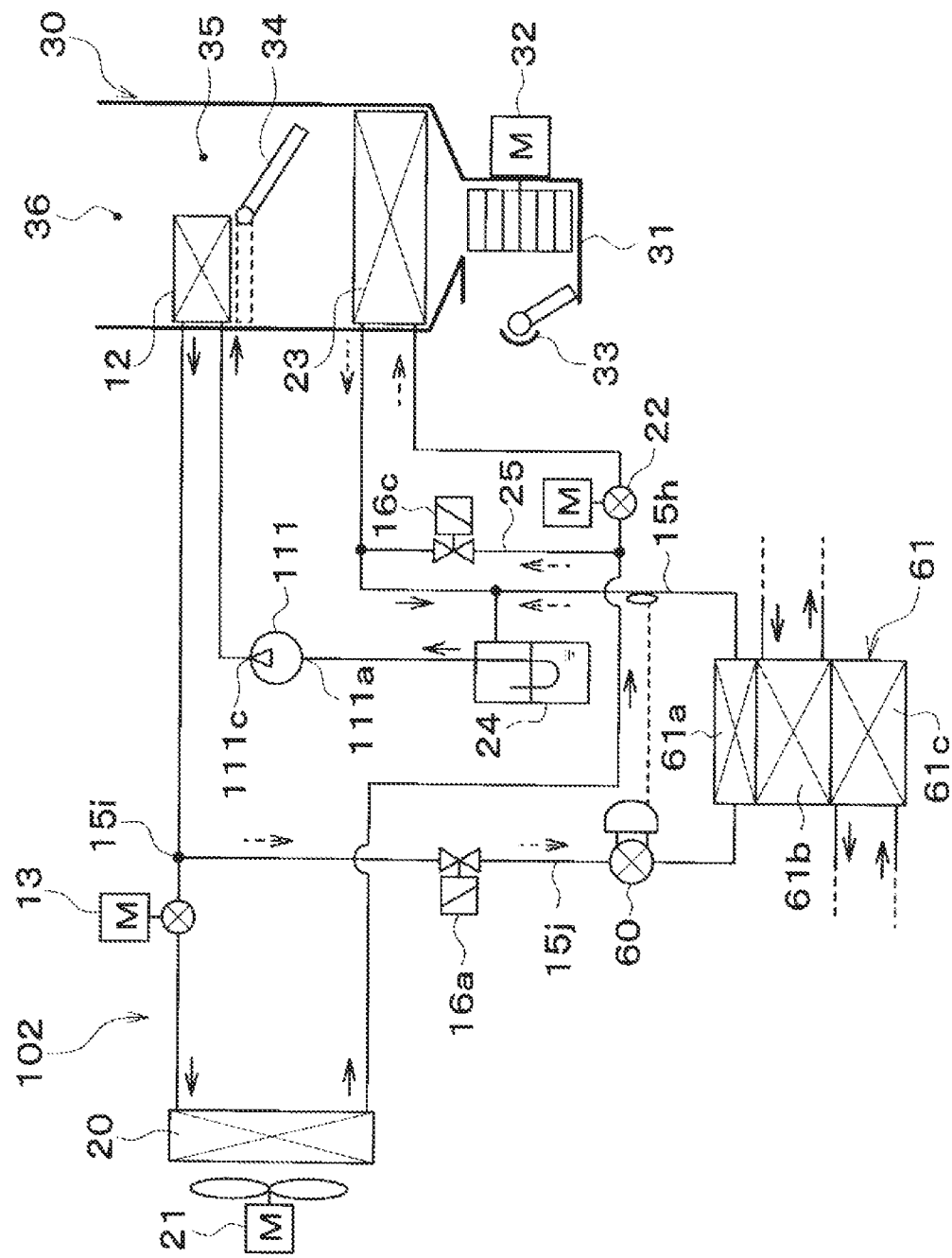
FIG. 25 is a diagram illustrating an entire configuration of a heat pump cycle according to a ninth embodiment.

In the present embodiment, an example, in which the structure of the heat pump cycle is changed as compared with the first embodiment, will be described. Specifically, in this embodiment, a heat pump cycle 102 shown in the overall configuration diagram of FIG. 25 is adopted. The heat pump cycle 102 can switch a refrigerant circuit in accordance with air-conditioning operation mode, similarly to the heat pump cycle 2 described in the first embodiment.

In the heat pump cycle 102 of the present embodiment, a gas injection cycle is not formed. A single-stage electric compressor is used as a compressor 111 that compresses and discharges cycle refrigerant in the heat pump cycle 102. The basic configuration of the compressor 111 is the same as the heat-discharge compressor 65c or the heating compressor 68c described in the fourth embodiment.

A discharge port 111c of the compressor 111 is connected to a refrigerant inlet side of an indoor condenser 12. A refrigerant outlet side of the indoor condenser 12 is connected to a branch portion 15i. The branch portion 15i branches a flow of the refrigerant flowing out of the indoor condenser 12. The branch portion 15i has a three-way joint structure similar to the joint portion 15c described in the first embodiment. In the branch portion 15i, one of the three inflow/outflow ports is used as a refrigerant inflow port, and the other two is used as a refrigerant outflow port.

One of the refrigerant outflow ports of the branch portion 15i is connected to a refrigerant inlet side of an air-conditioning outdoor heat exchanger 20 through a high-pressure control valve 13. A refrigerant outlet side of the air-conditioning outdoor heat exchanger 20 is connected to a refrigerant inlet side of the indoor evaporator 23 through the cooling expansion valve 22. A refrigerant outlet side of the indoor evaporator 23 is connected to an inlet side of an accumulator 24. A gas-phase refrigerant outlet of the accumulator 24 is connected to the suction port 111a of the compressor 111.

In addition, a refrigerant outlet side of the air-conditioning outdoor heat exchanger 20 is connected to an evaporator bypass passage 25 through which the cycle refrigerant flowing out of the air-conditioning outdoor heat exchanger 20 bypasses the cooling expansion valve 22 and the indoor evaporator 23 and flows toward the inlet side of the accumulator 24. A cooling open-close valve 16c is disposed in the evaporator bypass passage 25.

Another of the refrigerant outflow ports of the branch portion 15i is connected to an inlet-side branch refrigerant passage 15j. A recovery open-close valve 16a and a recovery expansion valve 60 are disposed in the inlet-side branch refrigerant passage 15j. In this present embodiment, as shown in FIG. 25, the recovery open-close valve 16a and the recovery expansion valve 60 are arranged in this order in a refrigerant flow direction in the inlet-side branch refrigerant passage 15j, but inversely the recovery expansion valve 60 and the recovery open-close valve 16a may be arranged in this order.

The recovery expansion valve 60 changes its degree of throttling such that a superheat degree of the cycle refrigerant on an outlet side of the recovery circulation section 61a of the combined heat exchanger 61 approaches a predetermined reference superheat degree. An outlet side of the inlet-side branch refrigerant passage 15j is connected to a refrigerant inlet of the recovery circulation section 61a. Further, a refrigerant outlet of the recovery circulation section 61a is connected to the inlet side of the accumulator 24 through an outlet-side branch refrigerant passage 15h.

In the heat pump cycle 102, for example, the gas-liquid separator 14, the low-pressure open-close valve 16b and the low-stage fixed throttle 17a described in the first embodiment are omitted. Other configurations of the heat pump cycle 102 are the same as those of the heat pump cycle 2 described in the first embodiment.

An operation of the above configuration according to the present embodiment will be next described. First, an air conditioning control in a vehicle compartment, executed by the controller 90 of the present embodiment, will be described. The controller 90 switches the operation mode based on the target blowing temperature TAO, the detection signals and the operation signals, similarly to the first embodiment. A detailed operation in each operation mode will be described below.

(a) Cooling Mode

In the cooling mode, the controller 90 controls the high-pressure control valve 13 to be in a fully open state and controls the cooling expansion valve 22 to be in a throttled state to have a pressure reducing action. Further, the controller 90 closes the recovery open-close valve 16a and closes the cooling open-close valve 16c.

Accordingly, in the cooling mode of the heat pump cycle 102, a cycle is formed in which the cycle refrigerant circulates in an order: the discharge port 111c of the compressor 111 (→the indoor condenser 12→the branch portion 15i→the high-pressure control valve 13)→the air-conditioning outdoor heat exchanger 20→the cooling expansion valve 22→the indoor evaporator 23→the accumulator 24→the suction port 111a of the compressor 111.

In the cycle configuration, similarly to the first embodiment, the controller 90 determines control signals or the like to be output to the various control-object devices connected to the output side of the controller 90, and the controller 90 controls the operation of the various control-object devices.

Thus, in the cooling mode of the heat pump cycle 102, a vapor compression refrigeration cycle is formed in which the air-conditioning outdoor heat exchanger 20 functions as a condenser and the indoor evaporator 23 functions as an evaporator. Therefore, in the cooling mode, the ventilation air can be cooled in the indoor evaporator 23 and blown into the vehicle compartment, and thereby the vehicle compartment can be cooled.

(b) Air Mixing Mode

In the air mixing mode, the controller 90 causes the high-pressure control valve 13 into a throttled state and causes the cooling expansion valve 22 into a throttled state. Further, the controller 90 opens the recovery open-close valve 16a and closes the cooling open-close valve 16c.

Accordingly, in the air mixing mode of the heat pump cycle 102, a cycle is formed in which the cycle refrigerant circulates in an order: the discharge port 111c of the compressor 111→the indoor condenser 12→the branch portion 15i→the high-pressure control valve 13→the air-conditioning outdoor heat exchanger 20→the cooling expansion valve 22→the indoor evaporator 23→the accumulator 24→the suction port 111a of the compressor 111. Further, a cycle is formed in which the cycle refrigerant circulates in an order: the discharge port 111c of the compressor 111→the indoor condenser 12→the branch portion 15i→the recovery open-close valve 16a→the recovery expansion valve 60→the recovery circulation section 61a of the combined heat exchanger 61→the accumulator 24→the suction port 111a of the compressor 111.

That is, in the air mixing mode, a cycle is formed in which the indoor evaporator 23 that evaporates the cycle refrigerant and the recovery circulation section 61a of the combined heat exchanger 61 are connected in parallel with respect to the refrigerant flow.

In the cycle configuration, the controller 90 determines control signals or the like output to the various control-object devices connected to the output side of the controller 90, and the controller 90 controls the operation of the various control-object devices. For example, the controller 90 determines a control signal output to the compressor 111, a control voltage output to the air-conditioning blower 32, and a control signal output to the cooling expansion valve 22, as in the cooling mode.

Further, the controller 90 determines the control signal output to the high-pressure control valve 13 so that the refrigerant pressure Pd on a high-pressure side becomes the target high pressure PCO. As a result, the pressure of the high-pressure side cycle refrigerant is maintained substantially constant.

The controller 90 also determines a control signal output to the electric actuator for driving the air mixing door 34 such that both the cool air bypass passage 35 and the air passage of the indoor condenser 12 are open. In the present embodiment, the opening degree of the air mixing door 34 is adjusted so that the actual air temperature TAV approaches a target blowing temperature TAO. The controller 90 also appropriately determines control signals output to the other various control-object devices.

Thus, in the air mixing mode of the heat pump cycle 102, a vapor compression refrigeration cycle is formed in which the indoor condenser 12 functions as a condenser and the indoor evaporator 23 functions as an evaporator.

Therefore, when the cycle refrigerant is evaporated in the indoor evaporator 23, the blown air is cooled to produce cool air. Further, a part of the heat absorbed from the air when the cycle refrigerant is evaporated in the indoor evaporator 23, and the heat absorbed from the heating refrigerant when the cycle refrigerant is evaporated in the combined heat exchanger 61 are dissipated to a part of the cool air in the indoor condenser 12 to generate heated air.

Then, by adjusting the opening degree of the air mixing door 34, it is possible to change the mixing ratio of the cool air and the heated air, and condensed air adjusted to a desired temperature is blown into the vehicle compartment.

Further, in the air mixing mode of the heat pump cycle 102, because the recovery open-close valve 16a is opened, it is possible to cause the cycle refrigerant to absorb the heat from the heating refrigerant. Accordingly, similarly to the first embodiment, it is possible to reduce the power consumption of the compressor 111 and improve the COP of the cycle.

Further, in the air mixing mode, the heat absorbed by the cycle refrigerant from the heating refrigerant can also be used as a heat source for heating the ventilation air. Therefore, the capacity for heating the ventilation air can be improved similarly to the first embodiment.

(c) Dehumidification and Heating Mode

In the dehumidification and heating mode, the controller 90 controls the high-pressure control valve 13 to be in a throttle state and controls the cooling expansion valve 22 to be a fully open state. Further, the controller 90 opens the recovery open-close valve 16a and closes the cooling open-close valve 16c.

Accordingly, in the dehumidification and heating mode of the heat pump cycle 102, a cycle is formed in which the cycle refrigerant circulates in an order: the discharge port 111c of the compressor 111→the indoor condenser 12→the branch portion 15i→the high-pressure control valve 13→the air-conditioning outdoor heat exchanger 20→(the cooling expansion valve 22)→the indoor evaporator 23→the accumulator 24→the suction port 111a of the compressor 111. Further, a cycle is formed in which the cycle refrigerant circulates in an order: the discharge port 111c of the compressor 111→the indoor condenser 12→the branch portion 15i→the recovery open-close valve 16a→the recovery expansion valve 60→the recovery circulation section 61a of the combined heat exchanger 61→the accumulator 24→the suction port 111a of the compressor 111.

That is, the dehumidification and heating mode of the heat pump cycle 2 configures a cycle in which the cycle refrigerant circulates substantially in the same order as in the air mixing mode.

In the cycle configuration, the controller 90 determines control signals or the like output to the various control-object devices connected to the output side of the controller 90, and the controller 90 controls the operation of the various control-object devices. For example, the controller 90 determines a control signal output to the compressor 11, a control voltage output to the air-conditioning blower 32, and a control signal output to the cooling expansion valve 22, as in the air mixing mode.

Further, the controller 90 determines the control signal output to the high-pressure control valve 13 so that the refrigerant pressure Pd on a high-pressure side becomes the target high pressure PCO. The target high pressure PCO is determined based on the target blowing temperature TAO with reference to a control map for the dehumidifying and heating mode stored in advance in the controller 90. As a result, the pressure of the high-pressure side cycle refrigerant is maintained substantially constant.

The controller 90 determines a control signal output to the electric actuator for driving the air mixing door such that the cool air bypass passage 35 is closed and the air passage of the indoor condenser 12 is fully open. The controller 90 also appropriately determines control signals output to the other various control-object devices.

Thus, in the dehumidification and heating mode of the heat pump cycle 102, a vapor compression refrigeration cycle is formed in which the indoor condenser 12 functions as a condenser and the indoor evaporator 23 functions as an evaporator. In the dehumidification and heating mode of the present embodiment, similarly to the first embodiment, the ventilation air is cooled and dehumidified in the indoor evaporator 23, reheated in the indoor condenser 12, and then blown into the vehicle compartment. Accordingly, dehumidification and heating in the vehicle compartment can be performed.

Further, in the dehumidifying and heating mode, the heat of the cycle refrigerant absorbed from the heating refrigerant is also used as a heat source for heating the ventilation air, in addition to the heat of the cycle refrigerant absorbed from the ventilation air in the indoor evaporator 23 and the heat generated by the compression work of the compressor 111. That is, the ventilation air can be heated by using the exhaust heat of the in-vehicle devices 50 to 53 as a heat source. Therefore, the heating capacity can be improved in the dehumidification and heating mode.

(d) Low-Temperature Heating Mode

In the low-temperature heating mode, the controller 90 controls the high-pressure control valve 13 to be in a throttle state and controls the cooling expansion valve 22 to be a fully closed state. Further, the controller 90 opens the recovery open-close valve 16a and opens the cooling open-close valve 16c.

Accordingly, in the low-temperature heating mode of the heat pump cycle 102, a cycle is formed in which the cycle refrigerant circulates in an order: the discharge port 111c of the compressor 111→the indoor condenser 12→the high-pressure control valve 13→the air-conditioning outdoor heat exchanger 20→the cooling open-close valve 16c→the accumulator 24→the suction port 111a of the compressor 111. Further, a cycle is formed in which the cycle refrigerant circulates in an order: the discharge port 111c of the compressor 111→the indoor condenser 12→the branch portion 15i→the recovery open-close valve 16a→the recovery expansion valve 60→the recovery circulation section 61a of the combined heat exchanger 61→the accumulator 24→the suction port 111a of the compressor 111.

That is, in the low-temperature heating mode of the heat pump cycle 102, a cycle is configured in which the outdoor heat exchanger 20 for air conditioning and the recovery circulation section 61a are connected in parallel with respect to the cycle refrigerant flow.

In the cycle configuration, similarly to the first embodiment, the controller 90 determines control signals or the like to be output to the various control-object devices connected to the output side of the controller 90, and the controller 90 controls the operation of the various control-object devices.

Thus, in the low-temperature heating mode of the present embodiment, a vapor compression refrigeration cycle is formed in which the indoor condenser 12 functions as a condenser and the air-conditioning outdoor heat exchanger 20 functions as an evaporator. Therefore, in the low-temperature heating mode, the ventilation air heated by the indoor condenser 12 is blown into the vehicle compartment, and thereby the vehicle compartment can be heated.

Further, in the low-temperature heating mode, the air-conditioning outdoor heat exchanger 20 and the recovery circulation section 61a are connected in parallel. Further, in the low-temperature heating mode, the ventilation air can be heated by using the heat of the cycle refrigerant absorbed from the heating refrigerant in the combined heat exchanger 61 (i.e., the exhaust heat of the in-vehicle devices 50 to 53), in addition to the heat absorbed by the cycle refrigerant from the outside air in the air-conditioning outdoor heat exchanger 20 and the heat generated by the compression work of the compressor 11, as a heat source.

In the low-temperature heating mode, unlike the dehumidifying and heating mode, the ventilation air is not cooled by the indoor evaporator 23, so that the heating capacity of the ventilation air is prevented from being offset. Therefore, in the low-temperature heating mode, the heating capacity of the ventilation air can be greatly improved as compared with that in the dehumidifying-heating mode.

The other configurations and operations of the vehicle thermal management system 1 are the same as those of the first embodiment. In the heat recovery control, the controller 90 controls operation of the heating open-close valve 68 so that the management in-vehicle device temperature Tep is maintained within the usable temperature range of the battery 50. In the heat-discharge control, opening-closing control of the heat-discharge open-close valve 65 is performed so that the heat-discharge refrigerant pressure Prh is maintained within a reference pressure range.

Therefore, even in the vehicle thermal management system 1 including the heat pump cycle 102, similarly to the first embodiment, the exhaust heats of the in-vehicle devices 50 to 53 can be effectively used for heating the ventilation air. Further, the residual exhaust heat that does not need to be used to heat the ventilation air can be quickly radiated to the outside air, and the temperature rise of the in-vehicle devices 50 to 53 can be suppressed with a high responsibility.

The present disclosure is not limited to the embodiments described above, and various modifications can be made as follows within a scope without departing from the scope of the present disclosure.

(1) In the above-described embodiments, an example in which the vehicle thermal management system 1 is applied to an electric vehicle has been described, but the application of the vehicle thermal management system 1 is not limited to this. The vehicle thermal management system 1 is also effective when applied to a vehicle that generates less heat from a driving source for vehicle running and is more difficult to secure a heat source for air heating than a normal engine vehicle.

For example, the vehicle thermal management system 1 may be effectively applied to a hybrid vehicle that obtains a driving force for vehicle running from both an internal combustion engine and a vehicle-running electric motor (the hybrid vehicle including a so-called plug-in hybrid vehicle that can be recharged from a commercial power supply), or for a fuel cell vehicle equipped with a fuel cell or the like.

Further, in the above-described embodiments, the examples in which the heat-exchanging object fluid is the ventilation air have been described, but the heat-exchanging object fluid is not limited to this. For example, the heat-exchanging object fluid may be water or the like for hot-water supply.

In the above-described embodiments, the vehicle thermal management system 1 in which the air-conditioning operation mode is switchable has been described, but switching of the air-conditioning operation mode for effective use of exhaust heat of the in-vehicle device is not mandatory.

By performing both the heat-discharge control in the heat-discharge refrigerant circulation circuit 3 and the heat recovery control in the heating refrigerant circulation circuit 5 in parallel, it is possible to execute an operation mode in which the exhaust heat of the in-vehicle devices 50 to 53 can be effectively used. For example, it may be sufficient if the operation in the low-temperature heating mode can be executed. Therefore, the heat pump cycle 2, 102 is not limited to the configuration capable of switching between the refrigerant circuits.

Further, the heat pump cycle 2, 102 may be switched to another circuit configuration different from the circuit configurations described in the above embodiments. For example, in the cooling mode of the first embodiment, the refrigerant circuit may be switched to a normal refrigeration cycle by closing the recovery open-close valve 16a, such that the vehicle compartment is cooled in a single-stage compression cooling mode.

Further, the dehumidification and heating mode of the first embodiment may be switched to a refrigerant circuit of a normal refrigeration cycle in which dehumidifying and heating in the vehicle compartment is performed as a single-stage compression-type dehumidifying and heating mode. Specifically, the cooling expansion valve 22 may be in a throttled state and the recovery open-close valve 16a may be closed to switch to a refrigerant circuit that constitutes a normal refrigeration cycle. Similarly, in the dehumidification and heating mode of the ninth embodiment, the cooling expansion valve 22 may be in a throttled state and the recovery open-close valve 16a may be closed.

Further, in addition to the low-temperature heating mode of the first embodiment, a refrigerant circuit of a normal refrigeration cycle may be switched to a single-stage compression heating mode so as to heat the vehicle compartment. Specifically, the high-pressure control valve 13 is throttled, the cooling expansion valve 22 is fully closed, the recovery open-close valve 16a is closed, the low-pressure side open-close valve 16b is opened, and the cooling open-close valve 16c is opened, so as to switch a refrigerant circuit of a normal refrigeration cycle. Similarly, in the low-temperature heating mode of the ninth embodiment, the recovery open-close valve 16a may be se to be closed.

In the above-described embodiment, an arrangement state in which a part of the vehicle thermal management system 1 is arranged in the passenger compartment 80 and the remaining part thereof is arranged in the drive device compartment 81 has been described. However, the arrangement state of the vehicle thermal management system 1 is not limited to this.

For example, in a large vehicle such as a bus, the air-conditioning outdoor heat exchanger 20 of the heat pump cycle 2 and the heat-discharge outdoor heat exchanger 63 of the refrigerant circulation circuit 3 may be arranged outside of the passenger compartment 80, and also outside of the drive device compartment 81. As the outside of the drive device compartment 81, a dedicated case arranged on the ceiling or the like may be used.

Moreover, a heat insulation part which suppresses the heat transfer between the refrigerant flowing inside and outside air may be additionally used, with respect to each component of the heat pump cycle 2. Specifically, with respect to each component other than the indoor condenser 12, the indoor evaporator 23, the air-conditioning outdoor heat exchanger 20, and the heat-discharge outdoor heat exchanger 63 of the heat-discharge refrigerant circulation circuit 3, a heat insulating portion may be added.

As the heat insulating portion, an outer peripheral side of each component device may be covered with a heat insulating member made of a resin or the like having an excellent heat insulating performance. In particular, the outer peripheral sides of the combined heat exchanger 61, the in-vehicle devices 50 to 53, the refrigerant pipes 62, 64 of the heat-discharge refrigerant circulation circuit 3, and the refrigerant pipes of the heating refrigerant circulation circuit 5 may be respectively covered with heat insulating members. Further, a plurality of constituent devices may be housed in a heat insulating casing made of resin or the like having an excellent heat insulating performance. Accordingly, it can reduce the exhaust heat of the in-vehicle devices 50 to 53 from being unnecessarily dissipated to the outside air.

Further, in the above-described embodiment, an example is described in which the air-conditioning outdoor heat exchanger 20 and the heat-discharge outdoor heat exchanger 63 are arranged in parallel with respect to the flow direction of the outside air. However, the arrangement of the air-conditioning outdoor heat exchanger 20 and the heat-discharge outdoor heat exchanger 63 is not limited to this.

For example, the air-conditioning outdoor heat exchanger 20 and the heat-discharge outdoor heat exchanger 63 may be arranged in series with respect to the flow direction of the outside air. In this case, an outdoor heat exchanger, in which one of the cycle refrigerant and the heat-discharge refrigerant having a lower temperature flows, may be arranged upstream of another outdoor heat exchanger, in the flow direction of the outside air. According to this, since the outside air can be blown to the air-conditioning outdoor heat exchanger 20 and the heat-discharge outdoor heat exchanger 63 by using one common outdoor air fan, the mountability of the vehicle thermal management system 1 can be provided.

The respective components constituting the heat pump cycle 2, 102 are not limited to those disclosed in the embodiments described above.

In the above first embodiment, an example is described in which the two-stage electric compressor having the two compression mechanisms housed in one housing is employed as the compressor 11, but the type of compressor is not limited to the above type.

For example, the compressor 11 may be an electric compressor that houses a fixed-displacement type compression mechanism and an electric motor that drives the compression mechanism in one housing. That is, it is only necessary for the compressor to be capable of flowing therein the intermediate-pressure cycle refrigerant from the intermediate-pressure port 11b and joining it with the cycle refrigerant in the compression process from a low pressure to a high pressure.

Alternatively, two compressors are connected in series, and a suction port of a low-stage compressor disposed on a lower stage is used as the suction port 11a, while a discharge port of the high-stage compressor disposed on a higher stage is used as the discharge port 11c. The intermediate pressure port 11b is provided in a connection part connecting the discharge port of the low-stage compressor and the suction port of the high-stage compressor. Accordingly, one two-stage compressor may be formed by using two of the low-stage compressor and the high-stage compressor.

Further, in the above-described first embodiment and other embodiments, an example is described in which the low-pressure open-close valve 16b as the refrigerant circuit switch is disposed in the fixed-throttle bypass passage 18, but the refrigerant circuit switch is not limited to this.

For example, the refrigerant circuit switch may employ an electric three-way valve that switches between a refrigerant circuit in which the second liquid-phase outflow port 14d of the gas-liquid separator 14 is connected to the low-stage fixed throttle 17a and a refrigerant circuit in which the second liquid-phase outflow port 14d is connected to the fixed-throttle bypass passage 18. Further, the low-stage fixed throttle 17a may employ a variable throttle mechanism having a fully open function similar to the high-pressure control valve 13, and the low-pressure open-close valve 16b and the fixed-throttle bypass passage 18 may be omitted.

In the above-described embodiments, the detailed configurations of the open-close valves such as the recovery open-close valve 16a, the heat-discharge open-close valve 65 and the heating open-close valve 68 are not mentioned. These open-close valves may employ a so-called normally-closed electromagnetic valve that closes a refrigerant passage when not energized. Accordingly, the control at step S1 in the control flow illustrated in FIG. 13 can be easily executed.

In the embodiments described above, an example is described in which the cycle refrigerant is R134a, but the refrigerant is not limited to this example. For example, HFO-based refrigerants (R1234yf, HFO-1234ze, HFO-1234zd), R600a, R410A, R404A, R32, R407C can be used. Alternatively, a mixture refrigerant in which multiple kinds of those refrigerants are mixed together may be used. The above refrigerant may be used for the heat-discharge refrigerant and the heating refrigerant. The cycle refrigerant, the heat-discharge refrigerant, and the heating refrigerant may be different types of refrigerants.

(4) The respective components constituting the heat-discharge refrigerant circulation circuit 3 and the heating refrigerant circulation circuit 5 are not limited to those disclosed in the above embodiments.

For example, the heat-discharge storage tank 64a of the heat-discharge refrigerant circulation circuit 3 may be internally provided with the heat-discharge flow control valve 65a described in the second embodiment or the heat-discharge refrigerant pump 65b described in the third embodiment, to be integrated therewith. In the heating storage tank 54a of the heating refrigerant circulation circuit 5, the heating flow control valve 68a described in the second embodiment and the heating refrigerant pump 68*b* described in the third embodiment may be internally provided to be integrated with each other.

According to this, the flow rate control can be further stabilized. Further, it is possible to reduce the size of the vehicle thermal management system 1 as a whole and improve the mountability of the vehicle thermal management system 1 on the vehicle.

(5) Detailed configuration of the combined heat exchanger 61, 611 is not limited to that disclosed in the above embodiments.

In the above-described embodiment, examples in which the plate tubes are adopted as the recovery tube 72, the heat-discharge tube 75, and the heating tube 78 have been described; however, the recovery tube 72, the heat-discharge tube 75, and the heating tube 78 are not limited to this. For example, a multi-hole tube having a flat cross section formed by extrusion molding or the like may be adopted as the recovery tube 72, the heat-discharge tube 75, or the heating tube 78.

Further, the arrangement of the recovery tube 72, the heat-discharge tube 75, and the heating tube 78 is not limited to that disclosed in the above embodiment. That is, it is not limited to the arrangement of these tubes, which is determined on the assumption that the amount of heat used to heat the ventilation air is equal to the amount of heat dissipated to the outside air, in the exhaust heat of the in-vehicle devices 50 to 53.

For example, if the amount of heat used to heat the ventilation air in the exhaust heat of the in-vehicle devices 50 to 53 is assumed greater than the amount of heat dissipated to the outside air due to differences in destinations and the like, the number of the recovery tubes 72 may be set larger than the number of the heat-discharge tubes 75.

Specifically, except for both ends in the stacking direction of the combined heat exchanger 61, the recovery tubes 72, the heating tubes 78 and the heat-discharge tubes 75 may be regularly arranged to have a repeat order of the recovery tube 72→the heating tube 78→the heat-discharge tube 75→the heating tube 78→the recovery tube 72→the recovery tube 72→the heating tube 78→the heat-discharge tube 75→the heating tube 78→the recovery tube 72→ . . . in this order. In this case, the number of recovery tubes 72 and the number of heating tubes 78 are equal, and the number of heating tubes 78 is approximately twice the number of heat-discharge tubes 75.

For example, if the amount of heat dissipated to the outside air is assumed greater than the amount of heat used to heat the ventilation air in the exhaust heat of the in-vehicle devices 50 to 53, the number of the heat-discharge tubes 75 may be set larger than the number of the recovery tubes 72.

Specifically, except for both ends in the stacking direction of the combined heat exchanger 61, the recovery tubes 72, the heating tubes 78 and the heat-discharge tubes 75 may be regularly arranged to have a repeat order of the recovery tube 72→the heating tube 78→the heat-discharge tube 75→the heat-discharge tube 75→the heating tube 78→the recovery tube 72→the heating tube 78→the heat discharge tube 75→the heat discharge tube 75→the heating tube 78→ . . . in this order. In this case, the number of the heat-discharge tubes 75 and the number of the heating tubes 78 are equal, and the number of the heating tubes 78 is approximately twice the number of the recovery tubes 72.

Further, in the first embodiment, as the recovery tubes 72, an example in which the flow direction of the cycle refrigerant is turned one time in a U shape therein has been described, but the recovery tubes 72 are not limited to this arrangement and may be turned in one U-shape or more. For example, three rows of refrigerant passages having a flat cross section extending in the vertical direction may be provided in the recovery tube 72. In this case, the flow direction of the cycle refrigerant may turn two times therein so as to have a N-shape flow in the recovery tube 72.

Furthermore, by making the passage cross-sectional area of the refrigerant passage arranged on the downstream side of the refrigerant flow larger than the passage cross-sectional area of the refrigerant passage arranged on the upstream side, it is possible to reduce the pressure loss that occurs when the evaporated cycle refrigerant passes through the recovery tubes 72.

Such enlargement of the refrigerant passage area can also be realized by changing the path configuration of the recovery circulation section 61*a*. Here, the path in the heat exchanger can be defined as a refrigerant flow path formed by a group of tubes through which refrigerant flows in the same direction from a predetermined space to another space formed in the heat exchanger. Therefore, the total passage cross-sectional area of the pass is determined by the number of tubes forming the pass.

For example, a separator for partitioning the internal space of the recovery distribution pipe 70 or the internal space of the recovery joint pipe 71 is arranged, and the number of tubes forming a path arranged on a refrigerant flow downstream side is made larger than the number of tubes forming a path arranged on a refrigerant-flow upstream side. According to this, the effect of reducing the pressure loss in the above-described cycle refrigerant can be obtained.

In the above-described embodiments, an example is described in which the battery 50, the charging generator 51, the power control unit 52, and the vehicle-running electric motor 53 are employed as the in-vehicle devices, but the in-vehicle devices are not limited to those components. For example, the in-vehicle devices are not limited to those different in generated heat quantity, and may employ in-vehicle devices equivalent to each other in generated heat quantity or employ in-vehicle devices equivalent to each other in usable temperature range.

Further, in the above-described embodiments, an example is described in which the usable temperature ranges are set such that the in-vehicle devices 50 to 53 can deliver sufficient performance, but the setting of the usable temperature ranges is not limited to this. For example, the usable temperature ranges may be set with priority on ensuring the stability of the in-vehicle devices 50 to 53.

Further, the above-described embodiment describes regarding an example in which the heat absorption part for heating is formed by the refrigerant passages 50*a* to 53*a* provided inside the in-vehicle devices 50 to 53; however, the heat absorption part for heating is not limited to the refrigerant passages 50*a* to 53*a* formed inside the in-vehicle devices 50 to 53. For example, the heat absorption part for heating may be formed by bringing a flat surface of a flat tube made of metal (specifically, aluminum) having excellent heat conductivity into close contact with the heat generating parts of the in-vehicle devices 50 to 53. At this time, preferably, a heat transfer member (specifically, a silicon grease member or a silicon resin member) having an excellent heat transfer property may be inserted between the flat tube and the in-vehicle devices 50 to 53.

Further, in the above-described first embodiment and the like, the example in which the management in-vehicle device is the battery 50 has been described, however the management in-vehicle device is not limited to the battery 50.

For example, as the management in-vehicle device, one of the in-vehicle devices 50 to 53, arranged on the most downstream side of the refrigerant flow may be selected. Further, as the management in-vehicle device, an in-vehicle device that is most affected in performance, durability, product life, etc. due to changes in thermal environment, that is, an in-vehicle device that requires a temperature management with a highest accuracy may be selected among the in-vehicle devices.

The components described in the above embodiments may be appropriately combined to the extent practicable.

Specifically, in the first and second embodiments, a circuit that naturally circulates a refrigerant is used as the heat-discharge refrigerant circulation circuit 3 and the heating refrigerant circulation circuit 5. In the second, fifth, and sixth embodiments, the circuit for forcedly circulating the refrigerant by pumping the refrigerant is adopted. Furthermore, in the fourth embodiment, an example in which a vapor compression refrigeration cycle is adopted has been described. However, the heat-discharge refrigerant circulation circuit 3 and the heating refrigerant circulation circuit 5 are not limited to the examples of the above-described embodiments.

For example, as in the sixth embodiment, a circuit that forcibly circulates the refrigerant may be adopted as one of the heat-discharge refrigerant circulation circuit 3 and the heating refrigerant circulation circuit 5, and a vapor compression refrigeration cycle may be adopted as another one of the heat-discharge refrigerant circulation circuit 3 and the heating refrigerant circulation circuit 5.

Similarly, the control states of the heat-discharge circulation interrupting control in the heat-discharge refrigerant circulating circuit 3 and the control states of the heating circulation interrupting control in the heating refrigerant circulating circuit 5 disclosed in the respective embodiments may be appropriately combined.

Further, in the above-described first embodiment and the like, the heat-discharge refrigerant is circulated in the heat-discharge refrigerant circulation circuit 3 when the heat-discharge refrigerant pressure Prh becomes equal to or higher than the reference upper limit pressure KPrh1. Further, the circulation of the heat-discharge refrigerant in the heat-discharge refrigerant circulation circuit 3 is interrupted when the heat-discharge refrigerant pressure Prh becomes equal to or lower than the reference lower limit pressure KPrh2. However, the heat-discharge circulation interrupting control is not limited to this.

For example, the reference upper limit pressure KPrh1 or the reference lower limit pressure KPrh2 may be changed according to the outside air temperature and the operating state (that is, the amount of heat generation) of the in-vehicle devices 50 to 53. As a result, it is possible to realize a stable prediction control by suppressing a hypersensitive control or a response delay due to overshoot. As a result, it is possible to more appropriately dissipate the exhaust heat of the in-vehicle devices 50 to 53 to the outside air and to more reliably maintain the temperature of the in-vehicle devices 50 to 53 at an appropriate temperature.

For example, the combined heat exchangers 611 described in the third embodiment may be applied to the vehicle thermal management system 1 of the second or fourth embodiment. Further, the combined heat exchanger 61, and the heating storage tank 54*a* and the heat-discharge storage tank 64*a* described in the second embodiment may be applied to the vehicle thermal management system 1 described in the fifth to seventh embodiments.

Although the present disclosure has been described in accordance with the embodiments, it is understood that the present disclosure is not limited to the embodiments and structures disclosed therein. The present disclosure also includes various modifications and variations within an equivalent range. In addition, while the various combinations and configurations, which are preferred, other combinations and configurations, including more, less or only a single element, are also within the spirit and scope of the present disclosure.

What is claimed is:

1. A thermal management system for a vehicle, comprising:
    a heating refrigerant circulation circuit in which a heating refrigerant circulates, the heating refrigerant circulation circuit configured for the heating refrigerant to absorb exhaust heat of an in-vehicle device that generates heat during operation;
    a heat pump cycle configured for a cycle refrigerant to absorb heat from the heating refrigerant and to heat a fluid to be heat exchanged by using the absorbed heat from the heating refrigerant as a heating source; and
    a heat-discharge refrigerant circulation circuit configured for a heat-discharge refrigerant to absorb heat from the heating refrigerant, and configured to dissipate the absorbed heat from the heating refrigerant to an outside air, wherein
    the heating refrigerant circulation circuit includes a heating circulation section in which the heating refrigerant having heat-absorbed from the exhaust heat flows;
    the heat pump cycle includes a recovery circulation section in which the cycle refrigerant flows,
    the heat-discharge refrigerant circulation circuit includes a heat-discharge circulation section in which the heat-discharge refrigerant flows,
    the heating circulation section, the recovery circulation section, and the heat-discharge circulation section are integrally configured as a combined heat exchanger that is capable of performing heat transfers at least between the cycle refrigerant and the heating refrigerant and between the heat-discharge refrigerant and the heating refrigerant, and
    the heating refrigerant, the cycle refrigerant and the heat-discharge refrigerant are heat mediums each of which has a phase change during the heat transfer.

2. The thermal management system for the vehicle according to claim 1, wherein
    the recovery circulation section is configured by a plurality of recovery tubes in which the cycle refrigerant flows,
    the heating circulation section is configured by a plurality of heating tubes in which the heating refrigerant flows,
    the heat-discharge circulation section is configured by a plurality of heat-discharge tubes in which the heat-discharge refrigerant flows,
    the recovery tubes, the heating tubes and the heat-discharge tubes are stacked and arranged to configure the combined heat exchanger,
    at least a part of the recovery tubes and the heating tubes are arranged adjacent to each other to perform the heat transfer between the cycle refrigerant and the heating refrigerant, and at least a part of the heat-discharge tubes and the heating tubes are arranged adjacent to each other to perform the heat transfer between the heat-discharge refrigerant and the heating refrigerant.

3. The thermal management system for the vehicle according to claim 2, wherein
the number of the recovery tubes is equal to or smaller than the number of the heating tubes, and
the number of the heat-discharge tubes is equal to or smaller than the number of the heating tubes.

4. The thermal management system for the vehicle according to claim 2, wherein
the recovery tubes are arranged such that the cycle refrigerant flows therein in an up-down direction and the flow direction of the cycle refrigerant is turned one time or more than one time,
the heating tubes are arranged such that the heating refrigerant flows therein from an upper side to a lower side, and
the heat-discharge tubes are arranged such that the heat-discharge refrigerant flows therein from a lower side to an upper side.

5. The thermal management system for the vehicle according to claim 2, wherein
the combined heat exchanger includes an interposition member disposed between the recovery tube and the heat-discharge tube adjacent to each other to define a refrigerant passage between the recovery tube and the heat-discharge tube adjacent to each other, and
the heating tube is configured by the interposition member and outer surfaces of the recovery tube and the heat-discharge tube adjacent to each other.

6. The thermal management system for the vehicle according to claim 1, wherein
the heating refrigerant circulation circuit includes a heating refrigerant storage space in which the heating refrigerant condensed in the heating circulation section is stored, and
the heating refrigerant storage space is provided in the combined heat exchanger as an integrated structure.

7. The thermal management system for the vehicle according to claim 1, wherein
the heating refrigerant circulation circuit includes a heat absorption section configured to absorb the exhaust heat to the heating refrigerant, and
the heating circulation section is arranged above of the heat absorption section in the heating circulation section.

8. The thermal management system for the vehicle according to claim 1, wherein
the heat-discharge refrigerant circulation circuit includes a heat-discharge outdoor heat exchanger in which the heat-discharge refrigerant is heat exchanged with outside air, and
the heat-discharge outdoor heat exchanger is arranged above of the heat-discharge circulation section of the combined heat exchanger.

9. The thermal management system for the vehicle according to claim 1, wherein
a plurality of the in-vehicle devices are provided, and
the heating refrigerant circulation circuit includes a plurality of heat absorption sections in which the heating refrigerant absorbs the exhaust heat, and a decompressor located to decompress the heating refrigerant flowing into the heat absorption sections.

10. The thermal management system for the vehicle according to claim 1, wherein the heating refrigerant circulation circuit includes a plurality of heat absorption sections in which the heating refrigerant absorbs the exhaust heat, and a bypass passage through which the heating refrigerant flows while bypassing at least one of the heating absorption section.

11. The thermal management system for the vehicle according to claim 1, wherein
a plurality of the in-vehicle devices are provided, and
the heating refrigerant circulation circuit includes a heating circulation shutter configured to shut a circulation of the heating refrigerant, the thermal management system further comprising:
a management in-vehicle temperature detector configured to detect a management in-vehicle device temperature that is a temperature of a management in-vehicle device predetermined among the plurality of the in-vehicle devices; and
a controller configured to control operation of the heating circulation shutter, wherein the controller controls the operation of the heating circulation shutter such that the management in-vehicle device temperature is maintained within a predetermined usable temperature range.

12. The thermal management system for the vehicle according to claim 11, wherein
the management in-vehicle device is a battery.

13. The thermal management system for the vehicle according to claim 1, wherein
the heat-discharge refrigerant circulation circuit includes a heat-discharge circulation shutter configured to shut a circulation of the heat-discharge refrigerant, the thermal management system further comprising:
a heat-discharge refrigerant pressure detector configured to detect a physical amount relative to a heat-discharge refrigerant pressure that is a pressure of the heat-discharge refrigerant; and
a controller configured to control operation of the heat-discharge circulation shutter, wherein the controller controls the operation of the heat-discharge circulation shutter such that the heat-discharge refrigerant pressure is maintained within a predetermined reference temperature range.

14. A thermal management system for the vehicle, comprising:
a heating refrigerant circulation circuit in which a heating refrigerant circulates, the heating refrigerant circulation circuit configured for the heating refrigerant to absorb exhaust heat of an in-vehicle device that generates heat during operation;
a heat pump cycle configured for a cycle refrigerant to absorb heat from the heating refrigerant and to heat a fluid to be heat exchanged by using the absorbed heat from the heating refrigerant as a heating source;
a heat-discharge refrigerant circulation circuit configured for a heat-discharge refrigerant to absorb heat from the heating refrigerant, and configured to dissipate the absorbed heat from the heating refrigerant to an outside air; and
a combined heat exchanger including a heating circulation passage in which the heating refrigerant having heat-absorbed from the exhaust heat flows, a recovery circulation passage in which the cycle refrigerant flows, and a heat-discharge circulation passage in which the heat-discharge refrigerant flows,
wherein the heating circulation passage, the recovery circulation passage, and the heat-discharge circulation passage are arranged in the combined heat exchanger to perform heat transfers at least between the cycle refrigerant and the heating refrigerant and between the heat-discharge refrigerant and the heating refrigerant.

\* \* \* \* \*